United States Patent
Oh et al.

(10) Patent No.: US 12,495,430 B2
(45) Date of Patent: Dec. 9, 2025

(54) METHOD AND DEVICE FOR TRANSMITTING AND RECEIVING DOWNLINK CONTROL INFORMATION ON SCHEDULING OF DATA CHANNELS IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Hoondong Noh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 17/927,831

(22) PCT Filed: May 27, 2021

(86) PCT No.: PCT/KR2021/006579
§ 371 (c)(1),
(2) Date: Nov. 25, 2022

(87) PCT Pub. No.: WO2021/246711
PCT Pub. Date: Dec. 9, 2021

(65) Prior Publication Data
US 2023/0247648 A1      Aug. 3, 2023

(30) Foreign Application Priority Data
Jun. 5, 2020   (KR) .................. 10-2020-0068527

(51) Int. Cl.
*H04W 72/232* (2023.01)
*H04L 1/00* (2006.01)
*H04W 48/16* (2009.01)

(52) U.S. Cl.
CPC ......... *H04W 72/232* (2023.01); *H04L 1/0003* (2013.01); *H04W 48/16* (2013.01)

(58) Field of Classification Search
CPC ....... H04L 1/0003; H04L 1/0031; H04L 1/00; H04L 1/0025; H04L 1/0029; H04L 5/00;
(Continued)

(56) References Cited

U.S. PATENT DOCUMENTS

2013/0107836 A1\* 5/2013 Miki ............... H04L 5/0091
370/329
2014/0044085 A1\* 2/2014 Hong .............. H04L 5/0053
370/329
(Continued)

FOREIGN PATENT DOCUMENTS

| JP | 2019-198014 A | 11/2019 |
| KR | 10-2019-0029483 A | 3/2019 |
| WO | 2019-051085 A1 | 3/2019 |

OTHER PUBLICATIONS

English translation for ISR of PCT/KR2021/006579; Dec. 6, 2022 (Year: 2022).\*

(Continued)

*Primary Examiner* — Benjamin H Elliott, IV
(74) *Attorney, Agent, or Firm* — Jefferson IP Law, LLP

(57) ABSTRACT

Disclosed are a method and device for transmitting and receiving downlink control information (DCI) in a wireless communication system. A method to be performed by a base station comprises steps in which configuration information on scheduling of one or more PDSCHs to one or more cells through one piece of DCI is transmitted to a UE through upper layer signaling, at least one of a carrier indicator field (CIF) or a cell group indicator field (GIF) included in the DCI, the size of a frequency domain resource allocation field commonly applied to the one or more PDSCHs, and at least one modulation and coding scheme (MCS) field and/or MCS (Continued)

offset field are determined according to the configuration information, and the at least one of the CIF or GIF, the frequency domain resource allocation field having the determined size, and the at least one MCS field and/or MCS offset field are transmitted to the UE by being included in the DCI for scheduling the plurality of PDSCHs to a plurality of cells, respectively, according to the configuration information.

19 Claims, 15 Drawing Sheets

(58) Field of Classification Search
CPC ... H04L 1/0023; H04L 5/0044; H04L 5/0094; H04W 72/232; H04W 48/16; H04W 72/231; H04W 72/0453; H04W 72/1263; Y02D 30/70
See application file for complete search history.

(56) References Cited

U.S. PATENT DOCUMENTS

| | | |
|---|---|---|
| 2017/0223727 A1 | 8/2017 | Davydov et al. |
| 2018/0110047 A1* | 4/2018 | Babaei .............. H04W 72/0446 |
| 2018/0123769 A1* | 5/2018 | Pelletier ................. H04L 5/001 |
| 2019/0021045 A1* | 1/2019 | Kim ...................... H04W 72/23 |
| 2019/0082431 A1* | 3/2019 | Yi ......................... H04L 5/0055 |
| 2019/0166615 A1* | 5/2019 | Nimbalker ............ H04W 72/21 |
| 2019/0297605 A1* | 9/2019 | Kim ...................... H04W 72/23 |
| 2019/0387501 A1* | 12/2019 | Park ........................ H04L 5/005 |
| 2020/0374094 A1* | 11/2020 | Pelletier ................. H04L 5/001 |
| 2021/0168011 A1* | 6/2021 | Davydov ............. H04L 5/0048 |
| 2021/0195620 A1* | 6/2021 | Yoshimura ........ H04W 72/1273 |
| 2022/0015015 A1* | 1/2022 | Kim ...................... H04W 48/12 |
| 2022/0104195 A1* | 3/2022 | Babaei ............... H04W 52/346 |
| 2022/0110148 A1* | 4/2022 | Oh ........................ H04W 72/23 |
| 2022/0191895 A1* | 6/2022 | Oh ......................... H04L 5/001 |
| 2023/0247648 A1* | 8/2023 | Oh ............................ H04L 5/00 370/252 |

OTHER PUBLICATIONS

Korean Office Action dated May 26, 2025, issued in Korean Application No. 10-2020-0068527.

* cited by examiner

METHOD AND DEVICE FOR TRANSMITTING AND RECEIVING DOWNLINK CONTROL INFORMATION ON SCHEDULING OF DATA CHANNELS IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/006579, filed on May 27, 2021, which is based on and claimed priority of a Korean patent application number 10-2020-0068527, filed on Jun. 5, 2020, in the Korean Intellectual Property Office, the disclosure of which is incorporated by reference herein in its entirety.

TECHNICAL FIELD

The disclosure relates to a method and apparatus for scheduling downlink data channels in a wireless communication system.

BACKGROUND ART

To meet demands for wireless data traffic, which have been increasing since the commercialization of a 4th Generation (4G) communication system, efforts are being made to develop an advanced 5th Generation (5G) communication system or a pre-5G communication system. For this reason, the 5G communication system or the pre-5G communication system is called a beyond 4G network communication system or a post long term evolution (LTE)/LTE advanced (LTE-A) system.

To achieve high data rates, implementation of the 5G communication system in a millimeter wave (mmWave) band (such as 60 GHz) is under consideration. For the 5G communication system, techniques such as beamforming, massive multiple input multiple output (MIMO), full dimension-multiple input multiple output (FD-MIMO), array antenna, analog beamforming, and large-scale antenna have been discussed to mitigate the pathloss of waves and increase the propagation distance of the waves in the mmWave band.

For system network improvement, techniques such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and reception interference cancellation are being developed in the 5G communication system.

Besides, advanced coding modulation (ACM) schemes including hybrid frequency shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), sparse code multiple access (SCMA), and/or the like are being developed for the 5G system.

With the development of the mobile communication system as described above, various services may be provided and as the wireless communication network becomes more complex and diversified, there is a need for a method for allocating data channels for a downlink and a uplink more efficiently.

DISCLOSURE

Technical Problem

The disclosure provides a method and apparatus for scheduling downlink data channels in a wireless communication system.

The disclosure provides a method and apparatus for scheduling a plurality of data channels on different carriers using downlink control information in a wireless communication system.

The disclosure provides a method and apparatus for scheduling one or more data channels for one or more cells by one piece of downlink control information in a wireless communication system.

The disclosure provides a method and apparatus for configuring downlink control information including resource allocation information applicable to a plurality of data channels in a wireless communication system.

Technical Solution

In a method according to an embodiment of the disclosure, a method of a base station for transmitting downlink control information in a wireless communication system may comprise, transmitting, to a user equipment (UE) via higher layer signaling, configuration information on scheduling of one or more data channels for one or more cells via one piece of downlink control information, determining, according to the configuration information, at least one of a carrier indication field (CIF) or a cell group indication field (GIF), a size of a frequency domain resource allocation field applied to one or more data channels, at least one modulation and coding scheme (MCS) field, and/or an MCS offset field which are included in the downlink control information, and including, according to the configuration information, the at least one of the CIF or the GIF, the frequency domain resource allocation field having the determined size, the at least one MCS field and/or the MCS offset field in the downlink control information on scheduling of a plurality of data channels for a plurality of cells and transmitting the downlink control information to the UE.

In a method according to an embodiment of the disclosure, a method of a UE for receiving downlink control information in a wireless communication system may comprise, receiving, from a base station via higher layer signaling, configuration information on scheduling of one or more data channels for one or more cells via one piece of downlink control information, receiving the downlink control information including at least one of a carrier indication field (CIF) or a cell group indication field (GIF), a frequency domain resource allocation field applied to a plurality of data channels, at least one modulation and coding scheme (MCS) field, and/or an MCS offset field to schedule the plurality of data channels for a plurality of cells, respectively, and obtaining, according to the configuration information, the at least one of the CIF and the GIF, the frequency domain resource allocation field, the at least one MCS field, and/or the MCS offset field which are included in the downlink control information.

In an apparatus according to an embodiment of the disclosure, an apparatus of a base station for transmitting downlink control information in a wireless communication system may comprise a transceiver, and a controller, and the controller may be configured to, transmit, to a UE via higher layer signaling, configuration information on scheduling of one or more data channels for one or more cells via one piece of downlink control information, determine, according to the configuration information, at least one of a carrier indication field (CIF) or a cell group indication field (GIF), a size of a frequency domain resource allocation field applied to one or more data channels, at least one modulation and coding scheme (MCS) field, and/or an MCS offset field which are included in the downlink control information, and include, according to the configuration information, the at least one of the CIF or the GIF, at least one frequency domain resource allocation field having the determined size, the at least one MCS field and/or the MCS offset field in the downlink control information on scheduling of a plurality of data channels for a plurality of cells and transmit the downlink control information to the UE.

In an apparatus according to an embodiment of the disclosure, an apparatus of a UE for receiving downlink control information in a wireless communication system may comprise a transceiver, and a controller, and the controller may be configured to, receive, from a base station via higher layer signaling, configuration information on scheduling of one or more data channels for one or more cells via one piece of downlink control information, receive the downlink control information including at least one of a carrier indication field (CIF) or a cell group indication field (GIF), a frequency domain resource allocation field applied to a plurality of data channels, at least one modulation and coding scheme (MCS) field, and/or an MCS offset field to schedule a plurality of data channels for a plurality of cells, respectively, and obtain, according to the configuration information, the at least one of the CIF and the GIF, the frequency domain resource allocation field, the at least one MCS field, and/or the MCS offset field which are included in the downlink control information.

MODE FOR INVENTION

Figure 1:
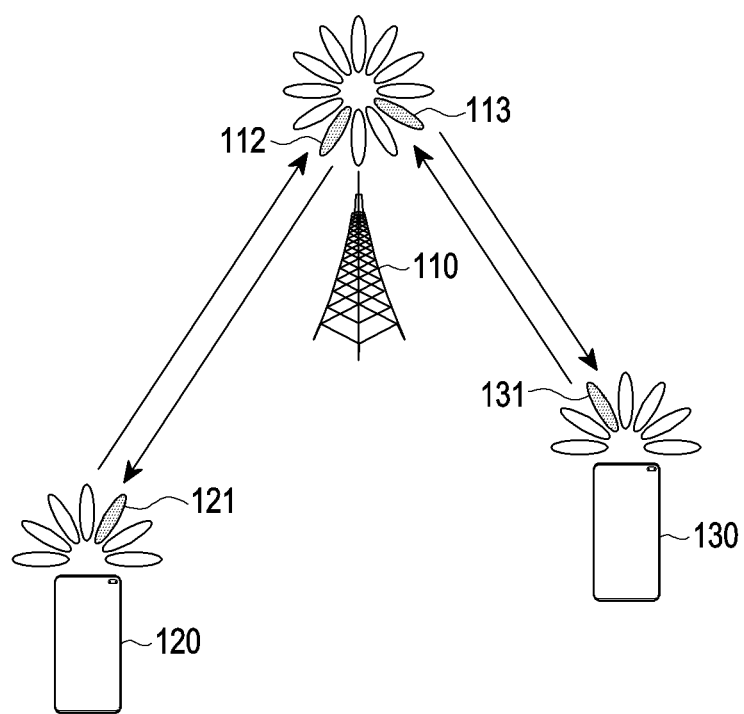
FIG. 1 is a diagram illustrating a wireless communication system according to an embodiment of the disclosure.

Hereinafter, embodiments of the disclosure are described in detail with reference to the accompanying drawings.

In describing the disclosure, the description of technologies that are known in the art and are not directly related to the disclosure is omitted. This is for further clarifying the gist of the disclosure without making it unclear. The terms to be described below are defined considering a function in the disclosure and may be replaced with other terms according to the intention or practice of the user or operator. Therefore, the terms should be defined based on the overall disclosure.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification. When determined to make the subject matter of the disclosure unclear, the detailed of the functions or configurations related to the description of the disclosure may be omitted. The terms to be described below are defined considering a function in the disclosure and may be replaced with other terms according to the intention or practice of the user or operator. Therefore, the terms should be defined based on the overall disclosure.

Hereinafter, a base station (BS) may be an entity performing allocating a resource to a UE and may be at least one of a gNode B, an eNode B, a Node B (or xNode B (here, x denotes an alphabet including g and e)), a wireless access unit, a base station controller, a satellite, an air vehicle (airborn), or a node on a network. A terminal (user equipment (UE)) may include a Mobile Station (MS), a Vehicular, a satellite, an air vehicle (airborn), a cellular phone, a smartphone, computer, or a multimedia system capable of performing a communication function. In the disclosure, a downlink (DL) is a wireless transmission path of a signal transmitted from a base station to a UE, and a uplink (UL) is a wireless transmission path of a signal transmitted from a UE to a base station. Additionally, there may be a sidelink (SL) meaning a wireless transmission path of a signal transmitted by a UE to another UE.

In addition, although LTE, LTE-A, or 5G systems may be described below as an example, an embodiment of the disclosure may be applied to other communication systems having a similar technical background or channel type. For example, 5G-Advance or NR-Advance or 6th generation mobile communication technology (6G) developed after a 5G mobile communication technology (or new radio (NR)) may be included therein, and in the following, 5G may be a concept which includes existing LTE, LTE-A and other similar services. In addition, the disclosure may be applied to other communication systems through some modifications within a range which does not significantly depart from the scope of the disclosure as judged by a person having skilled technical knowledge.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more CPUs in a device or a security multimedia card. In an embodiment, a " . . . unit" may include one or more processors.

Wireless communication systems evolve beyond voice-centered services to broadband wireless communication systems to provide high data rate and high-quality packet data services such as communication standards of, for example, High Speed Packet Access (HSPA), Long Term Evolution (LTE) or Evolved Universal Terrestrial Radio Access (E-UTRA)), LTE-Advanced (LTE-A), LTE-pro of 3GPP, High Rate Packet Data (HRPD), Ultra Mobile Broadband (UMB) of 3GPP2, IEEE 802.16e, and/or the like.

As a representative example of the broadband wireless communication system, the LTE system adopts an Orthogonal Frequency Division Multiplexing (OFDM) scheme for a Downlink (DL) and a Single Carrier Frequency Division Multiple Access (SC-FDMA) scheme for a Uplink (UL). A uplink means a wireless link where a UE transmits data or control signals to a base station, and download means a wireless link where the base station transmits data or control signals to the UE. Such multiple access scheme allocates and operates time-frequency resources carrying data or control information per user not to overlap, i.e., to maintain orthogonality, to thereby differentiate each user's data or control information.

A Post-LTE communication system, i.e., a 5G communication system, is required to freely reflect various needs of users and service providers and thus to support services that meet various requirements at the same time. Services considered for 5G communication systems include, e.g., enhanced Mobile Broadband (eMBB), massive Machine Type Communication (MMTC), and Ultra Reliability Low Latency Communication (URLLC).

The eMBB aims to provide a further enhanced data transmission rate as compared with LTE, LTE-A, or LTE-pro. For example, the eMBB in the 5G communication system needs to provide a peak data rate of 20 Gbps on download and a peak data rate of 10 Gbps on uplink in terms of one base station. The 5G communication system is also required to provide an increased user perceived data rate of a UE while providing a peak data rate. To meet such requirement, various transmission/reception techniques, as well as multi-antenna (Multi Input Multi Output (MIMO)), need to further be enhanced. In addition, while a signal is transmitted using a transmission bandwidth of up to 20 MHz in a 2 GHz band used by LTE, a 5G communication system uses a frequency bandwidth wider than 20 MHz in a frequency band of 3 to 6 GHz or 6 GHz or more to meet data transmission speed required in the 5G communication system.

mMTC is also considered to support application services, such as internet of things (IoT) in the 5G communication system. To efficiently provide IoT, mMTC may be required to support massive UEs in the cell, enhance the coverage of the UE and the battery time, and reduce UE costs. IoT devices are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life such as 10-15 years.

The URLLC is a cellular-based wireless communication service used for a specific purpose (mission-critical). For example, a service used for remote control for robots or machinery, industrial automation, unmanned aerial vehicles, remote health care, and emergency alerts, and/or the like may be considered. So, a communication provided by the URLLC needs to provide ultra-low latency and ultra-high reliability. For example, URLLC-supportive services need to meet an air interface latency of less than 0.5 milliseconds simultaneously with a packet error rate of $10^{-5}$ or less. Thus, for URLLC-supportive services, the 5G communication system may be required to be designed to provide a shorter Transmit Time Interval (TTI) than those for other services and allocate a broad resource in a frequency band to ensure reliability of a communication link.

Three services of 5G, i.e., the eMBB, the URLLC, and the mMTC, may be multiplexed and transmitted in one system. At this time, different transmission/reception techniques and transmission/reception parameters may be used between services to satisfy different requirements of each service. Of course, 5G is not limited to the three services described above.

FIG. 1 is a diagram illustrating a wireless communication system according to an embodiment of the disclosure. FIG. 1 exemplifies a base station 110, a UE 120, and a UE 130 as a part of nodes using a wireless channel in a wireless communication system. Although only one base station is illustrated in FIG. 1 by way of example, other base stations identical or similar to the base station 110 may be further included.

Referring to FIG. 1, the base station 110 may be a network infrastructure that provides a wireless access to the UEs 120 and 130. The base station 110 has a coverage defined as a predetermined geographic area based on an arrival distance within which it may transmit a wireless signal. The base station 110 may be denoted in other terms, such as an 'access point (AP)', an 'eNodeB (eNB)', a 'gNodeB (gNB)', a '5th generation (5G) node', a 'wireless point', or a 'transmission/reception point (TRP)' or in other various terms with an equivalent technical meaning thereto.

Each of the UEs 120 and 130 is a device which may be used by a user, and may perform a communication through a radio channel. In some cases, at least one of the UE 120 and the UE 130 may be operated without the user's involvement. That is, the at least one of the UE 120 and the UE 130 is a device for performing a machine type communication (MTC), and may not be carried by the user. Each of the UE 120 and the UE 130 may also be denoted by other terms, such as a 'mobile station', a 'subscriber station', a 'remote terminal', a 'wireless terminal', a 'user device', or in other various terms with equivalent technical meanings thereto.

A wireless communication environment may include a wireless communication in a unlicensed band as well as a licensed band. The base station 110, the UE 120, and the UE 130 may transmit and receive radio signals in a unlicensed band (e.g., 5 GHz to 7.125 GHz band, and to 71 GHz band). As an embodiment, in the unlicensed band, a cellular communication system and another communication system (e.g., a wireless local area network (WLAN)) may coexist. The base station 110, the UE 120, and the UE 130 may perform a channel access procedure for a unlicensed band in order to ensure fairness between two communication systems, in other words, in order that a situation in which a channel is used exclusively by one system does not occur. As an example of the channel access procedure for the unlicensed band, the base station 110, the UE 120, and the UE 130 may perform listen before talk (LBT).

The base station 110, the UE 120, and the UE 130 may transmit and receive radio signals in a millimeter wave (mmWave) band (e.g., 28 GHz, 30 GHz, 38 GHz, and 60 GHz). At this time, in order to improve channel gain, the base station 110, the UE 120, and the UE 130 may perform beamforming Here, the beamforming may include transmission beamforming and/or reception beamforming That is, the base station 110, the UE 120, and the UE 130 may impart directivity to a transmission signal or a reception signal. To this end, the base station 110 and the UEs 120 and 130 may select serving beams via a beam search or beam management procedure. After the serving beams are selected, subsequent communication may be performed via a resource having a quasi co-located (QCL) relationship with a resource transmitting the serving beams.

The base station 110 may select a beam 112 or 113 of a specific direction. In addition, the base station 110 may communicate with a UE using the beam 112 or 113 of the specific direction. For example, the base station 110 may receive a signal from the UE 120 or transmit a signal to the UE 120 using the beam 112. The UE 120 may receive a signal from the base station 110 or transmit a signal to the base station 110 using a beam 121. Also, the base station 110 may receive a signal from the UE 130 or transmit a signal to the UE 130 using the beam 113. The UE 130 may receive a signal from the base station 110 or transmit a signal to the base station 110 using a beam 131.

Figure 2:
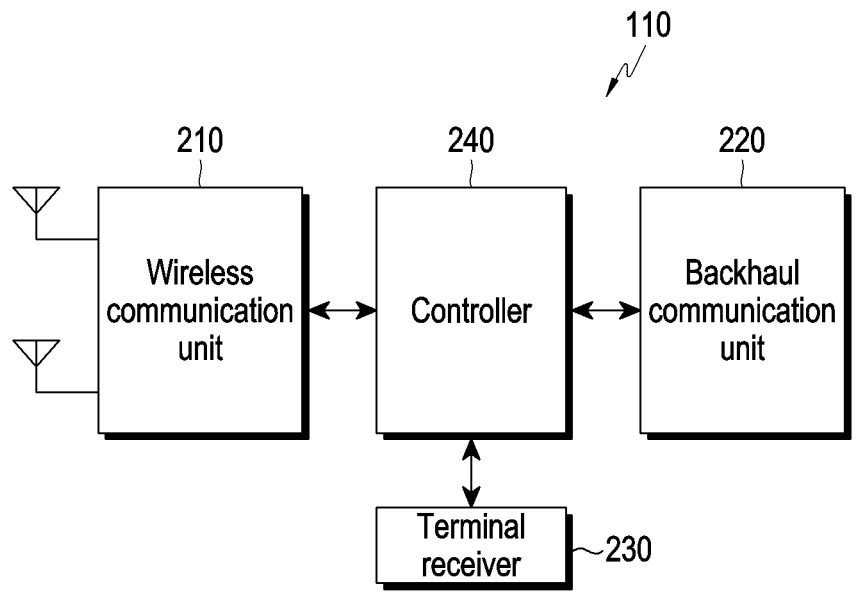
FIG. 2 is a diagram illustrating a structure of a base station in a wireless communication system according to an embodiment of the disclosure.

FIG. 2 is a diagram illustrating a structure of a base station in a wireless communication system according to an embodiment of the disclosure. The structure shown in FIG. 2 may be appreciated as a structure of a base station 110. The term " . . . unit" and the suffix " . . . er" as used herein denote a unit processing at least one function or operation and be implemented in hardware, software, or a combination thereof.

Referring to FIG. 2, the base station may include a wireless communication unit 210, a backhaul communication unit 220, a storage unit 230, and a controller 240.

The wireless communication unit 210 (this may be used interchangeably with a transceiver) may perform functions for transmitting and receiving signals via a wireless channel. In an embodiment, the wireless communication unit 210 may perform a function of conversion between a baseband signal and a bit stream according to a physical layer specification in the system. In an embodiment, upon signal transmission, the wireless communication unit 210 may encode and modulate a transmission bit stream to generate complex symbols. Further, upon signal reception, the wireless communication unit 210 may reconstruct a transmission bit stream by demodulating and decoding a received baseband signal.

The wireless communication unit 210 may up-convert the baseband signal into a radio frequency (RF) band signal and transmit the up-converted signal via an antenna, and down-convert an RF band signal received via the antenna into a baseband signal. To that end, the wireless communication unit 210 may include a transmission filter, a reception filter, an amplifier, a mixer, an oscillator, a digital-to-analog converter (DAC), an analog-to-digital converter (ADC), and/or the like. The wireless communication unit 210 may include a plurality of chains which correspond to transmission/reception paths. The wireless communication unit 210 may include at least one antenna array constituted of a plurality of antenna elements.

In terms of hardware, the wireless communication unit 210 may be configured of a digital unit or analog unit, and the analog unit may be constituted of a plurality of sub units depending on operation power, an operation frequency, and/or the like. The digital unit may be implemented as at least one processor (e.g., a digital signal processor (DSP)).

The wireless communication unit 210 may transmit and receive signals as described above. Thus, the whole or part of the wireless communication unit 210 may be referred to as a 'transmitter,' 'receiver,' or 'transceiver.' Further, transmission and reception performed via a wireless channel in the following description may also mean performing the above-described processing by the wireless communication unit 210. According to an embodiment, the wireless communication unit 210 may include at least one transceiver.

The backhaul communication unit 220 may provide an interface for performing a communication with other nodes within the network. That is, the backhaul communication unit 220 may convert a bit string transmitted from the base station to another node, e.g., another access node, another base station, a higher node, a core network, and/or the like, into a physical signal and converts a physical signal received from another node into a bit stream.

The storage unit 230 may store a basic program, an application program, and data such as configuration information, and/or the like for operating the base station. The storage unit 230 may be configured as a volatile memory, a non-volatile memory, or a combination of a volatile memory and a non-volatile memory. The storage unit 230 may provide the stored data according to a request from the controller 240. In an embodiment, the storage unit 230 may include at least one memory.

The controller 240 may control the overall operations of the base station. The controller 240 may transmit and receive signals via the wireless communication unit 210 or via the backhaul communication unit 220. The controller 240 may record and read data in/from the storage unit 230. The controller 240 may perform functions of a protocol stack required in a communication specification. In an embodiment, the protocol stack may be included in the wireless communication unit 210. In an embodiment, the controller 240 may include at least one processor.

The controller 240 may control the base station to perform operations according to at least one of various embodiments to be described later. In an embodiment, the controller 240 may perform a channel access procedure for a unlicensed band. In an embodiment, a transceiver (e.g., the wireless communication unit 210) may receive signals transmitted in the unlicensed band, and the controller 240 may determine whether the unlicensed band is in an idle state by comparing strength of the above-described received signal, and/or the like with a pre-defined threshold value or a threshold value determined as a value of a function with an input such as a bandwidth. The controller 240 may transmit a control signal to a UE or receive a control signal from the UE via the transceiver. The controller 240 may transmit data to a UE or receive data from the UE via the transceiver. The controller 240 may determine a transmission result for a signal transmitted to a UE based on a control signal or a data signal received from the UE.

In an embodiment, the controller 240 may configure one downlink control information (DCI) for allocating one or more data channels to one or more cells, and transmit the DCI to a UE via the wireless communication unit 210. Before transmitting the DCI, the controller 240 may provide, to the UE via higher layer signaling, configuration information required to allocate the one or more data channels by the DCI. The controller 240 may transmit a data channel to the UE or receive a data channel from the UE based on the configuration information and information fields included in the DCI.

In an embodiment, the controller 240 may perform maintain or change a length of a contention window (CW) for the channel access procedure (hereinafter, contention window adjustment) based on the transmission result, i.e., based on a reception result for the control signal or the data signal in the UE. According to an embodiment, the controller 240 may determine a reference interval to obtain a transmission result for the contention window adjustment. The controller 240 may determine a data channel for the contention window adjustment in the reference interval. The controller 240 may determine a reference control channel for the contention window adjustment in the reference interval. If it is determined that the unlicensed band is in the idle state, the controller 240 may occupy a channel.

The controller 240 may control to receive uplink control information (UCI) from a UE via the wireless communication unit 210, and to identify whether there is a need for retransmitting a downlink data channel and/or whether there is a need for changing a modulation and coding scheme via one or more pieces of hybrid automatic repeat request acknowledgement (HARQ-ACK) information and/or Channel State Information (CSI) included in the above-described uplink control information. The controller 240 may control to schedule initial transmission or retransmission of downlink data or generate downlink control information to request transmission of the uplink control information, and to transmit the above-described downlink control information to the UE via the wireless communication unit 210. The controller 240 may control to the above-described wireless communication unit 210 to receive (re)transmitted uplink data and/or uplink control information according to the above-described downlink control information.

Figure 3:
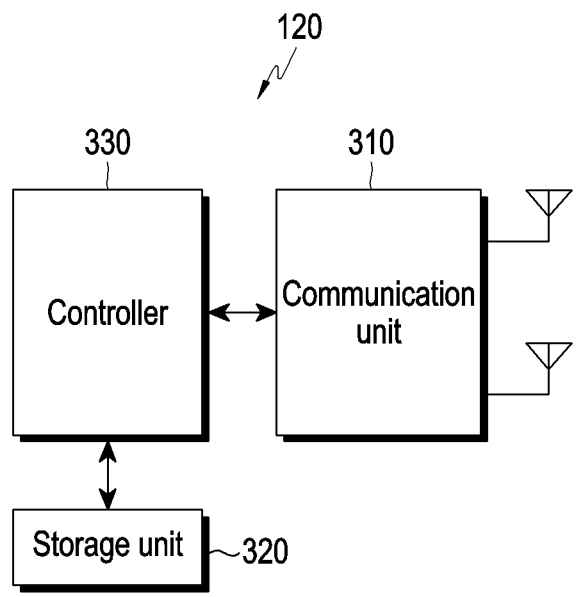
FIG. 3 is a diagram illustrating a structure of a UE in a wireless communication system according to an embodiment of the disclosure.

FIG. 3 is a diagram illustrating a structure of a UE in a wireless communication system according to an embodiment of the disclosure. The structure shown in FIG. 3 may be appreciated as a structure of a UE 120 or 130 in FIG. 1. The term " . . . unit" and the suffix " . . . er" as used herein denote a unit processing at least one function or operation and be implemented in hardware, software, or a combination thereof.

Referring to FIG. 3, the UE may include a wireless communication unit 310, a storage unit 320, and a controller 330.

The wireless communication unit 310 (this may be used interchangeably with a transceiver) may perform functions to transmit and receive signals via a radio channel. The wireless communication unit 310 may perform a function of conversion between a baseband signal and a bit stream according to a physical layer specification in a system. Upon signal transmission, the wireless communication unit 310 may encode and modulate a transmission bit string to generate complex symbols. Upon signal reception, the wireless communication unit 310 may reconstruct a transmission bit string by demodulating and decoding a received baseband signal. The wireless communication unit 310 may up-convert a baseband signal into an RF band signal and transmit the up-converted signal via an antenna, and down-convert an RF band signal received via the antenna into a baseband signal. The wireless communication unit 310 may include at least one of a transmission filter, a reception filter, an amplifier, a mixer, an oscillator, a DAC, or an ADC.

The wireless communication unit 310 may include a plurality of transmission and reception paths. Further, the wireless communication unit 310 may include at least one antenna array constituted of a plurality of antenna elements. In terms of hardware, the wireless communication unit 310 may be configured of a digital unit and an analog unit (e.g., a radio frequency integrated circuit (RFIC)). Here, the digital unit and the analog unit may be implemented in a single package. The wireless communication unit 310 may include a plurality of RF chains. The wireless communication unit 310 may include at least one antenna array constituted of the plurality of antenna elements to perform beamforming.

The wireless communication unit 310 may transmit and receive signals as described above. Thus, the whole or part of the wireless communication unit 310 may be referred to as a 'transmitter,' a 'receiver,' or a 'transceiver.' Further, transmission and reception performed via a radio channel in the following description may also mean performing the above-described processing by the wireless communication unit 310. According to an embodiment, the wireless communication unit 310 may include at least one transceiver.

The storage unit 320 may store a basic program, an application program, data such as configuration information, and/or the like for operating the UE. The storage unit 320 may be configured as a volatile memory, a non-volatile memory, or a combination of a volatile memory and a non-volatile memory. The storage unit 320 may provide stored data according to a request from the controller 330. According to an embodiment, the storage unit 320 may include at least one memory.

The controller 330 may control the overall operations of the UE. The controller 330 may transmit and receive signals via the wireless communication unit 310. The controller 330 may record and read data in/from the storage unit 320. The controller 330 may perform functions of a protocol stack required in a communication specification. To that end, the controller 330 may include at least one processor or microprocessor or may be part of a processor. According to an embodiment, the controller 330 may include at least one processor. According to an embodiment, a part of the wireless communication unit 310 and/or the controller 330 may be referred to as a communication processor (CP).

The controller 330 may control the UE to perform operations according to at least one of various embodiments to be described later. In an embodiment, the controller 330 may receive a downlink signal (a downlink control signal or downlink data) transmitted from a base station via a transceiver (e.g., the communication unit 310). In an embodiment, the controller 330 may determine a transmission result for the downlink signal. The transmission result, as feedback for the transmitted downlink signal, may include at least one of ACKnowledgement (ACK), negative ACK (NACK), or discontinuous transmission (DTX). In the disclosure, the transmission result may be referred to as various terms such as a reception state of the downlink signal, a reception result, a decoding result, HARQ-ACK information, and/or the like.

In an embodiment, the controller 330 may transmit an uplink signal as a response signal to the downlink signal to the base station via the transceiver. The uplink signal may include the transmission result for the downlink signal explicitly or implicitly. In an embodiment, the controller 330 may include, into uplink control information, at least one or more of the above-described HARQ-ACK information and/or channel state information (CSI), and transmit the uplink control information to the base station via the wireless communication unit 310. In an embodiment, the uplink control information may be transmitted via a uplink data channel together with uplink data or may be transmitted to the base station via the uplink data channel without the uplink data.

The controller 330 may perform a channel access procedure for a unlicensed band. In an embodiment, when the wireless communication unit 310 receives signals transmitted in the unlicensed band, the controller 330 may determine whether the above-described unlicensed band is in an idle state by comparing strength of the above-described received signal, and/or the like with a pre-defined threshold value or a threshold value determined as a value of a function with an input such as a bandwidth. The controller 330 may perform an access procedure for the unlicensed band in order to transmit a signal to the base station. The controller 330 may determine an uplink transmission resource for transmitting uplink control information using at least one of a result of performing the above-described channel access procedure and downlink control information received from the base station, and transmit the uplink control information to the base station via the transceiver.

The controller 330 may receive, from the base station via the wireless communication unit 310, higher layer signaling including configuration information required to receive one downlink control information (DCI) configured to allocate one or more data channels to one or more cells. The controller 330 also receives the DCI based on the configuration information and interprets fields included in the DCI. Also, the controller 330 may transmit a data channel to the base station or receive a data channel from the base station based on the configuration information and information fields included in the DCI.

Figure 4:
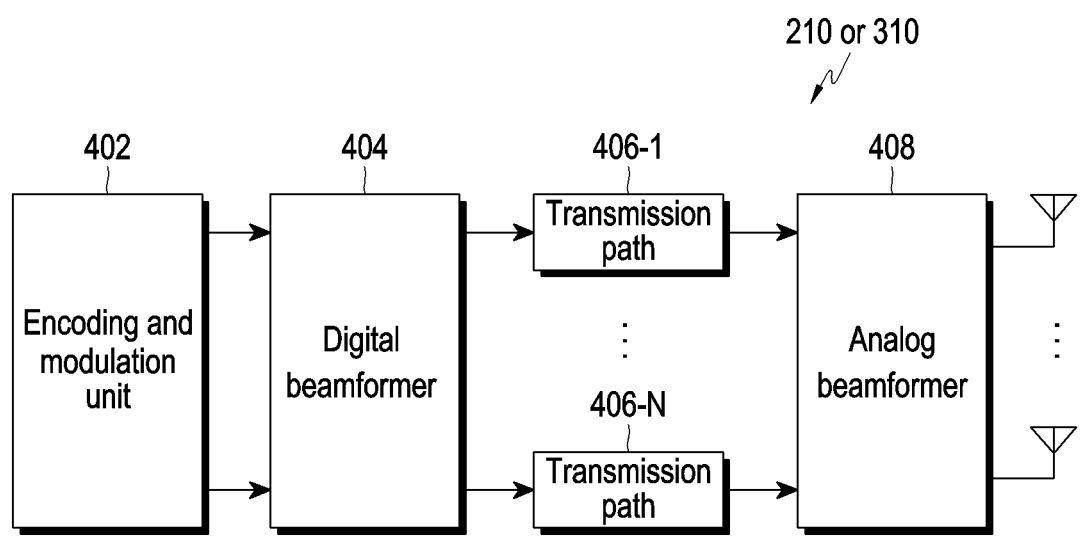
FIG. 4 is a diagram illustrating a structure of a communication unit in a wireless communication system according to an embodiment of the disclosure.

FIG. 4 is a diagram illustrating a structure of a communication unit in a wireless communication system according to various embodiments of the disclosure. FIG. 4 may illustrate an example of a detailed structure of a wireless communication unit 210 in FIG. 2 or a wireless communication unit 310 in FIG. 3. Specifically, FIG. 4 is a part of the wireless communication unit 210 in FIG. 2 or the wireless communication unit 310 in FIG. 3, and may illustrate components for performing beamforming.

Referring to FIG. 4, the wireless communication unit 210 or the wireless communication unit 310 may include an encoding and modulation unit 402, a digital beamformer 404, a plurality of transmission paths 406-1 to 406-N, and an analog beamformer 408.

The encoding and modulation unit 402 may perform channel encoding. For the channel encoding, at least one of a low density parity check (LDPC) code, a convolution code, and a polar code may be used. The encoding and modulation unit 402 may generate modulation symbols by performing constellation mapping on encoded bits.

The digital beamformer 404 may perform beamforming on a digital signal (e.g., modulation symbols). To this end, the digital beamformer 404 may multiply the modulation symbols by beamforming weights. Here, the beamforming weights may be used for changing a magnitude and a phase of a signal, and may be referred to as a 'precoding matrix', a 'precoder', and/or the like. The digital beamformer 404 may output digital beamformed (i.e., precoded) modulation symbols to the plurality of transmission paths 406-1 to 406-N. At this time, according to a multiple input multiple output (MIMO) transmission scheme, the modulation symbols may be multiplexed or the same modulation symbols may be provided to the plurality of transmission paths 406-1 to 406-N.

The plurality of transmission paths 406-1 to 406-N may convert digital beamformed digital signals into analog signals. To this end, each of the plurality of transmission paths 406-1 to 406-N may include an inverse fast fourier transform (IFFT) operation unit, a cyclic prefix (CP) inserter, a digital-to-analog converter (DAC), and an up-converter. The CP inserter is for an orthogonal frequency division multiplexing (OFDM) scheme, and may be excluded if another physical layer scheme (e.g., a filter bank multi-carrier (FBMC)) is applied. The plurality of transmission paths 406-1 to 406-N may provide an independent signal processing process for a plurality of streams generated through digital beamforming Depending on an implementation scheme, some of the components of the plurality of transmission paths 406-1 to 406-N may be used in common.

The analog beamformer 408 may perform beamforming on the analog signals from the plurality of transmission paths 406-1 to 406-N to connect it to at least one antenna array constituted of a plurality of antenna elements. To this end, the analog beamformer 408 may multiply the analog signals by beamforming weights. Here, the beamforming weights may be used to change a magnitude and a phase of a signal. The analog beamformer 408 may be variously configured according to a connection structure among the plurality of transmission paths 406-1 to 406-N and the antennas. For example, each of the plurality of transmission paths 406-1 to 406-N may be connected to one antenna array. As another example, the plurality of transmission paths 406-1 to 406-N may be connected to one antenna array. As still another example, the plurality of transmission paths 406-1 to 406-N may be adaptively connected to one antenna array or connected to two or more antenna arrays.

Hereinafter, a frame structure of a 5G system will be described in more detail with reference to the drawings.

Figure 5:
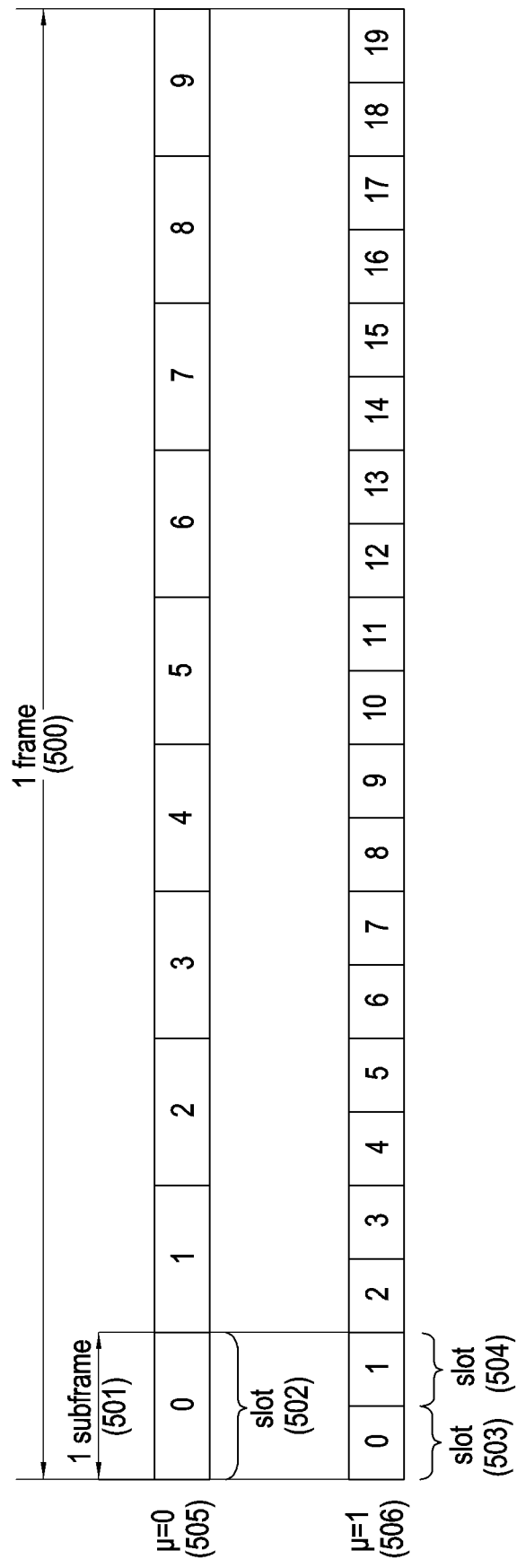
FIG. 5 is a diagram illustrating a structure of a frame, a subframe, and a slot in a 5G communication system.

FIG. 5 is a diagram illustrating a structure of a frame, a subframe, and a slot of a 5G communication system.

FIG. 5 shows an example of a structure of a frame 500, a subframe 501, and a slot (502, 503, or 504) in a case where $\mu=0$ (505) indicating subcarrier spacing of 5 kHz and a case where $\mu=1$ (506) indicating subcarrier spacing of 15 kHz. In the 5G system, one frame 500 may be defined as 10 ms. One subframe 501 may be defined as 1 ms, so the one frame 500 may be composed of a total of 10 subframes 501. The one subframe 501 may consist of one or a plurality of slots. One slot may be composed of or defined with 14 OFDM symbols. That is, the number ($N_{symb}^{slot}$) of symbols per slot is 14. At this time, the number ($N_{symb}^{subframe,\mu}$) of slots per one subframe 501 may vary according to a value (numerology) $\mu$ (505 or 506) indicating configuration for subcarrier spacing. For example, $\mu=0$, the one subframe 501 may consist of one slot 502, and if $\mu=1$, the one subframe 501 may consist of two slots 503 and 504.

The number of slots per subframe may vary according to a set value $\mu$ for subcarrier spacing, and the number ($N_{symb}^{frame,\mu}$) of slots per one frame may also vary accordingly. In an embodiment, each subcarrier spacing configuration value $\mu$ and $N_{symb}^{subframe,\mu}$ and $N_{symb}^{frame,\mu}$ according to $\mu$ may be defined as shown in Table 1 below. In the case of $\mu=2$, a UE may additionally receive a configuration related to a cyclic prefix from a base station via higher layer signaling.

TABLE 1

| $\mu$ | $\Delta f = 2^\mu \cdot 15$ [kHz] | Cyclic prefix | $N_{symb}^{slot}$ | $N_{slot}^{frame,\mu}$ | $N_{slot}^{subframe,\mu}$ |
|---|---|---|---|---|---|
| 0 | 15 | Normal | 14 | 10 | 1 |
| 1 | 30 | Normal | 14 | 20 | 2 |
| 2 | 60 | Normal, Extended | 14 | 40 | 4 |
| 3 | 120 | Normal | 14 | 80 | 8 |
| 4 | 240 | Normal | 14 | 160 | 16 |

In the disclosure, higher layer signaling or a higher signal may mean at least one of radio resource control (RRC) signaling, packet data convergence protocol (PDCP) signaling, or a media access control (MAC) control element (MAC CE). In addition, the higher layer signaling or the higher signal may include system information, e.g., a system information block (SIB), commonly transmitted to a plurality of UEs, and also include information (e.g., a physical broadcast channel (PBCH) payload) except for a master information block (MIB) among information transmitted via the PBCH. At this time, the MIB may also be expressed as being included in the above-described higher layer signaling or higher signal.

Figure 6:
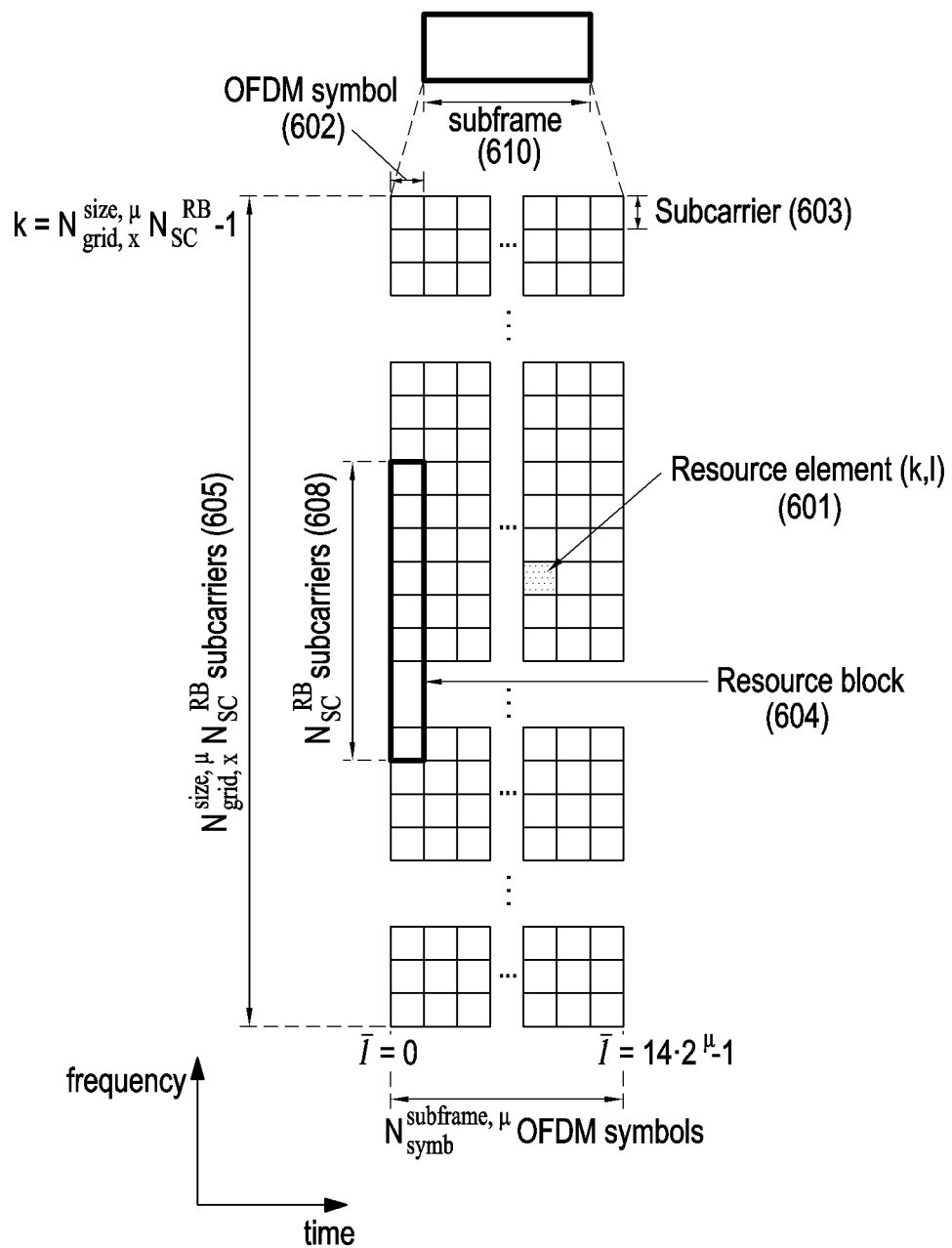
FIG. 6 is a diagram illustrating a basic structure of a time-frequency region in a 5G communication system.

FIG. 6 is a diagram illustrating a basic structure of a time-frequency region in a 5G communication system. That is, FIG. 6 is a diagram illustrating a basic structure of a time-frequency domain which is a radio resource region in which a data or control channel is transmitted in the 5G system.

In FIG. 6, a horizontal axis represents a time domain, and a vertical axis represents a frequency domain. A basic unit of a resource in a time and frequency domain is a Resource Element (RE) 601 and may be defined with one Orthogonal Frequency Division Multiplexing (OFDM) symbol 602 in the time domain and one subcarrier 603 in the frequency domain. In the frequency domain, $N_{sc}^{RB}$ (for example, 12) consecutive REs may constitute one Resource Block (RB) 604.

For each subcarrier spacing configuration value $\mu$ and carrier, one resource grid consisting of $N_{grid,x}^{size,\mu} N_{sc}^{RB}$ subcarriers and $N_{symb}^{subframe,\mu}$ OFDM symbols may be defined as starting from a Common Resource Block (CRB) $N_{grid,x}^{start,\mu}$ indicated via higher layer signaling, and there may be one resource grid for a given antenna port, subcarrier spacing configuration value $\mu$, and transmission direction (e.g., a downlink, a uplink, and a sidelink).

A base station may deliver a carrier bandwidth $N_{grid,x}^{size,\mu}$ and a start location of subcarrier spacing configuration $\mu$ for a uplink and a downlink to a UE via higher layer signaling (e,g, higher layer parameters 'carrierBandwidth' and 'offsetToCarrier'). In this case, the carrier bandwidth $N_{grid,x}^{size,\mu}$ may be configured by the higher layer parameter 'carrierBandwidth' for the subcarrier spacing configuration $\mu$, and the start location is a frequency offset of a subcarrier having the lowest frequency among available resources of the carrier for Point A and may be configured by 'offsetToCarrier' and expressed as the number of RBs. In an embodiment, $N_{grid,x}^{size,\mu}$ and $N_{grid,x}^{start,\mu}$ may be values in units of subcarriers. Upon receiving the parameters, the UE may know a start location and a size of a carrier bandwidth through $N_{grid,x}^{size,\mu}$ and $N_{grid,x}^{start,\mu}$. An example of higher layer signaling information to transmit $N_{grid,x}^{size,\mu}$ and $N_{grid,x}^{start,\mu}$ is as follows.

Higher Layer Signaling Information Element, SCS-SpecificCarrier

```
SCS-SpecificCarrier ::=    SEQUENCE {
  offsetToCarrier          INTEGER (0..2199),
  subcarrierSpacing        SubcarrierSpacing,
  carrierBandwidth         INTEGER (1..maxNrofPhysicalResourceBlocks),
  ...,
  [[
  txDirectCurrentLocation  INTEGER  (0..4095)  OPTIONAL   --Need S
  ]]
}
```

Here, Point A is a value which provides a common reference point for a resource block grid. In a case of PCell downlink, the UE may obtain Point A through a higher layer parameter 'offsetToPointA', and in all other cases, the UE may obtain Point A through an Absolute Radio Frequency Channel Number (ARFCN) set by a higher layer parameter 'absoluteFrequencyPointA'. Here, 'offsetToPointA' is a frequency offset between Point A and the lowest subcarrier of an RB having the lowest frequency among RBs overlapping with a Synchronization Signal/Physical Broadcast CHannel (SS/PBCH) selected or used by the UE in an initial cell selection process, and is expressed in RB units.

A number or index of a common resource block (CRB) is increased by 1 in a direction in which a value increases from 0 in a frequency domain. In this case, with respect to subcarrier spacing μ, a center of a subcarrier index 0 of the common resource block may coincide with Point A. A frequency domain common resource block index ($n_{CRB}^{\mu}$) and an RE of the subcarrier spacing μ may have a relationship of $n_{CRB}^{\mu} = \lfloor k/N_{sc}^{RB} \rfloor$. Here, k is a value defined relative to Point A. That is, k=0 is Point A.

A Physical Resource Block (PRB) with the subcarrier spacing μ is defined with a number or index from 0 to $N_{BWP,i}^{size,\mu}-1$ within a Bandwidth Part (BWP). Here, i is a number or index of the bandwidth part. A relationship between PRB ($n_{PRB}^{\mu}$) and CRB ($n_{CRB}^{\mu}$) in a bandwidth part i may be $n_{CRB}^{\mu} = n_{PRB}^{\mu} + N_{BWP,i}^{start,\mu}$. Here, $N_{BWP,i}^{start,\mu}$ is the number of CRBs from a CRB 0 to a first RB where the bandwidth part i starts.

BWP

Next, a bandwidth part configuration in a 5G communication system will be described in detail with reference to the drawings.

Figure 7:
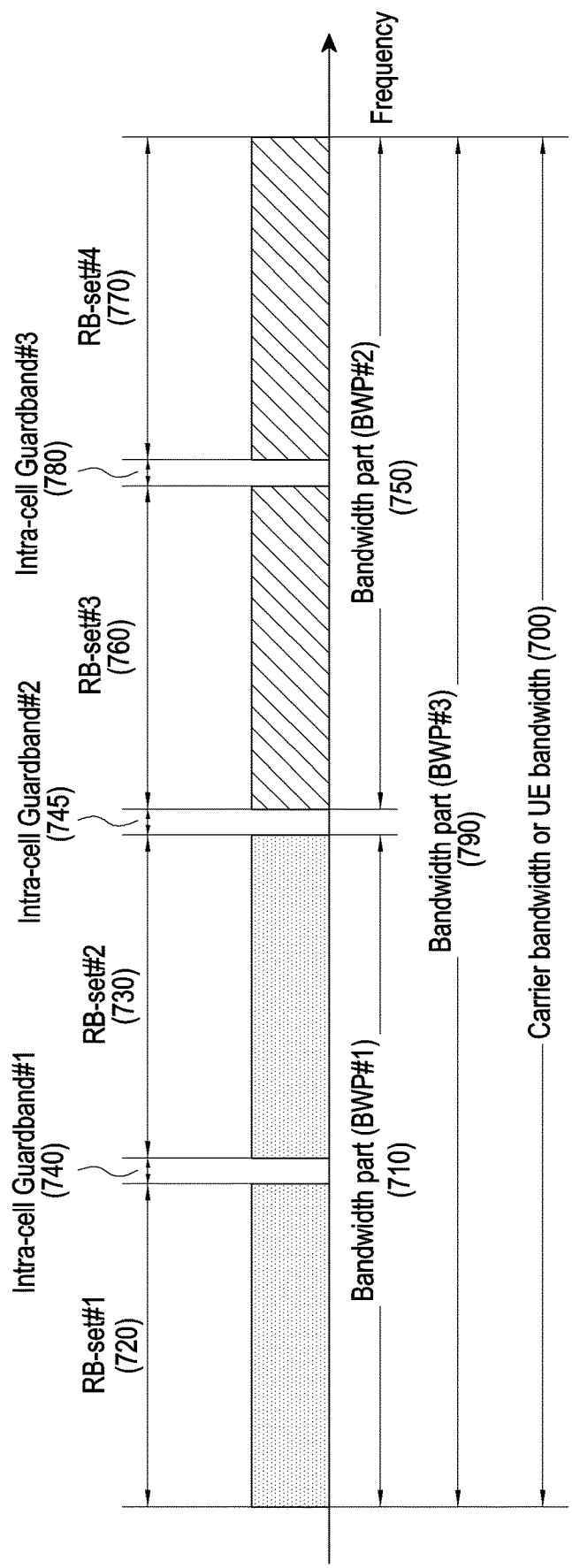
FIG. 7 is a diagram illustrating an example of configuring a bandwidth part and an intra-cell guard interval in a 5G communication system.

FIG. 7 is a diagram illustrating an example of configuring a bandwidth part and an intra-cell guard interval in a 5G communication system.

Referring to FIG. 7, a plurality of bandwidth parts, i.e., a bandwidth part #1 (BWP #1) 710, a bandwidth part #2 (BWP #2) 750, and a bandwidth part #3 (BWP #3) 790, within a carrier bandwidth or a UE bandwidth 700, may be configured. The bandwidth part #3 790 may occupy the entire UE bandwidth 700. The bandwidth part #1 710 and the bandwidth part #2 750 may occupy the lower half and the upper half of the UE bandwidth 700, respectively.

A base station may configure one or a plurality of bandwidth parts in a uplink or a downlink to a UE, and one or more of the following higher layer parameters may be set for each bandwidth part. In this case, configuration for a bandwidth part may be independent for the uplink and the downlink.

Example of Higher Layer Signaling Information Element, BWP

```
BWP ::=                  SEQUENCE {
    bwp-Id                   BWP-Id,
    locationAndBandwidth     INTEGER (1..65536),
    subcarrierSpacing        ENUMERATED {n0, n1, n2, n3, n4, n5},
    cyclicPrefix             ENUMERATED { extended }
}
```

Here, 'bwp-Id' may mean a bandwidth part identifier, 'locationAndBandwidth' may indicate a frequency domain location and a bandwidth of the bandwidth part, 'subcarrierSpacing' may indicate subcarrier spacing used in the bandwidth part, and 'cyclicPrefix' may indicate whether an extended cyclic prefix (CP) is used or a normal CP is used within the bandwidth part.

Various BWP-related parameters other than the parameters may be configured for the UE. The parameters may be transferred from the base station to the UE via higher layer signaling, e.g., RRC signaling. At least one bandwidth part among the one or more configured bandwidth parts may be activated during given time. Indication to activate a configured bandwidth part may be transferred from the base station to the UE semi-statically through RRC signaling or dynamically through downlink control information (DCI) used for scheduling a Physical Downlink Shared Channel (PDSCH) or a Physical Uplink Shared Channel (PUSCH).

According to an embodiment, before RRC connected, the UE may be configured with an initial bandwidth part (BWP) for initial access by the base station via a Master Information Block (MIB). More specifically, the UE may receive configuration information on a search space and a control resource set (CORESET) in which a Physical Downlink Control Channel (PDCCH) may be transmitted via the MIB in an initial access phase. In this case, the control resource set and the search space configured through the MIB may be regarded as an identity (ID) 0. The base station may provide the UE with at least one piece of information, such as frequency allocation information, time allocation information, and numerology for a control resource set #0, via the MIB.

Further, the base station may notify the UE of configuration information on a monitoring period and occasion for the control resource set #0, i.e., configuration information for a search space #0, via the MIB. The UE may regard a frequency domain configured as the control resource set #0 obtained from the MIB, as an initial bandwidth part for an initial access. In this case, an identifier (ID) of the initial bandwidth part may be regarded as 0.

The configuration of the bandwidth part supported in 5G described above may be used for various purposes.

According to an embodiment, if a bandwidth supported by the UE is narrower than a system bandwidth, data transmission and reception of the UE for the system bandwidth may be supported via the bandwidth part configuration. For example, the base station may configures the UE with a frequency domain location of the bandwidth part so that the UE may transmit and receive data at a specific frequency location within the system bandwidth.

According to an embodiment, for the purpose of supporting different numerologies, the base station may configure the UE with a plurality of bandwidth parts. For example, to support data transmission and reception using subcarrier spacing of 15 kHz and subcarrier spacing of 30 kHz for the UE, the base station may configure the UE with two bandwidth parts having subcarrier spacing of 15 kHz and 30 kHz. The different bandwidth parts may be frequency division multiplexed and, if data is transmitted and received at specific subcarrier spacing, the bandwidth part configured at the specific subcarrier spacing may be activated.

According to an embodiment, for the purpose of reducing power consumption of the UE, the base station may configure the UE with bandwidth parts having different sizes of bandwidths. For example, if the UE supports a very large bandwidth, e.g., a bandwidth of 100 MHz, and transmits and receives data always using the bandwidth, significant power consumption may occur. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth, e.g., a bandwidth part of 20 MHz, to the UE. In a no-traffic situation, the UE may perform monitoring in the bandwidth of 20 MHz and, if data occurs, the UE may transmit and receive data in the bandwidth of 100 MHz according to indication from the base station.

As described above, UEs before RRC connected may receive configuration information on an initial bandwidth part via an MIB in an initial access phase. More specifically, a UE may be configured with a control resource set (CORE-SET) for a PDCCH from an MIB of a PBCH. The bandwidth of the control resource set configured via the MIB may be regarded as an initial bandwidth part, and the UE may receive a Physical Downlink Shared Channel (PDSCH) in which an SIB is transmitted, via the initial bandwidth part. Specifically, the UE may detect a PDCCH on a search space and a control resource set within the initial bandwidth part configured by the MIB, receive Remaining System Information (RMSI) or an System Information Block 1 (SIB1) required for the initial access via a PDSCH scheduled by the PDCCH, and obtain configuration information on a uplink initial bandwidth part via the SIB1 (or the RMSI). The initial bandwidth part may be utilized for other system information (OSI), paging, and a random access as well as for receiving the SIB.

If the UE is configured with one or more bandwidth parts, the base station may indicate, to the UE, a change in bandwidth part using a bandwidth part indicator field in the DCI.

For example, if a currently activated bandwidth part of the UE is the bandwidth part #1 710 in FIG. 7, the base station may indicate, to the UE, the bandwidth part #2 750 using the bandwidth part indicator in the DCI, and the UE may change a bandwidth part change to the indicated bandwidth part #2 750 based on the bandwidth part indicator in the received DCI.

As described above, because DCI-based bandwidth part changing may be indicated by the DCI scheduling a physical downlink shared channel (PDSCH) or a physical uplink shared channel (PUSCH), the UE, upon receiving a bandwidth part change request, needs to be able to receive or transmit the PDSCH or PUSCH, scheduled by the DCI, in the changed bandwidth part without trouble. The requirements, specified in the standard, for delay time $T_{BWP}$ required upon changing a bandwidth part may be defined as shown in Table 2 below.

TABLE 2

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note [1]Depends on UE capability.
Note [2]If the BWP switch involves changing of SCS, the BWP switch delay is determined by the larger one between the SCS before BWP switch and the SCS after BWP switch.

A requirement for bandwidth part change delay time may support a type 1 or a type 2 according to a capability of a UE. The UE may report a supportable bandwidth part delay time type to a base station.

If the UE receives, in slot n, DCI including a bandwidth part change indicator according to the above-described requirement for bandwidth part change delay time, the UE may complete a change to a new bandwidth part, indicated by the bandwidth part change indicator, at a time not later than slot n+$T_{BWP}$, and may perform transmission and reception on a data channel scheduled by the DCI in the changed, new bandwidth part. Upon intending to schedule a data channel in the new bandwidth part, the base station may determine time domain resource allocation for the data channel considering the bandwidth part change delay time $T_{BWP}$ of the UE. In other words, when scheduling the data channel with the new bandwidth part, in a method for determining the time domain resource allocation for the data channel, the base station may schedule the data channel after the bandwidth part change delay time. Thus, the UE may not expect that the DCI indicating the bandwidth part change indicates a slot offset (K0 or K2) smaller than the bandwidth part change delay time $T_{BWP}$.

If the UE has received the DCI (e.g., a DCI format 1_1 or 0_1) indicating the bandwidth part change, the UE may perform no transmission or reception during a time period from a third symbol of a slot in which a PDCCH including the DCI has been received to a start symbol of a slot indicated by a slot offset (K0 or K2) indicated by a time domain resource allocation indicator field in the DCI. For example, if the UE receives the DCI indicating the bandwidth part change in the slot n, and the slot offset indicated by the DCI is K, the UE may perform no transmission or reception from a third symbol of the slot n to a symbol before a slot n+K (i.e., a last symbol of a slot n+K−1).

The UE may configured with an intra-cell guard interval for one or more cells (or a carrier). In this case, the configuration of the intra-cell guard interval may be for each of a downlink guard interval and a uplink guard interval. FIG. 7 shows an example in which a carrier bandwidth or the UE bandwidth 700 is configured with a plurality of intra-cell guard intervals, i.e., an intra-cell guard interval #1 740, an intra-cell guard interval #2 745, and an intra-cell guard interval #3 780. More specifically, the UE may be configured with each of $N_{RB\text{-}set,x}-1$ uplink/downlink intra-cell guard intervals in a cell or a carrier via, for example, 'IntraCell-GuardBand-r16' which is higher layer signaling which may be configured as follows. Here, x=DL or UL.

Higher Layer Signaling Information Element, IntraCellGuardBand-r16

```
IntraCellGuardBand-r16  ::= SEQUENCE (SIZE (1..ffsValue)) OF GuardBand-r16
GuardBand-r16           ::= SEQUENCE {
    startCRB-r16            INTEGER (0..ffsValue),
    nrofCRBs-r16            INTEGER (1..ffsValue)
}
```

Here, 'startCRB' is a start CRB index ($GB_{s,x}^{start,\mu}$) of an intra-cell guard interval, and 'nrofCRBs' is length of the intra-cell guard interval and may be expressed as the number (N) of CRBs or the number (N) of PRBs. In this case, 'nrofCRBs' may be a value indicating a last CRB index ($GB_{s,x}^{end,\mu}$) of the intra-cell guard interval. In other words, the 'GuardBand' may include one or more (startCRB, nrofCRBs) values, the first value of the two values (every two values) may mean the lowest CRB index, $GB_{s,x}^{start,\mu}$, of the intra-cell guard interval, and the second value may mean the highest CRB index, $GB_{s,x}^{end,\mu}$ of the intra-cell guard interval. In this case, it is also possible to determine that $GB_{s,x}^{end,\mu}=GB_{s,x}^{start,\mu}+N$. Here, it is also possible for the CRB index to be expressed as a PRB index. The UE may use the number of (startCRB, nrofCRBs) pairs included in the 'GuardBand' or sequence length of the 'GuardBand' (e.g., sequence length/2) to determine the number ($N^{RB\text{-}set,x}-1$) of intra-cell guard intervals configured from the base station. In this case, it is also possible for the UE to be configured that there is no downlink/uplink intra-cell guard interval within a cell or a carrier, or that a guard interval is 0 via 'IntraCellGuardBand-r16'. For example, if at least 'startCRB-r16' has a negative value such as −1 or has a value other than an integer, the UE may determine that that there is no downlink/uplink intra-cell guard interval within the cell or the carrier via the configuration.

As described above, the UE configured with the intra-cell guard interval may a resource region excluding the intra-cell guard interval from the carrier or the configured bandwidth part into a resource set (i.e., an RB-set) or a resource region which includes $N_{RB\text{-}set,x}$ RBs, and perform uplink/downlink transmission and reception using a resource included in the resource set. In this case, a resource region of each resource set may be determined as follows.

Start CRB index of a first resource set (a resource set index 0): $RB_{0,x}^{start,\mu}=N_{grid,x}^{start,\mu}$ Last CRB index of a last resource set (a resource set index $N_{RB\text{-}set}$): $RB_{N_{RB\text{-}set},x}^{start,\mu}=N_{grid,x}^{start,\mu}+N_{grid,x}^{size,\mu}$ Start CRB index of a resource set other than the above: $RB_{s+1,x}^{start,\mu}=GB_{s,x}^{end,\mu}+1$ End CRB index of the resource set other than the above: $RB_{s,x}^{end,\mu}=GB_{s,x}^{start,\mu}-1$ Here, s=0, 1, . . . , $N_{RB\text{-}set,x}-1$, and $N_{grid,x}^{start,\mu}$ and $N_{grid,x}^{size,\mu}$ are a first available RB and bandwidth of the carrier according to subcarrier spacing configuration µ, and may be configured via higher layer signaling.

FIG. 7 shows an example in which a carrier bandwidth or the UE bandwidth 700 are configured with three intra-cell guard intervals and four ($N_{RB\text{-}set}=4$) resource sets, i.e., a resource set #1 720, a resource set #2 730, a resource set #3 760, and a resource set #4 770.

The UE may perform uplink/downlink transmission and reception using a resource included in a resource set and an inter-call guard interval. For example, if a uplink/downlink transmission and reception resource configured or scheduled by the base station is allocated within two consecutive resource sets, the UE may use the intra-cell guard interval included between the resource sets to perform uplink/downlink transmission and reception.

If the UE is not configured with an intra-cell guard interval via higher layer signaling 'intraCellGuardBandx' (here, x=DL or UL), the UE may use an intra-cell guard interval pre-defined with the base station to determine an intra-cell guard interval and a resource set resource region. In this case, the intra-cell guard interval may be pre-defined according to subcarrier spacing and a size of a carrier or bandwidth part. In addition, the intra-cell guard interval may be independently pre-defined for a downlink and a uplink, and an intra-cell guard interval within the downlink and an intra-cell guard interval within the uplink may be the same. Here, that the intra-cell guard interval is pre-defined may mean that for each intra-cell guard interval, a start CRB index $GB_{s,x}^{start,\mu}$ of the intra-cell guard interval, a last CRB index $GB_{s,x}^{end,\mu}$ of the intra-cell interval, a lowest CRB index $GB_{s,x}^{start,\mu}$ of the intra-cell guard interval, or a highest CRB index $GB_{s,x}^{end,\mu}$ of the intra-cell guard interval is pre-defined.

According to an embodiment, an example in which the UE is configured with at least one guard interval among uplink/downlink guard intervals in a specific cell or carrier is as follows. In a case of a cell performing a communication via a unlicensed band, the base station may configure one or more guard intervals within a bandwidth or a bandwidth part according to, for example, a channel size of the unlicensed band. For example, a unlicensed band of 5 GHz band may be composed of a plurality of channels having a size of 20 MHz, and a guard interval may exist between respective channels. So, if the base station and the UE intend to perform a communication via a bandwidth or bandwidth part greater than 20 MHz, one or more guard intervals may be configured within the bandwidth or bandwidth part.

For example, for the base station and the UE performing a communication via the unlicensed band having a channel size of 20 MHz, if a size of at least one of the bandwidth parts 710, 750, and 790 configured with the UE from the base station is greater than 20 MHz, the UE may be configured with one or more intra-cell guard intervals, and may be configured in order that each bandwidth part may be configured with a plurality of resource sets having a size of 20 MHz according to the configuration of the intra-cell guard interval. For example, the UE may be configured with the resource set #1 720 and the resource set #2 730 and one intra-cell guard interval #1 740 for the bandwidth part #1 710 in FIG. 7. The base station and the UE may perform a channel access procedure (or listen-before-talk (LBT)) for each resource set, and may perform uplink/downlink transmission and reception using a resource set whose channel access is successful. At this time, if the channel access procedure is successful in both of two consecutive resource sets (e.g., the resource set #1 720 and the resource set #2 730), a resource within the intra-cell guard interval #1 740 included between the resource sets may also be used for uplink/downlink transmission and reception. If the channel access procedure fails in at least one resource set of the two consecutive resource sets (e.g., the resource set #1 720 and the resource set #2 730), the resource within the intra-cell guard interval #1 740 included between the resource sets may not be used for the uplink/downlink transmission and reception.

Next, an SS/PBCH block in 5G will be described below.

The SS/PBCH block may mean a physical layer channel block composed of a Primary SS (PSS), a Secondary SS (SSS), and a PBCH. Specifically, it is as follows.

PSS: may be a signal that serves as a reference for downlink time/frequency synchronization and provide part of information on a cell ID.

SSS: may serve as a reference for downlink time/frequency synchronization, and provide the rest of the information on the cell ID, which a PSS does not provide. Additionally, it may serve as a Reference Signal (RS) for demodulation of a PBCH.

PBCH: may provide essential system information necessary for the UE to transmit and receive a data channel and a control channel. The essential system information may include at least one of search space-related control information indicating radio resource mapping information on a control channel, or scheduling control information about a separate data channel for transmitting system information.

SS/PBCH block: is composed of a combination of a PSS, an SSS, and a PBCH. One or more SS/PBCH blocks may be transmitted within 5 ms, and each transmitted SS/PBCH block may be distinguished with an index.

The UE may detect a PSS and an SSS in an initial access phase and may decode a PBCH. The UE may obtain an MIB from the PBCH and be therefrom configured with a control resource set #0 (which may correspond to a control resource set whose control resource set index is 0). The UE may perform monitoring on the control resource set #0, assuming that a selected SS/PBCH block (or a SS/PBCH block for which PBCH decoding is successful) and a Demodulation Reference signal (DMRS) transmitted in the control resource set #0 are quasi-co-located (QCLed). The UE may obtain system information via downlink control information transmitted in the control resource set #0. The UE may obtain configuration information related to a Random Access Channel (RACH) required for an initial access from the obtained system information. The UE may transmit a Physical RACH (PRACH) to the base station considering the selected SS/PBCH block index, and the base station receiving the PRACH may obtain the SS/PBCH block index selected by the UE. The base station may know which block the UE has selected from the SS/PBCH blocks and monitors the control resource set #0 related thereto.

DCI

Next, downlink control information (DCI) in a 5G system will be described in detail.

Scheduling information of uplink data (or a PUSCH) or downlink data (or a PDSCH) in the 5G system is transferred from a base station to a UE via the DCI. The UE may monitor or detect at least one of a DCI format for fallback and a DCI format for non-fallback for the PUSCH or the PDSCH. The DCI format for fallback may be composed of fields predefined between the base station and the UE, and the DCI format for non-fallback may include configurable fields.

DCI may be transmitted via a PDCCH which is a physical downlink control channel, after passing a channel coding and modulation process. A Cyclic Redundancy Check (CRC) may be added to a payload of the DCI, and the CRC may be scrambled with (by) a Radio Network Temporary Identifier (RNTI) which corresponds to identity of the UE. Different RNTIs may be used for the purposes of the DCI, e.g., UE-specific data transmission, power control command, or random access response. That is, the RNTI is not explicitly transmitted, but the RNTI is included in a CRC calculation process and transmitted. Upon receiving the DCI transmitted on the PDCCH, the UE may check the CRC using the allocated RNTI, and if a the CRC check result is correct, the UE may be aware that the DCI has been transmitted to the UE.

In an embodiment, DCI scheduling a PDSCH for System Information (SI) may be scrambled with an SI-RNTI. DCI scheduling a PDSCH for a Random Access Response (RAR) message may be scrambled with an RA-RNTI. DCI scheduling a PDSCH for a paging message may be scrambled with a P-RNTI. DCI notifying a Slot Format Indicator (SFI) may be scrambled with an SFI-RNTI. DCI notifying Transmit Power Control (TPC) may be scrambled with a TPC-RNTI. DCI scheduling UE-specific PDSCH or PUSCH may be scrambled with a Cell RNTI (C-RNTI).

A DCI format 0_0 may be used as a fallback DCI for scheduling a PUSCH, and in this case, CRC may be scrambled with at least one of a C-RNTI, a CS-RNTI, and an MCS-C-RNTI. The DCI format 0_0 having a CRC scrambled with at least one RNTI of the C-RNTI, the configured scheduling (CS)-RNTI, and the modulation coding scheme (MCS)-C-RNTI may include, for example, at least one of the following information.

Control information format identifier (Identifier for DCI formats): Identifier for identifying a DCI format. For example, a UE receiving DCI via an 1-bit identifier may identify that the DCI is a UL DCI format (e.g., a DCI format 0_1) if an identifier value is 0, and may identify that the DCI is a DL DCI format (e.g., a DCI format 1_0) if the identifier value is 1.

Frequency domain resource allocation (Frequency domain resource assignment): includes $\lceil \log_2(N_{RB}^{UL,BWP}(N_{RB}^{UL,BWP}+1)/2) \rceil$ bits indicating RBs which are a frequency domain resource allocated in a resource allocation type 1 scheme. Here, if a UE monitors a DCI format 0_0 in a common search space, $N_{RB}^{UL,BWP}$ may be a size of an initial uplink bandwidth part. If the DCI format 0_0 is monitored in a UE-specific search space, $N_{RB}^{UL,BWP}$ may be a size of a currently activated uplink bandwidth part. In other words, a bandwidth part which determines a size of a frequency domain resource allocation field may be different according to a search space in which a fallback DCI format is transmitted.

In an embodiment, if PUSCH hopping is performed, $N_{UL\_hop}$ Most Significant Bits (MSBs) among $\lceil \log_2(N_{RB}^{UL,BWP}(N_{RB}^{UL,BWP}+1)/2) \rceil$ bits may be used to indicate a frequency offset. Here, if $N_{UL\_hop}=1$, it means that two offsets are configured by higher layer signaling, if $N_{UL\_hop}=2$, it means that four offsets are configured by higher layer signaling, and $\lceil \log_2(N_{RB}^{UL,BWP}(N_{RB}^{UL,BWP}+1)/2) \rceil - N_{UL\_hop}$ bits may indicate a frequency domain resource region allocated according to the following resource allocation type 1.

According to an embodiment, if PUSCH hopping is not performed, $\lceil \log_2(N_{RB}^{UL,BWP}(N_{RB}^{UL,BWP}+1)/2) \rceil$ bits may provide a frequency domain resource region allocated according to the resource allocation type 1.

Time domain resource allocation (Time domain resource assignment): with 4 bits, may indicate a row index of a time domain resource allocation table including a PUSCH mapping type, a PUSCH transmission slot offset, a PUSCH start symbol, and the number of PUSCH transmission symbols. The time domain resource allocation table may be configured by higher layer signaling or may be pre-configured between the base station and the UE.

Frequency hopping flag: with 1 bit, may indicate that PUSCH hopping is performed (enabled) or that PUSCH hopping is not performed (disabled).

Modulation and coding scheme (MCS): may indicate a modulation and coding scheme used for data transmission.

New data indicator (NDI): may indicate whether it is HARQ initial transmission or retransmission.

Redundancy version (RV): may indicate a redundancy version of HARQ.

HARQ process number: may indicate a process number of HARQ.

TPC command; may indicate a transmission power control command for a scheduled PUSCH.

Padding bit: is a field for matching a size (total number of bits) with another DCI format (e.g., a DCI format 1_0), and is inserted as 0 if necessary.

UL/SUL indicator: 1 bit, if a cell has two or more ULs and a size of DCI format 1_0 before adding a padding bit is larger than a size of DCI format 0_0 before adding the padding bit, the UL/SUL indicator has 1 bit, otherwise, the UL/SUL indicator is not present or is 0 bit. If the UL/SUL indicator is present, the UL/SUL indicator may be located at a last bit of the DCI format 0_0 after the padding bit.

ChannelAccess-CPext: with 2 bits, may indicate a channel access type and CP extension in a cell operating in a unlicensed band. In a case of a cell operating in a licensed band, it is not present or is 0 bit.

For DCI formats other than the DCI format 0_0, 3 GPP standardization document may be referred to.

Time Domain Resource Allocation

Hereinafter, time domain resource allocation for a data channel in a 5G communication system will be described.

A base station may configure a table for time domain resource allocation for a downlink data channel (PDSCH) and a uplink data channel (PUSCH) with a UE via higher layer signaling (e.g., RRC signaling), or use a table for time domain resource allocation pre-defined between the base station and the UE such as Table 3.

In an embodiment, in a case of fallback DCI, the UE may use a pre-defined table such as Table 3, and in a case of non-fallback DCI, the UE may use a table configured via higher layer signaling.

TABLE 3

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

In this case, for time domain resource allocation configured via higher layer signaling, a table consisting of maxNrofDL-Allocations=16 entries may be configured for a PDSCH, and a table consisting of maxNrofUL-Allocations=16 entries may be configured for a PUSCH. In an embodiment, each table may include at least one of PDCCH-to-PDSCH slot timing (corresponding to a time interval in slot units between a time point when a PDCCH is received and a time point when a PDSCH scheduled by the received PDCCH is transmitted, denoted as $K_0$) or PDCCH-to-PUSCH slot timing (corresponding to a time interval in slot units between a time point when a PDCCH is received and a time point when a PUSCH scheduled by the received PDCCH is transmitted, denoted as $K_2$), a location (S) and length (L) of a start symbol at which a PDSCH or PUSCH is scheduled in a slot, or a mapping type of a PDSCH or a PUSCH.

If higher layer signaling is used, for example, an information element as shown in Table 4 below may be notified from a base station to a UE.

TABLE 4

```
PDSCH-TimeDomainResourceAllocationList information element
PDSCH-TimeDomainResourceAllocationList        ::=          SEQUENCE
(SIZE(1..maxNrofDL-Allocations)) OF PDSCH-TimeDomainResourceAllocation
PDSCH-TimeDomainResourceAllocation ::=       SEQUENCE {
    k0                      INTEGER(0..32)          OPTIONAL,    -- Need S
mappingType                           ENUMERATED {typeA, typeB},
startSymbolAndLength                  INTEGER (0..127)
}
PUSCH-TimeDomainResourceAllocation information element
PUSCH-TimeDomainResourceAllocationList ::=   SEQUENCE
(SIZE(1..maxNrofUL-Allocations)) OF PUSCH-TimeDomainResourceAllocation
PUSCH-TimeDomainResourceAllocation ::=       SEQUENCE {
    k2                      INTEGER(0..32)          OPTIONAL,    -- Need S
mappingType                           ENUMERATED {typeA, typeB},
    startSymbolAndLength                  INTEGER (0..127)
}
```

Here, 'k0' may be an offset in units of slots and indicate PDCCH-to-PDSCH timing, 'k2' may be an offset in units of slots and indicate PDCCH-to-PUSCH timing, 'mappingType' may indicate a mapping type of a PDSCH or a PUSCH, and 'startSymbolAndLength' may indicate a start symbol and length of the PDSCH or the PUSCH.

The base station may notify the UE of one of the entries of the time domain resource allocation table via L1 signaling. For example, it may be indicated by a 'time domain resource allocation' field in DCI. The UE may obtain time domain resource allocation for a PDSCH or a PUSCH based on a field in DCI received from the base station.

Frequency Domain Resource Allocation

Hereinafter, frequency domain resource allocation for a data channel in a 5G communication system will be described.

As a method of indicating frequency domain resource allocation for a downlink data channel (PDSCH) and a uplink data channel (PUSCH), two types, i.e., a resource allocation type 0 and a resource allocation type 1, are supported.

The resource allocation type 0 may be a method of allocating a resource in units of a Resource Block Group (RBG) composed of consecutive P number of RBs, and may be notified from the base station to the UE in a form of a bitmap. At this time, the RBG may be composed of a set of consecutive Virtual RBs (VRBs), and a size P of the RBG (Nominal RBG size P) may be determined based on a value set by a higher layer parameter 'rbg-Size' and a size value of a bandwidth part defined in Table 5 below.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Here, the total number, $N_{RBG}$, of RBGs of a bandwidth part i of size $N_{BWP,i}^{size}$ is $N_{RBG} = \lceil (N_{BWP,i}^{size} + (N_{BWP,i}^{start} \bmod P))/P \rceil$. Here, a size of a first RBG is $RBG_0^{size} = P - N_{BWP,i}^{start} \bmod P$. If $(N_{BWP,i}^{start} + N_{BWP,i}^{size}) \bmod P > 0$, of a last RBG is $RBG_{last}^{size} = (N_{BWP,i}^{start} + N_{BWP,i}^{size}) \bmod P$, and otherwise, $RBG_{last}^{size}$ is P. A size of a RBG other than the above is P. Each bit of a bitmap of a $N_{RBG}$-bit size may correspond to each RBG. RBGs may be indexed in an order of increasing frequency, starting from a lowest frequency location of a bandwidth part. Among $N_{RBG}$ RBGs in the bandwidth part, an RBG #0 to an RBG #($N_{RBG}$−1) may be mapped from an MSB to an LSB of the RBG bitmap. If a specific bit value in the bitmap is 1, the UE may determine that an RBG corresponding to the corresponding bit value is allocated, and if the specific bit value in the bitmap is 0, the UE may determine that the RBG corresponding to the corresponding bit value is not allocated.

The resource allocation type 1 may be a method of allocating a resource with a start location and length for consecutively allocated VRBs, and at this time, interleaving or non-interleaving may be additionally applied to the consecutively allocated VRBs. A resource allocation field of the resource allocation type 1 may consist of a Resource Indication Value (RIV), and the RIV may consist of a start point ($RB_{start}$) of a VRB and length ($L_{RBs}$) of consecutively allocated RBs. $RB_{start}$ may be a first PRB index at which resource allocation starts, and $L_{RBs}$ may be length or number of consecutively allocated PRBs. More specifically, the RIV in the bandwidth part of the size $N_{BWP}^{size}$ may be defined as follows.

If $(L_{RBs} - 1) \le \left\lfloor \frac{N_{BWP}^{size}}{2} \right\rfloor$ then $RIV = N_{BWP}^{size}(L_{RBs} - 1) + RB_{start}$ Else, $RIV = N_{BWP}^{size}(N_{BWP}^{size} - L_{RBs} - 1) + (N_{BWP}^{size} - 1 - RB_{start})$ where, $L_{RBs} \ge 1$ and shall not exeed $N_{BWP}^{size} - RB_{start}$.

In this case, $N_{BWP}^{size}$ may vary according to a search space in which a fallback DCI format (e.g., a DCI format 0_0 or a DCI format 1_0) is transmitted. For example, if the DCI format 0_0, which is fallback DCI format among DCI (i.e., a uplink grant) for configuring or scheduling uplink transmission, is transmitted in a common search space (CSS), a size, $N_{BWP,0}^{size}$ or $N_{BWP}^{initial}$, of an initial bandwidth part may be used as $N_{BWP}^{size}$. Similarly, if the DCI format 1_0, which is fallback DCI format among DCI for configuring or scheduling downlink reception, is transmitted in a common search space (CSS), $N_{BWP}^{size}$ and/or $N_{BWP}^{initial}$ is a size of a control resource set #0 if the control resource set #0 is configured in a cell, and $N_{BWP}^{size}$ and/or $N_{BWP}^{initial}$ is a size of an initial downlink bandwidth part if the control resource set #0 is not configured.

In this case, if the DCI format 0_0 or the DCI format 1_0 which is the fallback DCI format is transmitted in a UE-specific search space (UE-specific search space: USS), or if a size of the fallback DCI format transmitted in the UE-specific search space is based on a size of an initial uplink bandwidth part or a size of initial downlink bandwidth part, but the DCI is applied to another active bandwidth part of a size $N_{BWP}^{active}$, an RIV corresponds to $RB_{start}=0$, K, 2K, . . . , $(N_{BWP}^{initial}-1)$K and $L_{RBs}$=K, 2K, . . . , $N_{BWP}^{initial}$K, and the RIV is defined as follows.

If $(L'_{RBs}-1) \le \lfloor N_{BWP}^{initial}/2 \rfloor$ then $RIV=N_{BWP}^{initial}(L'_{RBs}-1)+RB'_{start}$, Else, $RIV=N_{BWP}^{initial}(N_{BWP}^{initial}-L'_{RBs}-1)+(N_{BWP}^{initial}-1-RB'_{start})$ where, $L'_{RBs}=L_{RBs}/K$, $RB'_{start}=RB_{start}/K$, $L'_{RBs}$ shall not exceed $N_{BWP}-RB'_{start}$ In this case, if $N_{BWP}^{active} > N_{BWP}^{initial}$, K is the largest value that satisfies initial $K \le \lfloor N_{BWP}^{active}/N_{BWP}^{initial} \rfloor$ among a set {1, 2, 4, 8}. Otherwise (i.e., $N_{BWP}^{active} \le N_{BWP}^{initial}$), K is 1.

The base station may configure the UE with a resource allocation type via higher layer signaling. For example, a higher layer parameter resourceAllocation may be set to one of resourceAllocationType0, resourceAllocationType1, or dynamicSwitch. If the UE is configured with both resource allocation types 0 and 1 or if the higher layer parameter resourceAllocation is set to dynamicSwitch, a Most Significant Bit (MSB) in a resource allocation field within a DCI format indicating scheduling may indicate a resource allocation type 0 or a resource allocation type 1, resource allocation information may be indicated via the remaining bits except for the MSB in the resource allocation field based on the indicated resource allocation type, and based thereupon, the UE may interpret resource allocation field information of the DCI. If the UE is configured with either resource allocation type 0 or resource allocation type 1 or if the higher layer parameter resourceAllocation is set to either resourceAllocationType0 or resourceAllocationType1, the resource allocation field within the DCI format indicating the scheduling may indicate resource allocation information based on the configured resource allocation type, and the UE may interpret resource allocation field information of the DCI based on the configured resource allocation type.

Coreset

Hereinafter, a downlink control channel in a 5G communication system will be described in more detail with reference to the drawings.

resource set may mean providing information about at least one of an identifier (identify) of the control resource set, a frequency location of the control resource set, or symbol length of the control resource set. For example, higher layer signaling information element for configuring a control resource set may include information shown in Table 6 below.

TABLE 6

```
ControlResourceSet ::=                    SEQUENCE {
    controlResourceSetId                      ControlResourceSetId,
    frequencyDomainResources                  BIT STRING (SIZE (45)),
    duration                                  INTEGER (1..maxCoReSetDuration),
    cce-REG-MappingType                       CHOICE {
        interleaved                               SEQUENCE {
            reg-BundleSize                            ENUMERATED {n2, n3, n6},
            interleaverSize                           ENUMERATED {n2, n3, n6},
            shiftIndex
INTEGER(0..maxNrofPhysicalResourceBlocks-1)       OPTIONAL -- Need S
        },
        nonInterleaved                            NULL
    },
    precoderGranularity                       ENUMERATED {sameAsREG-bundle,
allContiguousRBs},
    tci-StatesPDCCH-ToAddList                                          SEQUENCE(SIZE
(1..maxNrofTCI-StatesPDCCH)) OF TCI-StateId OPTIONAL, -- Cond NotSIB1-initialBWP
    tci-StatesPDCCH-ToReleaseList                                      SEQUENCE(SIZE
(1..maxNrofTCI-StatesPDCCH)) OF TCI-StateId OPTIONAL, -- Cond NotSIB1-initialBWP
    tci-PresentInDCI                          ENUMERATED {enabled}
OPTIONAL, -- Need S
    pdcch-DMRS-ScramblingID                   INTEGER (0..65535)
OPTIONAL, -- Need S
    ...,
    [[
    rb-Offset-r16                             INTEGER (0..5)
OPTIONAL, -- Need N
    tci-PresentInDCI-ForDCI-Format1-2-r16     INTEGER      (1..3)
OPTIONAL, -- Need S
    coresetPoolIndex-r16                      INTEGER (0..1)
OPTIONAL, -- Need R
    controlResourceSetId-r16                  ControlResourceSetId-r16
OPTIONAL -- Need S
    ]]
}
```

Figure 8:
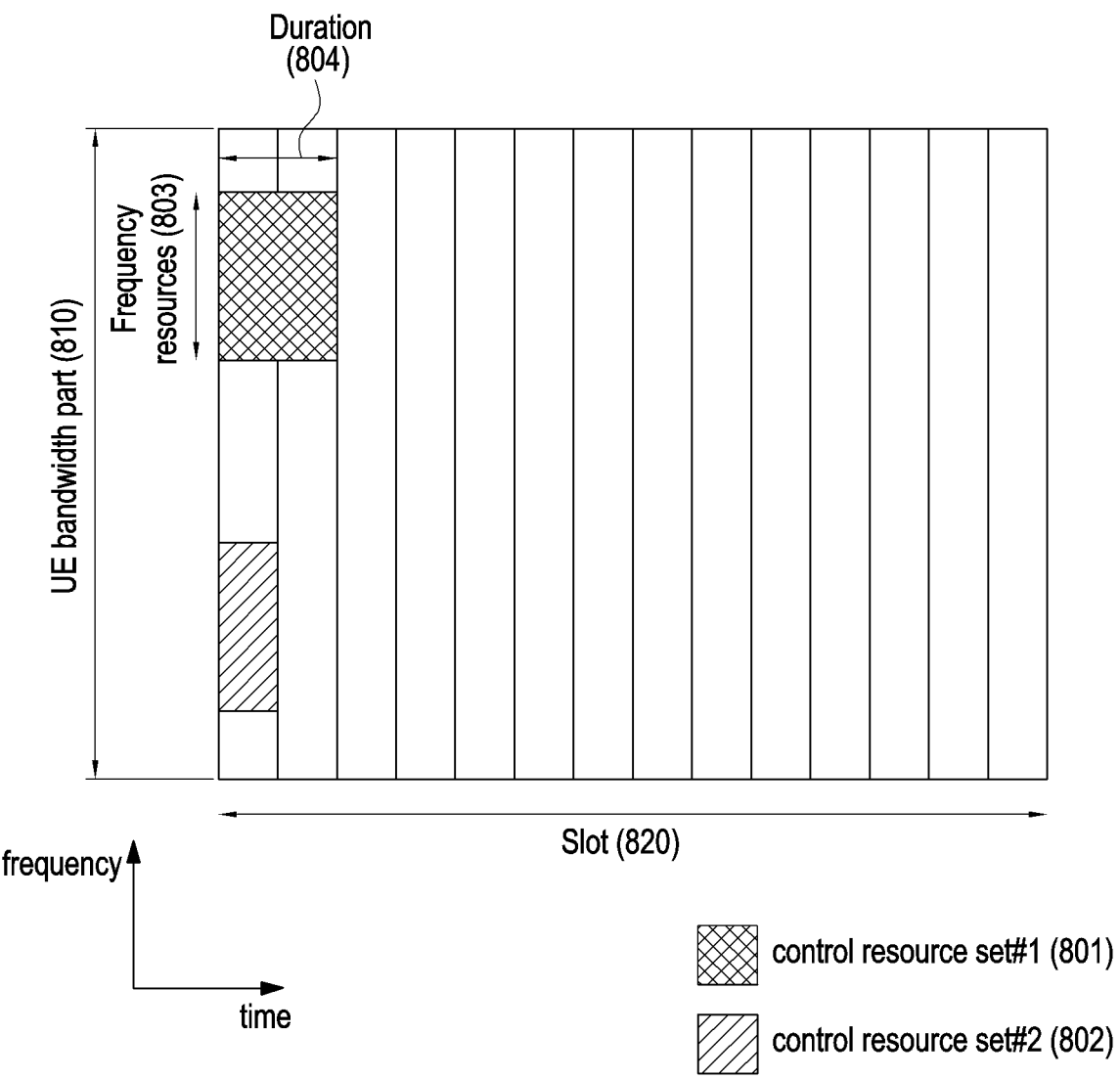
FIG. 8 is a diagram illustrating an example of configuring a control resource set of a downlink control channel in a 5G communication system.

FIG. 8 is a diagram illustrating an example of configuring a control resource set of a downlink control channel in a 5G communication system. That is, FIG. 8 is a diagram illustrating an example of a Control Resource Set (CORESET) where a download control channel is transmitted in a 5G wireless communication system.

Referring to FIG. 8, two control resource sets, i.e., a control resource set #1 801 and a control resource set #2 802 are configured within a UE bandwidth part (UE bandwidth part) 810 in a frequency domain and one slot 820 in a time domain. The control resource sets 801 and 802 may be configured in specific frequency resource within the UE bandwidth part 810 in the frequency domain, and may be configured with one or a plurality of OFDM symbols in the time domain. The OFDM symbols may be defined as control resource set length (control resource set duration) 804. Referring to a shown example, the control resource set #1 801 may be configured with control resource set length of two symbols, and the control resource set #2 802 may be configured with control resource set length of one symbol.

Each control resource set described above may be configured for the UE by a base station via higher layer signaling, e.g., at least one of system information, a Master Information Block (MIB), or Radio Resource Control (RRC) signaling. Configuring the UE with a control Here, 'controlResourceSetId' may indicate a control resource set identifier (Identity), 'frequencyDomainResources' may indicate a frequency domain resource, 'duration' may indicate a time interval of a control resource set, i.e., a time domain resource, 'cce-REG'-MappingType' may indicate a CCE-to-REG mapping scheme, 'reg-BundleSize' may indicate a REG bundle size, 'interleaverSize' may indicate an interleaver size, and 'shiftIndex' may indicate interleaver shift.

In addition, tci-StatesPDCCH may be configuration information of Transmission Configuration Indication (TCI) states, and may include a Channel State Information Reference Signal (CSI-RS) index or one or a plurality of SS/PBCH block indexes which have a Quasi Co Located (QCL) relationship with a DMRS transmitted in a corresponding resource control set.

Figure 9:
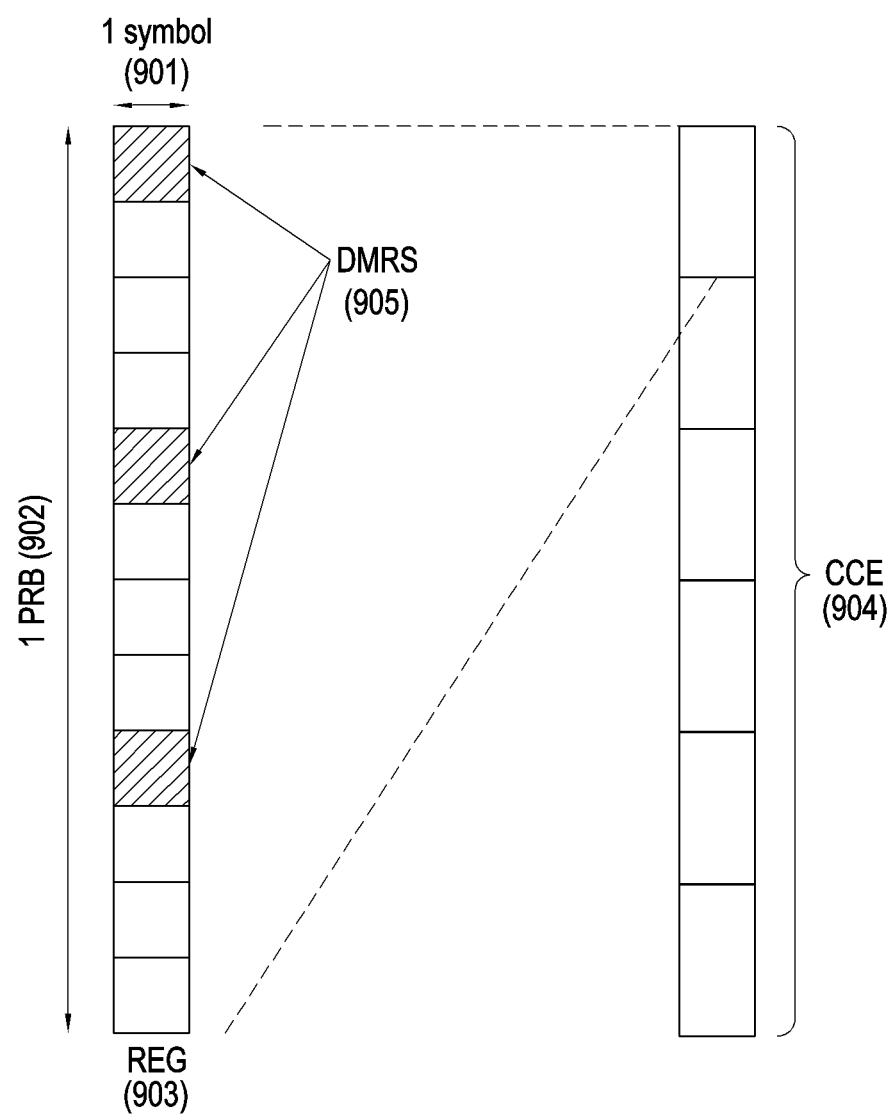
FIG. 9 is a diagram illustrating a structure of a downlink control channel in a 5G communication system.

FIG. 9 is a diagram illustrating a structure of a downlink control channel in a 5G communication system. That is, FIG. 9 is a diagram illustrating an example of a basic unit of a time and frequency resource constituting a downlink control channel that may be used in a 5G wireless communication system.

Referring to FIG. 9, the basic unit of the time and frequency resource constituting the downlink control channel may be referred to as a Resource Element Group (REG) 903, and the REG 903 may be defined with one OFDM symbol 901 in a time domain and with one PRB 902, i.e., 12 subcarriers, in a frequency domain. A base station may configure an allocation unit of a downlink control channel by concatenating at least one REG 903.

If the basic unit for allocation of the downlink control channel in 5G is a Control Channel Element (CCE) 904, one CCE 904 may be composed of a plurality of REGs 903. If the REG 903 shown is described as an example, the REG 903 may be composed of 12 REs, and if one CCE 904 is composed of 6 REGs 903, the one CCE 904 may be composed of 72 REs. A region where a download control resource set is configured may be constituted of a plurality of CCEs 904, and a particular download control channel may be mapped to one or the plurality of CCEs 904 according to an aggregation level (AL) in the control resource set. The CCEs 904 in the control resource set are distinguished with numbers, and in this case, the numbers of the CCEs 904 may be allocated according to a logical mapping scheme.

The basic unit, i.e., the REG 903, of the download control channel may include all of a region of REs to which DCI is mapped and a region to which a DMRS 905, which is used for demodulating the DCI, is mapped. At least one DMRS 905 (in a case of a shown example, three DMRSs 905) may be transmitted in one REG 903. The number of CCEs required for transmitting a downlink control channel may be, e.g., 1, 2, 4, 8, or 16 depending on an aggregation level (AL), and different numbers of CCEs may be used to implement link adaptation of the downlink control channel. For example, if AL=L, one downlink control channel may be transmitted via L CCEs. A UE needs to detect a signal within a control resource set while being unaware of presence of a downlink control channel and, for this blind decoding, a search space may be defined which indicates a set of CCEs.

spaces. A search space set may be defined as a set of search spaces at all configured aggregation levels.

Search Space

A search space for a PDCCH may be classified into a common search space (CSS) and a UE-specific search space (UE-specific search space: USS). A predetermined group of UEs or all UEs may search for a common search space to receive cell-common control information such as a paging message, or dynamic scheduling for system information. For example, scheduling allocation information of a PDSCH for transmitting an SIB including service provider information of a cell may be detected by searching for the common search space. In a case of the common search space, so that the predetermined group of UEs or all the UEs may receive the PDCCH, it may be defined as a set of CCEs previously agreed on. Scheduling allocation information of a UE-specific PDSCH or PUSCH may be detected by searching for the UE-specific search space. The UE-specific search space may be UE-specifically defined with a function of various system parameters and an identity of a UE.

In a 5G wireless communication system, a parameter for a search space for a PDCCH may be configured to a UE by a base station via higher layer signaling (e.g., an SIB, an MIB, and RRC signaling). For example, the base station may configure the UE with at least one of the number of PDCCH candidates at each aggregation level L, a monitoring period for a search space, a monitoring occasion of a symbol unit within a slot for the search space, a search space type (a common search space or a UE-specific search space), a combination of an RNTI and a DCI format to be monitored in the search space, or a control resource set index to be monitored in the search space. For example, a higher layer signaling information element for configuring parameters for the search space of the PDCCH may include configuration information as shown in Table 7 below.

TABLE 7

```
SearchSpace ::=                                SEQUENCE {
SearchSpace ::=                                SEQUENCE {
    searchSpaceId              SearchSpaceId,
    controlResourceSetId       ControlResourceSetId OPTIONAL,   -- Cond SetupOnly
    monitoringSlotPeriodicityAndOffset    CHOICE {
    ...
    }
OPTIONAL,    -- Cond Setup
    duration                   INTEGER (2..2559) OPTIONAL,    -- Need R
    monitoringSymbolsWithinSlot   BIT      STRING     (SIZE     (14))
OPTIONAL,    -- Cond Setup
    nrofCandidates             SEQUENCE {
        aggregationLevel1      ENUMERATED {n0, n1, n2, n3, n4, n5, n6, n8},
        aggregationLevel2      ENUMERATED {n0, n1, n2, n3, n4, n5, n6, n8},
        aggregationLevel4      ENUMERATED {n0, n1, n2, n3, n4, n5, n6, n8},
        aggregationLevel8      ENUMERATED {n0, n1, n2, n3, n4, n5, n6, n8},
        aggregationLevel16     ENUMERATED {n0, n1, n2, n3, n4, n5, n6, n8}
    }
OPTIONAL,    -- Cond Setup
    searchSpaceType                        CHOICE {
        common                                 SEQUENCE {
        ...
        },
        ue-Specific                            SEQUENCE {
        ...
        }
    }
OPTIONAL    -- Cond Setup2
}
```

The search space may be a set of downlink control channel candidates constituted of CCEs that the UE needs to attempt to decode on a given aggregation level, and because there are several aggregation levels to make one bundle with 1, 2, 4, 8, or 16 CCEs, the UE may have a plurality of search Here, 'searchSpaceId' may indicate a search space identifier, 'controlResourceSetId' may indicate a control resource set identifier, 'monitoringSlotPeriodicityAndOffset' may indicate a monitoring slot level period, 'duration' may indicate length of a time interval to be monitored, 'monitoringSymbolsWithinSlot' may indicate symbols for PDCCH monitoring in a slot, 'nrofCandidates' may indicate the number of PDCCH candidates for each aggregation level, 'searchSpaceType' may indicate a search space type, 'common' may include parameters for a common search space, and 'ue-Specific' may include parameters for a UE-specific search space.

According to the configuration information, the base station may configure one or more search space sets to the UE. According to an embodiment, the base station may configure the UE with a search space set 1 and a search space set 2 and configure it to monitor a DCI format A, scrambled with an X-RNTI in the search space set 1, in a common search space and to monitor a DCI format B, scrambled with a Y-RNTI in the search space set 2, in a UE-specific search space.

According to the configuration information, one or a plurality of search space sets may be present in the common search space or the UE-specific search space. For example, a search space set #1 and a search space set #2 may be configured as the common search space, and a search space set #3 and a search space set #4 may be configured as the UE-specific search space.

In the common search space, a combination of a DCI format and an RNTI as follows may be monitored. Of course, it is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of a DCI format and an RNTI as follows may be monitored. Of course, it is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

Specified RNTIs may be defined and used as follows.

Cell RNTI (C-RNTI): for scheduling a UE-specific PDSCH

Temporary Cell RNTI (TC-RNTI): for scheduling a UE-specific PDSCH

Configured Scheduling RNTI (CS-RNTI): for scheduling a semi-statically configured UE-specific PDSCH Random Access RNTI (RA-RNTI): for scheduling a PDSCH in a random access phase Paging RNTI (P-RNTI): for scheduling a PDSCH where paging is transmitted System Information RNTI (SI-RNTI): for scheduling a PDSCH where system information is transmitted Interruption RNTI (INT-RNTI): for informing whether to puncture a PDSCH Transmit Power Control for PUSCH RNTI (TPC-PUSCH-RNTI): for indicating power control command for a PUSCH Transmit Power Control for PUCCH RNTI (TPC-PUCCH-RNTI): for indicating power control command for a PUCCH Transmit Power Control for SRS RNTI (TPC-SRS-RNTI): for indicating power control command for a sounding reference signal (SRS)

The above-described DCI formats may follow the definitions in Table 8 below.

TABLE 8

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G communication system such as NR, a physical channel and a physical signal may be distinguished as follows. For example, a uplink/downlink physical channel may mean a set of REs which transfer information transmitted via a higher layer, and representatively, at least one of a PDCCH, a PUCCH, a PDSCH, and a PUSCH may correspond to this. A uplink/downlink physical signal may mean a signal used in a physical layer without transferring the information transmitted via the higher layer, and representatively, a DM-RS, a CSI-RS, or an SRS may correspond to this.

In the disclosure, as described above, it may be described as a signal without distinction between the physical channel and the physical signal. For example, expressing that a base station transmits a downlink signal may mean that the base station transmits at least one of a downlink physical channel and a downlink physical signal such as a PDCCH, a PDSCH, a DM-RS, or a CSI-RS. In other words, a signal in the disclosure may be a term that includes all of the channel and the signal, and may be distinguished according to a context and a case when the distinction is actually required.

TCI State

Hereinafter, a method of configuring a TCI state for a PDCCH (or a PDCCH DMRS) in a 5G communication system will be described in detail.

The TCI state is for announcing a Quasi co-location (QCL) relationship between a PDCCH (or a PDCCH DMRS) and another Reference Signal (RS) or channel Here, that an antenna port A (a reference RS #A) of a certain reference signal and an antenna port B (a target RS #B) of a target reference signal are QCLed with each other may mean that it is allowed for a UE to apply some or all of channel related parameters estimated in the antenna port A to channel measurement from the antenna port B. QCL related parameters may include at least one of 1) time tracking affected by average delay and delay spread, 2) frequency tracking affected by Doppler shift and Doppler spread, 3) radio resource management (RRM) affected by an average gain, and 4) beam management (BM) affected by a spatial parameter, and different parameters may need to be related depending on a situation. In NR, for example, four types of QCL relationships as shown in Table 9 below may be supported.

TABLE 9

| QCL type | Large-scale characteristics |
| --- | --- |
| A | Doppler shift, Doppler spread, average delay, delay spread |
| B | Doppler shift, Doppler spread |

TABLE 9-continued

| QCL type | Large-scale characteristics |
|---|---|
| C | Doppler shift, average delay |
| D | Spatial Rx parameter |

Here, a spatial RX parameter may collectively refer to some or all of various parameters including at least one of Angle of arrival (AoA), Power Angular Spectrum (PAS) of AoA, Angle of departure (AoD), PAS of AoD, transmit/receive channel correlation, transmit/receive beamforming, or spatial channel correlation.

QCL relationship may be configured to a UE via a TCI-State and QCL-Info which are RRC signaling parameters, as shown in Table 10 below. Referring to Table 10, a base station may configure the UE with one or more TCI states, and inform up to two types of QCL relationships (qcl-Type1, qcl-Type2) for an RS, i.e., a target RS, referring to an ID of the TCI state. Here, informing up to two types of QCL relationships is only an example, and the base station may inform the UE of two or more types of QCL relationships for the target RS. At this time, each QCL information (QCL-Info) included in each TCI state may include a serving cell index and a BWP index of a reference RS indicated by corresponding QCL information, a type and an ID of the reference RS, and a QCL type as shown in Table 10.

referring to the different TCI states are associated with different spatial Rx parameters, i.e., different beams. Specifically, an example of a TCI state combination applicable to a PDCCH DMRS antenna port is shown in Table 11 below. In Table 11, the fourth row is a combination assumed by the UE before RRC configuration, and the row may not be configured to a UE after RRC configuration.

TABLE 11

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

A base station may support hierarchical signaling for dynamic TCI state allocation for a PDCCH beam to a UE. Specifically, the base station may configure N TCI states (TCI #0, TCI #1, . . . , TCI #M−1) to the UE via RRC signaling, and some of them may be configured as a TCI state for a CORESET. Thereafter, the base station may indicate and activate one of TCI states for the CORESET to

TABLE 10

```
TCI-State ::=                SEQUENCE {
    tci-StateId                  TCI-StateId,
    qcl-Type1                    QCL-Info,
    qcl-Type2                    QCL-Info
        OPTIONAL, -- Need R
    ...
}
QCL-Info ::=                 SEQUENCE {
    cell                         ServCellIndex   OPTIONAL, -- Need R
    bwp-Id                       BWP-Id     OPTIONAL, -- Cond CSI-RS-Indicated
    referenceSignal              CHOICE {
        csi-rs
    NZP-CSI-RS-ResourceId,
        ssb                      SSB-Index
    },
    qcl-Type                     ENUMERATED {typeA, typeB, typeC, typeD},
    ...
}
```

Here, 'tci-StateId' may indicate a TCI state ID, 'qcl-Type1' may include QCL information of a first target RS referring to the TCI state ID, and 'qcl-Type2' may include QCL information of a second target RS referring to the TCI state ID. For each QCL information, 'cell' may indicate a serving cell index of a UE to which an RS indicated by the QCL information is configured, 'bwp-Id' may indicate a BWP index of the RS indicated by the QCL information, and 'csi-rs' or 'ssb' may indicate a CSI-RS ID or a synchronization signal/sequence block (SSB) ID indicated by the QCL information.

A base station may communicate with a UE using one or a plurality of beams. To this end, the base station may transfer information about different N beams to the UE via N different TCI states. For example, if N=3, the base station allows a qcl-Type parameter (e.g., qcl-Type2) included in three TCI states to be associated with CSI-RSs or SSBs corresponding to different beams and set to QCL type D, so the base station may notify the UE that antenna ports the UE via MAC CE signaling (e.g., a MAC CE activation command for providing the TCI state of the CORESET). The UE receiving the MAC CE signaling may apply the TCI state indicated by the MAC CE signaling from a first slot after $3 \cdot N_{slot}^{subframe,\mu}$ slots from a slot (e.g., a slot k) for transmitting HARQ-ACK information of a PDSCH providing the MAC CE signaling, and may receive a PDCCH based on beam information including the TCI state. Here, $N_{slot}^{subframe,\mu}$ is the number of slots included in each subframe for subcarrier spacing $\mu$.

A MAC CE for indicating a TCI state of a PDCCH may be composed of 2 bytes (16 bits), and may be composed of a 5-bit serving cell ID field, a 4-bit CORESET ID field, and a 7-bit TCI state ID field. The serving cell ID field may indicate an ID of a serving cell to which the MAC CE is applied, and the CORESET ID field may indicate an ID of a CORESET to which the TCI state of the MAC CE is applied or indicated. The TCI state ID field may indicate a TCI state applied to the CORESET identified via the CORE- SET ID field. If the CORESET ID is 0, the TCI state ID field may indicate one of 64 TCI states from the first among TCI-states configured via 'tci-States-ToAddModList' and 'tci-States-ToReleaseList' among 'PDSCH-Config', which is higher layer signaling for an activated bandwidth part. If the CORESET ID is set to a value other than 0, the TCI state ID field may indicate one of the TCI-states configured via 'tci-StatesPDCCH-ToAddList' and 'tci-StatesPDCCH-ToReleaseList' which are higher layer signaling for the CORESET indicated by the CORESET ID field.

In this way, the UE to which the TCI-state for the CORESET is indicated and/or activated via the MAC CE signaling may consider that the same QCL information is applied to one or more search spaces to which the CORESET is connected until another TCI-state is indicated via another MAC CE signaling.

TCI State for Radio Link Monitoring (RLM)

If RLM-RS related higher configuration information is not configured or provided to a UE, but TCI states configured or provided to the UE for PDCCH reception includes one or a plurality of CSI-RSs, the UE may operate as follows.

- If a TCI-state activated for PDCCH reception includes only one RS, the UE may perform RLM operation using the RS.
- The UE does not need to perform RLM using a aperiodic RS or a semi-persistent RS.
- If $L_{max}=4$, the UE may select $N_{RLM}$ RSs among RSs for the TCI-state activated or provided for the PDCCH reception in an order of which PDCCH monitoring period (monitoring periodicity) is shortest among search spaces associated with the CORESET in which the PDCCH is transmitted. If search spaces for one or more CORESETs have the same PDCCH monitoring period, the UE may determine a selection order for CORESETs in an order of the highest CORESET index.

A UE configured with a plurality of downlink bandwidth parts for a serving cell may perform RLM using the following RS. The RS is an RS corresponding to an RS index configured or provided via 'RadioLinkMonitoringRS' which is higher layer signaling for an activated downlink bandwidth part, or an RS of TCI-state configured and activated in a CORSET for PDCCH reception in the activated downlink bandwidth part if it is not configured or provided via the higher layer signaling 'RadioLinkMonitoringRS' for the activated downlink bandwidth part.

TCI State for PDCCH Assignment

A UE, which is provided with 0 as a search space ID for a C-RNTI and type 0/0A/2 PDCCH CSS set, may determine a PDCCH monitoring occasion of the type 0/0A/2 PDCCH CSS set, and monitor PDCCH candidates at a PDCCH monitoring occasion associated with an SS/PBCH as follows. Here, the SS/PBCH block may be determined according to at least one of the following.

- SS/PBCH block in a QCL relationship with a CSI-RS included in a TCI-state indicated or activated by a MAC CE activation indicator in an activated bandwidth part including a CORESET index 0, or
- SS/PBCH block used in the most recently performed contention-based random access procedure.

A UE which is not provided with TCI state information indicating QCL information of a DM-RS antenna port of a PDCCH transmitted in a CORESET may assume that all of the DM-RS antenna port of the PDCCH transmitted in the CORESET configured by configuration information transmitted via an MIB, a DM-RS antenna port of a PDSCH scheduled via the PDCCH, and an SS/PBCH block transmitting the MIB are QCLed for average gain, QCL-TypeA, and QCL-Type D characteristics.

For a CORESET having an index 0, the UE may assume that a DM-RS antenna port of a PDCCH received in the CORESET is QCLed with a downlink RS or an SS/PBCH block as follows. In other words, if a TCI state is indicated or activated by a MAC CE activation command for the CORESET, the UE may assume that one or a plurality of downlink RSs configured via the TCI-state and the DM-RS antenna port of the PDCCH are QCLed to each other. If a MAC CE activation command for indicating or activating the TCI state for the CORESET is not received after the most recent random access procedure among random access procedures other than a contention-free random access procedure triggered by a PDCCH command (order), the UE may assume that it is QCLed with an SS/PBCH block identified by the UE during the most recent random access procedure.

For CORESETs other than the CORESET having the index 0, if the UE is not provided with configuration information of a TCI state via CORESET configuration information as shown in Table 6, or if the UE is provided with initial configuration of a plurality of TCI states, but is not provided with a MAC CE activation command for indicating or activating one TCI state for the CORESET, the UE may assume that the DM-RS antenna port of the PDCCH received in the CORESET and an SS/PBCH block identified in an initial access procedure are QCLed.

For the CORESETs other than the CORESET having the index 0, if the UE is provided with configuration information of a TCI state via the CORESET configuration information as shown in Table 6 as part of a reconfiguration with sync procedure, but is not provided with the MAC CE activation command indicating or activating the one TCI state for the CORESET, the UE may assume that the DM-RS antenna port of the PDCCH received in the CORESET and an SS/PBCH block or a CSI-RS identified in the random access procedure initiated by the reconfiguration with sync procedure are QCLed.

For the CORESETs other than the CORESET having the index 0, a UE which is provided with the one TCI state for the CORESET or receives the MAC CE activation command indicating or activating the one TCI state for the CORSET may assume that the DM-RS antenna port of the PDCCH received in the CORESET and one or a plurality of RSs configured via the TCI state are QCLed to each other.

For the CORESET having the index 0, the UE may be provided with a QCL-TypeD characteristic of a CSI-RS configured via a TCI state indicated or activated via the MAC CE activation command from the SS/PBCH.

Upon receiving MAC CE signaling, the UE may apply a TCI state indicated by the MAC CE signaling from the first slot after $3 \cdot N_{slot}^{subframe,\mu}$ slots from a slot (e.g., a slot k) for transmitting HARQ-ACK information of a PDSCH providing the MAC CE signaling via a PUCCH, and receive a PDCCH based on beam information including the TCI state. Here, $N_{slot}^{subframe,\mu}$ is the number of slots included in each subframe for subcarrier spacing ($\mu$).

Slot Format Indicator (SFI)

In a 5G communication system, a downlink signal transmission interval and a uplink signal transmission interval may be dynamically changed. To this end, a base station may indicate to a UE whether each of OFDM symbols constituting one slot is a downlink symbol, an uplink symbol, or a flexible symbol via a slot format indicator (SFI). Here, the flexible symbol may mean a symbol which is not both a downlink symbol and a uplink symbol, or which may be changed to a downlink symbol or a uplink symbol by UE-specific control information or scheduling information. In this case, the flexible symbol may include a gap interval (gap guard) required in a process of switching from a downlink to a uplink.

Upon receiving the slot format indicator, the UE may perform a downlink signal reception operation from the base station in a symbol indicated as the downlink symbol, and perform a uplink signal transmission operation to the base station in a symbol indicated as the uplink symbol. For a symbol indicated as the flexible symbol, the UE may perform at least a PDCCH monitoring operation, and via another indicator, e.g., DCI, the UE may perform a downlink signal reception operation from the base station in the flexible symbol (for example, when a DCI format 1_0 or 1_1 is received), or perform a uplink signal transmission operation to the base station (for example, when a DCI format 0_0 or 0_1 is received).

Figure 10:
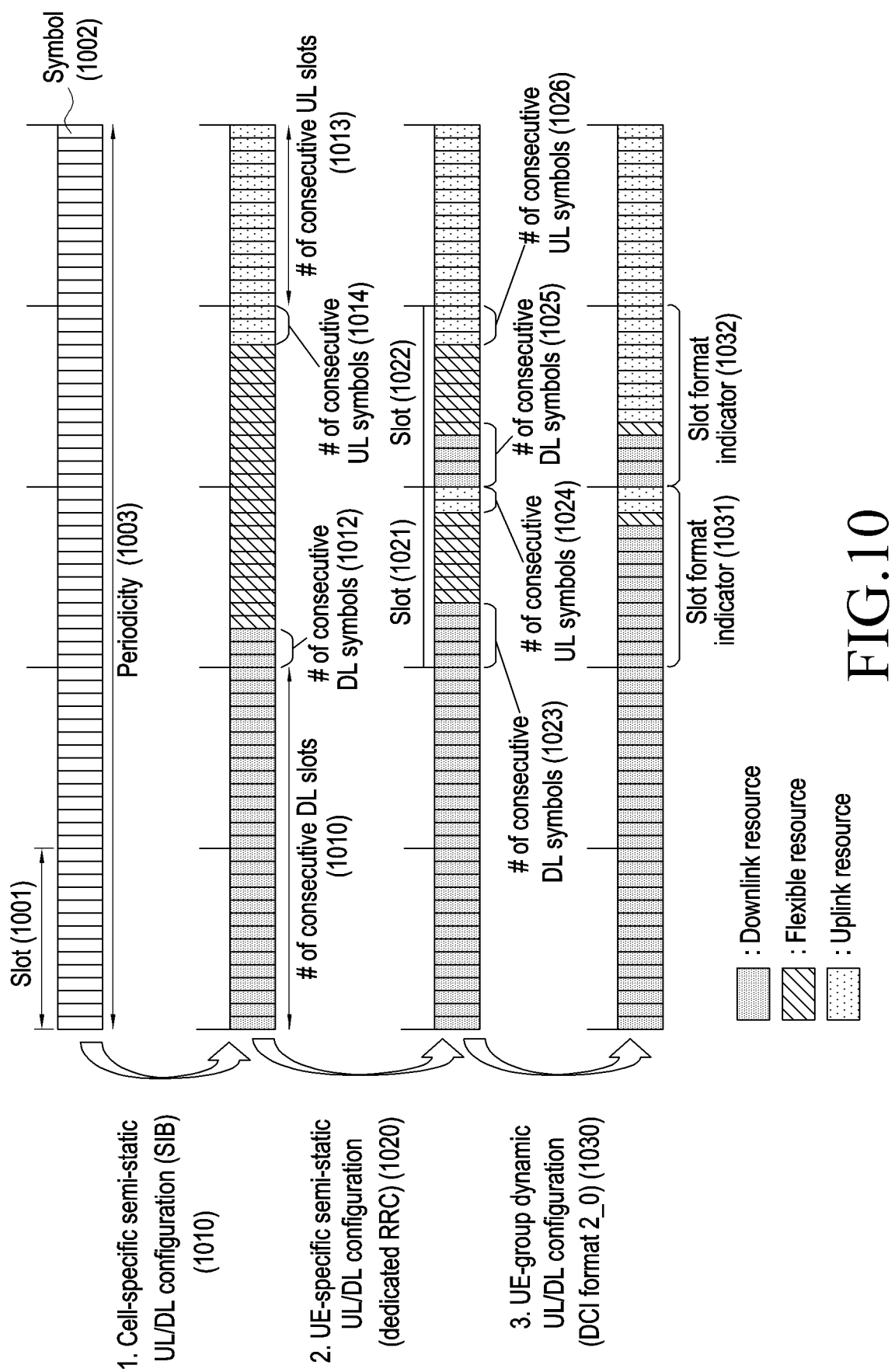
FIG. 10 is a diagram illustrating an example of uplink-downlink configuration in a 5G communication system.

FIG. 10 is a diagram illustrating an example of uplink-downlink configuration (UL/DL configuration) in a 5G communication system, in which three steps of uplink-downlink configuration of a symbol/slot are illustrated.

Referring to FIG. 10, in the first step, cell-specific configuration information 1010, e.g., system information such as an SIB, for configuring a uplink-downlink in semi-static manner, may configure a symbol/slot as a uplink or a downlink. Specifically, the cell-specific uplink-downlink configuration information 1010 in the system information may include uplink-downlink pattern information and information indicating reference subcarrier spacing. The uplink-downlink pattern information may indicate a transmission period (transmission periodicity) 1003 of each pattern, the number of consecutive downlink slots from a start point of each pattern (Number of consecutive full DL slots at the beginning of each DL-UL pattern) 1011, the number of consecutive downlink symbols from a start point of the next slot (Number of consecutive DL symbols in the beginning of the slot following the last full DL slot) 1012, the number of consecutive uplink slots from an end point of each pattern (Number of consecutive full UL slots at the end of each DL-UL pattern) 1013, and the number of symbols of the preceding slot (Number of consecutive UL symbols in the end of the slot preceding the first full UL slot) 1014. In this case, the UE may determine a slot/symbol not indicated as the uplink or the downlink as a flexible slot/symbol.

In the second step, UE-specific configuration information 1020 delivered via UE-dedicated higher layer signaling (i.e., RRC signaling) may indicate symbols to be configured as the downlink or the uplink in slots 1021 and 1022 including a flexible slot or a flexible symbol. For example, the UE-specific uplink-downlink configuration information 1020 may include a slot index indicating the slots 1021 and 1022 including the flexible symbol, the number of consecutive downlink symbols from the start of each slot (Number of consecutive DL symbols in the beginning of the slot) 1023 and 1025, and the number of consecutive uplink symbols from the end of each slot (Number of consecutive UL symbols in the end of the slot) 1024 and 1026, or may include information indicating the entire downlink or information indicating the entire uplink for each slot. In this case, the symbol/slot configured as the uplink or the downlink via the cell-specific configuration information 1010 in the first step may not be changed to the downlink or the uplink via the UE-specific higher layer signaling 1020.

In the last step, in order to dynamically change a downlink signal transmission interval and a uplink signal transmission interval, downlink control information of a downlink control channel may include a slot format indicator 1030 indicating that each symbol is a downlink symbol, an uplink symbol, or a flexible symbol in each slot of a plurality of slots starting from a slot in which the UE detects the downlink control information. In this case, for the symbol/slot configured as the uplink or the downlink in the first and second steps, the slot format indicator may not indicate that it is the downlink or the uplink. A slot format of each slot 1031 or 1032 including at least one symbol which is not configured as the uplink or the downlink in the first and second steps may be indicated by corresponding downlink control information.

A slot format indicator may indicate uplink-downlink configuration for 14 symbols in one slot as shown in Table 12 below. The slot format indicator may be simultaneously transmitted to a plurality of UEs via a UE group (or a cell) common control channel. In other words, downlink control information including the slot format indicator may be transmitted via a PDCCH which is CRC-scrambled with an identifier, e.g., an SFI-RNTI, different from a UE-specific cell-RNTI (C-RNTI). The downlink control information may include a slot format indicator for one or more slots, i.e., N slots. Here, a value of N may be an integer greater than 0, or a value set by the UE via higher layer signaling from the base station among a set of predefined possible values such as 1, 2, 5, 10, and 20. In an embodiment, a size of the slot format indicator may be configured by the base station to the UE via higher layer signaling.

TABLE 12

| Format | \multicolumn{14}{c}{Symbol number in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0  | D | D | D | D | D | D | D | D | D | D | D | D | D | D |
| 1  | U | U | U | U | U | U | U | U | U | U | U | U | U | U |
| 2  | F | F | F | F | F | F | F | F | F | F | F | F | F | F |
| 3  | D | D | D | D | D | D | D | D | D | D | D | D | D | F |
| 4  | D | D | D | D | D | D | D | D | D | D | D | D | F | F |
| 5  | D | D | D | D | D | D | D | D | D | D | D | F | F | F |
| 6  | D | D | D | D | D | D | D | D | D | D | F | F | F | F |
| 7  | D | D | D | D | D | D | D | D | D | F | F | F | F | F |
| 8  | F | F | F | F | F | F | F | F | F | F | F | F | F | U |
| 9  | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |

TABLE 12-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In Table 12, D may mean a downlink symbol, U may mean an uplink symbol, and F may mean a flexible symbol. According to Table 12, the total number of supportable slot formats for one slot is 256. A maximum size of information bits that may be used for slot format indication in an NR system is 128 bits, and the base station may configure it to the UE via higher layer signaling, for example, 'dci-PayloadSize'.

In this case, a cell operating in a unlicensed band may configure and indicate an additional slot format as shown in Table 13 by introducing one or more additional slot formats or by modifying at least one of existing slot formats. Table 13 shows an example of additional slot formats in which one slot consists only of an uplink symbol and a flexible symbol (F).

TABLE 13

| Format | Symbol number (or index) in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

In an embodiment, downlink control information used for slot format indication may indicate a slot format(s) for a plurality of serving cells, and a slot format(s) for each serving cell may be distinguished via a serving cell ID. In addition, a slot format combination for one or more slots for each serving cell may be indicated by the downlink control information. For example, if a size of one slot format indicator index field in the downlink control information is 3 bits and indicates a slot format for one serving cell, the 3-bit slot format indicator index field may indicate one of a total of 8 slot formats (or slot format combinations), and the base station may indicate the slot format indicator index field via UE group common downlink control information (common DCI).

In an embodiment, at least one slot format indicator index field included in the downlink control information may be configured as a slot format combination indicator for a plurality of slots. For example, Table 14 shows a 3-bit slot format combination indicator composed of slot formats in Table 12 and Table 13. Among values of the slot format combination indicator, {0, 1, 2, 3, 4} may indicate a slot format for one slot. The remaining three values {5, 6, 7} may indicate a slot format for four slots, and the UE may apply the indicated slot format to the four slots sequentially from a slot in which the downlink control information including the slot format combination indicator is detected.

TABLE 14

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

Unlicensed Band

In a case of a system performing a communication in a unlicensed band, a communication device (a base station or a UE) that intends to transmit a signal in the unlicensed band may perform a channel access procedure, a listen-before talk (LBT), or channel sensing for the unlicensed band in which the communication device performs a communication before transmitting the signal, and if it is determined that the unlicensed band is in an idle state according to the channel access procedure, the communication device may access the unlicensed band and perform signal transmission. If it is determined that the unlicensed band is not in the idle state according to the performed channel access procedure, the communication device may not perform the signal transmission. Here, the channel access procedure is a procedure in which the base station or the UE occupies a channel for fixed (deterministic) time or randomly determined time to measure strength of a signal received via a channel via which the base station or the UE intends to transmit a signal, and compare the measured signal strength with a predefined threshold value or a threshold value $X_{Thresh}$ which is calculated by a function whose value is determined by at least one of a channel bandwidth, a bandwidth of a signal to be transmitted, and/or strength of transmission power.

If strength of a received signal measured via sensing for the unlicensed band channel is less than $X_{Thresh}$, the base station and the UE may determine that the channel is in an idle state or that it is possible to use (or occupy) the channel, and may occupy and use the channel. If the sensing result is equal to or greater than)(Thresh, the base station and the UE may determine that the channel is in a busy state, or determine that it is impossible to use (or occupy) the channel, and may not use the channel. In this case, the base station and the UE may continuously perform sensing until it is determined that the channel is in the idle state. In other words, a channel access procedure in a unlicensed band may mean a procedure for evaluating a possibility of performing transmission in a channel based on sensing. A basic unit of sensing may be a sensing slot and may be an interval of $T_{sl}$=9☐. In this case, if power detected in at least 4 μs of the sensing slot interval is less than $X_{Thresh}$, the sensing slot interval may be regarded as being idle or not being used. If the power detected in the at least 4 μs of the sensing slot interval is equal to or greater than $X_{Thresh}$, the sensing slot interval may be regarded as being busy or being used by another device.

The channel access procedure in the unlicensed band may be distinguished according to whether a channel access procedure initiation time point of the communication device is initiated is fixed (frame-based equipment (FBE)) or semi-static, or variable (load-based equipment (LBE)) or dynamic. The communication device may be determined as an FBE device or an LBE device according to whether a transmit/receive structure of the communication device has one period or does not have one period in addition to the channel access procedure initiation time point. Here, that the channel access procedure initiation time point is fixed may mean that the channel access procedure of the communication device may be initiated periodically according to a predefined declaration or a configured period. As another example, that the channel access procedure initiation time point is fixed may mean that the transmit/receive structure of the communication device has one period. Here, that the channel access procedure initiation time point is variable may mean that the channel access procedure initiation time point of the communication device may be any time when the communication device intends to transmit a signal in the unlicensed band. As another example, that the channel access procedure initiation time point is variable may mean that the transmit/receive structure of the communication device does not have one period and may be determined if necessary. Hereinafter, although the channel access procedure and the channel sensing are used interchangeably in the disclosure, the channel access procedure or the channel sensing operation of the base station or the UE may be the same.

Hereinafter, in the disclosure, a downlink transmission burst (DL transmission burst) may be defined as follows. The downlink transmission burst may mean a set of downlink transmissions transmitted without a gap greater than 16☐ between downlink transmissions of the base station. If the gap between the downlink transmissions is greater than 16☐, the downlink transmission may mean downlink transmission bursts separated to each other. Similarly, a uplink transmission burst (UL transmission burst) may be defined as follows. The uplink transmission burst may mean a set of uplink transmissions transmitted without a gap greater than 16☐ between the uplink transmissions of the UE. If the gap between the uplink transmissions is greater than 16☐, the uplink transmission may mean uplink transmission bursts separated to each other.

Channel Access Procedure for Semi-Static Channel Occupancy

Hereinafter, a channel access procedure in a case where a channel access procedure initiation time point of a communication device is fixed or semi-statically configured will be described.

In a 5G system which performs a communication in a unlicensed band, if it is possible to guarantee that another system does not exist which shares and uses a channel in the unlicensed band for a long time by regulation and a method at the same level as the regulation (by level of regulation), the following semi-static channel access procedure or channel sensing may be performed.

A base station intending to use the semi-static channel access procedure may provide, via higher layer signaling (e.g., an SIB1 and/or RRC signaling) to a UE, configuration information meaning that a channel access procedure scheme of the base station is the semi-static channel access procedure and/or configuration information on semi-static channel access, thereby the UE may know that the channel access procedure scheme of the base station is a semi-static channel access scheme. Here, as an example of the configuration information regarding the semi-static channel access, there may be a period $(T_x)$ at which the base station may initiate occupying a channel. For example, a value of the period may be 1 ms, 2 ms, 2.5 ms, 4 ms, 5 ms, or 10 ms. Upon using the semi-static channel access procedure, the base station may initiate periodic channel occupancy every $x \cdot T_x$ starting from every $T_x$ of two consecutive frames, i.e., a frame with an even-numbered index, and occupy a channel during up to $T_y = 0.95 T_x$. Here, it may be $$x \in \left\{0, 1, \ldots, \tfrac{20}{T_x} - 1\right\}.$$

Figure 11:
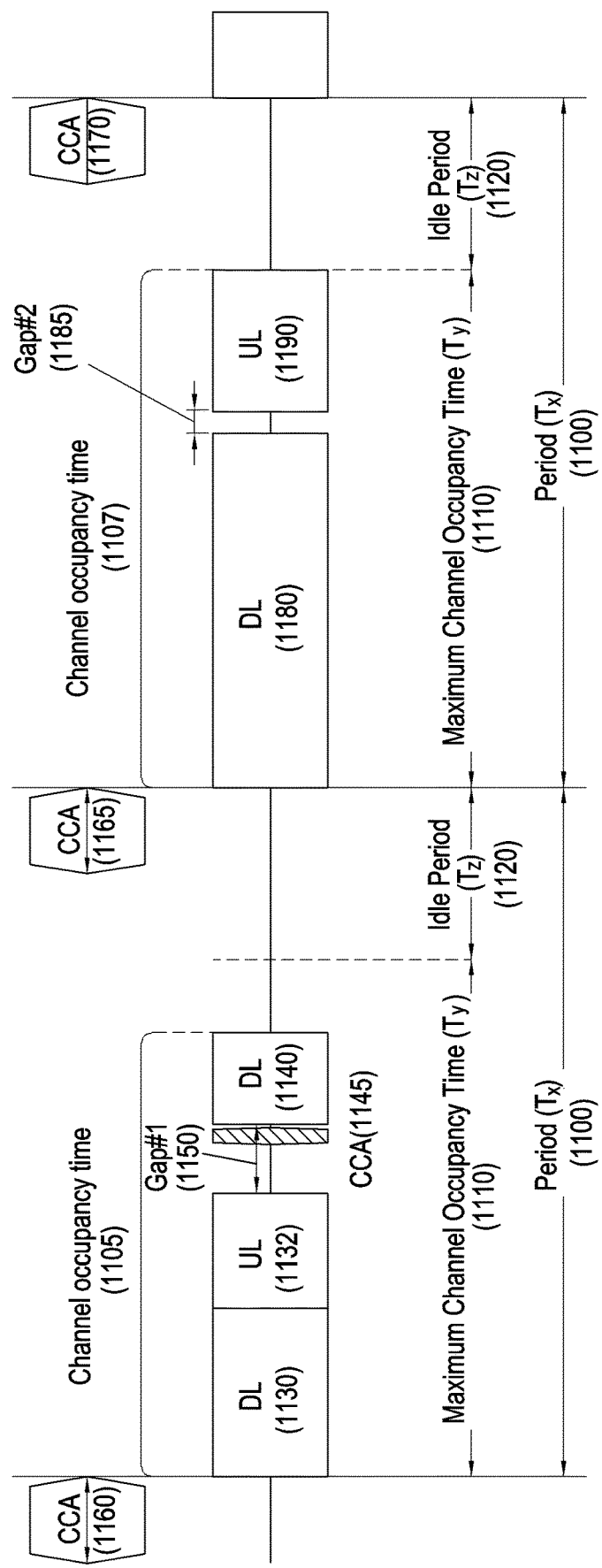
FIG. 11 is a diagram illustrating an example of a channel access procedure for semi-static channel occupancy in a wireless communication system according to an embodiment of the disclosure.

FIG. 11 is a diagram illustrating an example of a channel access procedure for semi-static channel occupation in a wireless communication system according to an embodiment of the disclosure.

Referring to FIG. 11, FIG. 11 is a diagram illustrating a periodic channel occupancy period $(T_x)$ 1100, channel occupancy time (COT) 1105 and 1107, and maximum channel occupancy time $(T_y)$ 1110, idle time (an idle period)$(T_z)$ 1120, and channel assessment (clear channel assessment (CCA)) intervals 1160, 1165, and 1170 in a base station and a UE performing a semi-static channel access procedure.

The base station and the UE using the semi-static channel access procedure may perform sensing on a channel in a channel assessment interval 1160 or 1165 immediately before using or occupying the channel (for example, downlink transmission 1130 or downlink transmission 1180) to assess whether channel use (or channel occupation) is possible. In this case, the sensing needs to be performed in at least one sensing slot interval (sensing slot duration), and an example of a sensing slot interval duration $(T_{sl})$ is 9☐.

An example of a sensing method may be to compare a magnitude or strength of received power detected or measured in a sensing slot interval with a predefined, set, or calculated threshold value $X_{Thresh}$. For example, if the result of performing the sensing is less than $X_{Thresh}$ in the base station and the UE performing the sensing in the channel assessment interval 1160, the base station and the UE may determine that the channel is in an idle state or that it is possible to use (or occupy) the channel, occupy the channel, and use the channel until the maximum channel occupancy time 1110. If the result of performing the sensing is greater than or equal to $X_{Thresh}$, the base station and the UE may determine that the channel is in a busy state or that it is impossible to use (or occupy) the channel, and may not use the channel until the next time 1180 when it is possible to initiate channel occupancy or time 1165 when channel sensing is performed in the next channel assessment interval 1165.

If the base station initiates channel occupancy by performing the semi-static channel access procedure, the base station and the UE may perform a communication as follows.

Immediately after sensing that a sensing slot interval is in an idle state, the base station needs to immediately perform downlink transmission at a start time point of channel occupancy time. If it is sensed that the sensing slot interval is in a busy state, the base station should not perform any transmission during the current channel occupancy time.

If a gap 1150 among downlink transmission 1140 that the base station intends to perform within the channel occupancy time 1105, the downlink transmission 1130, and the uplink transmission 1132 before that is greater than 16□, the base station may perform sensing for at least one sensing slot interval 1145 and may or may not perform the downlink transmission 1140 according to a sensing result.

If the gap 1150 among the downlink transmission 1140 that the base station intends to perform within the channel occupancy time 1105, the downlink transmission 1130, and the uplink transmission 1132 before that is 16□ (or less than or equal to 16□), the base station may perform the downlink transmission 1140 without channel sensing (without the sensing slot interval 1145).

If the UE performs uplink transmission 1190 within the channel occupancy time 1107 of the base station, and if a gap 1185 between uplink transmission 1190 and downlink transmission 1180 is at most 16□ (or less than or equal to 16□), the UE may perform the uplink transmission 1190 without channel sensing.

If the UE performs uplink transmission within the channel occupancy time 1107 of the base station, and if the gap 1185 between the uplink transmission 1190 and the downlink transmission 1180 is greater than 16□, the UE may perform channel sensing in at least one sensing slot interval within an interval of 25□ immediately before the uplink transmission 1190, and may or may not the uplink transmission 1190 according to a sensing result.

The base station and the UE should not perform any transmission in a set of consecutive symbols in at least an interval of $T_z$=max (0.05$T_x$, 100□) before the next channel occupancy time starts.

Channel Access Procedure for Dynamic Channel Occupancy

Hereinafter, a channel access procedure in a case where a channel access procedure initiation time point of a communication device is variable or dynamic will be described. In a 5G system for performing a communication in a unlicensed band, a base station may perform the following type of channel access procedure or channel sensing when not using a semi-static channel access procedure, or when performing a dynamic channel access procedure.

In the 5G system for performing the communication in the unlicensed band, the base station may perform the following type of channel access procedure or channel sensing when not using the semi-static channel access procedure, or when performing the dynamic channel access procedure.

First Type-Downlink Channel Access Procedure

According to the first type-downlink channel access procedure, the base station may perform sensing on a channel during predetermined time or time corresponding to the number of sensing slots corresponding thereto before downlink transmission, and perform the downlink transmission if the channel is in an idle state. The first type-downlink channel access procedure will be described in more detail as follows.

In the first type-downlink channel access procedure, parameters for the first type-downlink channel access procedure may be determined according to a Quality of service Class Identifier (QCI) or a 5G QoS Identifier (5QI) of a signal to be transmitted in a channel in an unlicensed band. Table 15 below shows an example of a relationship between a channel access priority class and a QCI or 5QI. For example, QCIs 1, 2, and 4 may mean QCI values for services such as Conversational Voice, Conversational Video (Live Streaming), and Non-Conversational Video (Buffered Streaming), respectively.

If a signal for a service which does not match the QCI or 5QI in Table 15 is to be transmitted in the unlicensed band, a transmitting device may select a service and a QCI closest to the QCI or 5QI in Table 15 and select a channel access priority type therefor. In addition, if the signal to be transmitted via a channel in the unlicensed band has a plurality of different QCIs or 5QIs, a channel access priority class may be selected based on a QCI or 5QI having the lowest channel access priority class.

TABLE 15

| Channel Access Priority class (p) | QCI or SQI | $m_p$ | $CW_{min,p}$ | $CW_{max,p}$ | $T_{mcot,p}$ | Allowed $CW_p$ sizes |
|---|---|---|---|---|---|---|
| 1 | 1, 3, 5, 65, 66, 69, 70, 79, 80, 82, 83, 84, 85 | 1 | 3 | 7 | 2 ms | {3, 7} |
| 2 | 2, 7, 71 | 1 | 7 | 15 | 3 ms | {7, 15} |
| 3 | 4, 6, 8, 9, 72, 73, 74, 76 | 3 | 15 | 63 | 8 or 10 ms | {15, 31, 63} |
| 4 | — | 7 | 15 | 1023 | 8 or 10 ms | {15, 31, 63, 127, 255, 511, 1023} |

If a channel access priority class value (p) is determined according to a Quality of service Class Identifier (QCI) or a 5G QoS Identifier (5QI) of the signal to be transmitted via the channel in the unlicensed band, a channel access procedure may be performed using channel access procedure parameters which correspond to the determined channel access priority class value. For example, as shown in Table 15, the channel access procedure may be performed using $m_p$ which determines length of delay duration $T_d$, a contention window (CW) value or a set ($CW_p$) of contention window sizes, and minimum and maximum values ($CW_{min,p}$, $CW_{max,p}$) of a contention window which are channel access procedure parameters corresponding to the channel access priority class value (p). In this case, after channel occupancy, a maximum available channel occupancy interval ($T_{mcot,p}$) may also be determined according to the channel access priority class value (p).

Figure 12:
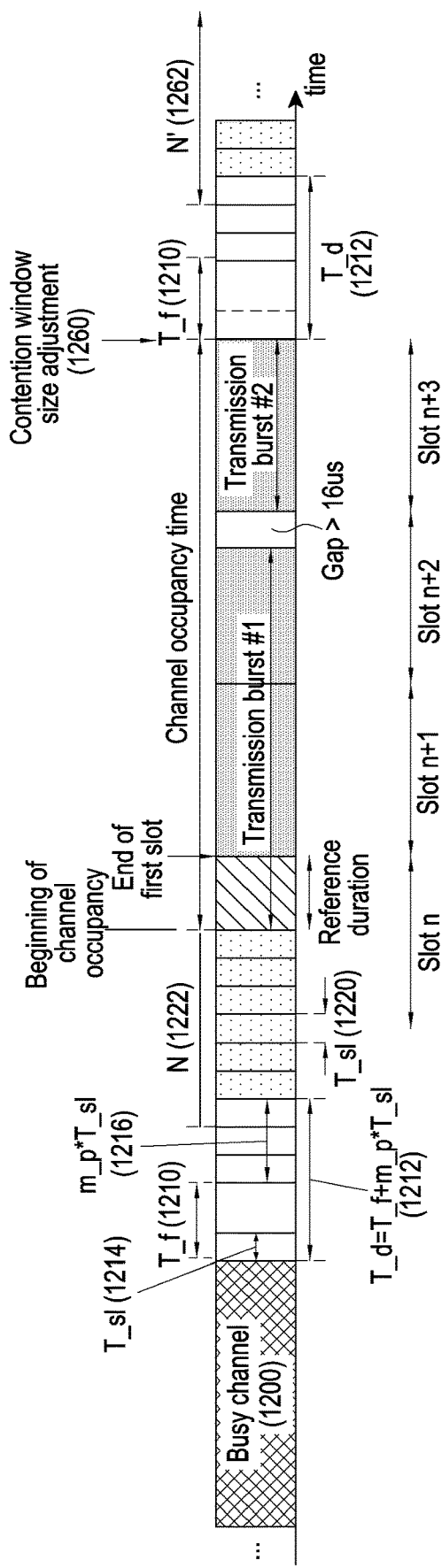
FIG. 12 is a diagram illustrating an example of a channel access procedure for dynamic channel occupancy in a wireless communication system according to an embodiment of the disclosure.

FIG. 12 is a diagram illustrating an example of a channel access procedure for dynamic channel occupancy in a wireless communication system according to an embodiment of the disclosure. That is, an example of a first type-downlink channel access procedure of a base station is shown.

Referring to FIG. 12, a base station which intends to transmit a downlink signal in a unlicensed band may perform a channel access procedure within delay time of at least $T_d$ 1212. Here, the delay interval $T_d$ 1212 may be sequentially configured by $T_f$ 1210 and $m_p \times T_{sl}$ 1216. Here, $T_f$ 1210 may be 16□, and $T_{sl}$ 1214 and 1220 may mean length of a sensing slot. In this case, $T_f$ 1210 may include one sensing slot 1214, and the sensing slot 1214 may be located at a start time point of $T_f$ 1210. If the base station performs the channel access procedure with a channel access priority class 3 (p=3) in Table 15, the delay interval $T_d$ 1212 required for performing the channel access procedure may be determined as $T_f + m_p \times T_{sl}$. Here, it may be $m_p$=3. If the first $T_{sl}$ 1214 of $T_f$ 1210 is in an idle state, the base station may not perform the channel access procedure in the remaining time ($T_f - T_{sl}$) after the first $T_{sl}$ 1214 of $T_f$ 1210. In this case, even if the base station performs the channel access procedure in the remaining time ($T_f-T_{sl}$), a result of the channel access procedure may not be used. In other words, the time $T_f-T_{sl}$ may mean time for delaying the channel access procedure regardless of whether the channel access procedure is performed in the base station.

If it is determined that a unlicensed band is in an idle state in $T_d$ 1212, the base station may start channel occupancy after N sensing slots 1222. Here, N is an integer value arbitrarily selected using 0 and a time point where the channel access procedure is initiated or a value ($CW_p$) of a previous contention interval. That is, it may be a value determined as N=rand(0,$CW_p$). A detailed method of configuring a contention interval will be described again below. For example, in a case of the channel access priority class p=3 in Table 15, a minimum contention interval value and a maximum contention interval value are 15 and 63, respectively, and an available contention interval is {15,31,63}. Accordingly, a value of N may be randomly selected from one interval of 0 to 15, 0 to 31, or 0 to 63 according to a contention interval value. The base station may perform sensing in every sensing slot, and if strength of a received signal measured in a sensing slot is less than a threshold value ($X_{Thresh}$), it may be updated to N=N−1. If the strength of the received signal measured in the sensing slot is greater than or equal to the threshold value ($X_{Thresh}$), the base station may perform channel sensing at the delay time ($T_d$) while maintaining the value of N without decreasing it. If it is determined that N=0, the base station may perform downlink transmission. In this case, the base station may occupy and use the channel for time $T_{mcot,p}$ according to a channel access procedure class and Table 15.

In an embodiment, after channel occupancy time, contention window size adjustment 1260 may be performed. After the contention window size adjustment 1260, $T_d$ 1212 required for performing the channel access procedure may exist again. Time $T_f$ 1210 may be included in the delay interval $T_d$ 1212. After an N' interval 1262, the channel access procedure may be initiated.

The first type-downlink channel access procedure may be divided into the following steps. The base station may sense that a channel is in an idle state during the sensing slot interval of the delay time $T_d$ 1212, and may perform downlink transmission if a value of a counter N is 0. In this case, the counter N may be adjusted according to channel sensing performed in an additional sensing slot interval(s) according to the following steps.

Step 1: It may be set to N=$N_{init}$, and may be moved to step 4. Here, $N_{init}$ is a number randomly selected between 0 and $CW_p$.

Step 2: If N>0, the base station may determine whether to decrease a counter N. If it is determined to decrease the counter, it may be set to N=N−1.

Step 3: The base station may sense a channel during an additional sensing slot interval. If it is determined that the channel is in an idle state, it may be moved to step 4. If the channel is not in the idle state, it may be moved to step 5.

Step 4: If N=0, downlink transmission may be initiated, and if N=0, it may be moved to step 2.

Step 5: The base station may sense a channel until a sensing slot in a busy state is detected within the delay interval $T_d$ or until all sensing slots within the delay interval $T_d$ are detected as being in an idle state.

Step 6: If it is detected that all sensing slots in the delay interval $T_d$ are in the idle state, it may be moved to step 4. If not, it may be moved to step 5.

A procedure for the base station to maintain or adjust the contention interval value ($CW_p$) is as follows. In this case, a contention interval adjustment procedure (contention window adjustment procedure) may be applied when the base station performs downlink transmission including at least a PDSCH which corresponds to a channel access priority class p, and may be configured with the following steps.

Step 1: It may be set to $CW_p$=$CW_{min,p}$ for all channel access priority class p.

Step 2:
  If HARQ-ACK feedback is present (available) after the last update of $CW_p$, it may be moved to step 3.
  In other cases, if retransmission is not included in downlink transmission of the base station transmitted after the first type-channel access procedure, or the downlink transmission is transmitted within an interval $T_w$ from immediately after a reference interval of a downlink transmission burst (DL transmission burst) first transmitted after the first-type channel access procedure after the last updated of $CW_p$, it may be moved to step 5.
  In cases other than the above, it may be moved to step 4.

Step 3: HARQ-ACK feedback for a PDSCH transmitted in a reference interval of the most recent downlink transmission burst in which HARQ-ACK feedback for a PDSCH transmitted in a reference interval is present (available) may be used as follows.
  Among the HARQ-ACK feedback, at least one HARQ-ACK feedback among HARQ-ACK feedback for a PDSCH transmitted in units of a transport block (TB) is ACK, or among the HARQ-ACK feedback, at least 10% of HARQ-ACK feedback for a PDSCH transmitted in units of a code block group (CBG) is ACK, it may be moved to step 1.
  If not, it may be moved to step 4.

Step 4: $CW_p$ for all channel access priority class p may be increased to the next larger value than the current value among allowed values.
  If $CW_p$=$CW_{max,p}$, $CW_p$ allowed as the next largest value is $CW_{max,p}$.
  If $CW_p$=$CW_{max,p}$ is continuously used K times to generate $N_{init}$, $CW_p$ may be initialized to $CW_{max,p}$ for the channel access priority class p. In this case, the base station may select K among {1, 2, . . . , 8} for each channel access priority class p.

Step 5: $CW_p$ may be maintained for all channel access priority class p, and it may be moved to step 2.

In the above, the interval $T_w$ is max($T_A$, $T_B$+1 ms). Here, $T_B$ is an uplink/downlink transmission burst interval from start of the reference interval, and is a value in ms. In a 5G system that performs a communication in a unlicensed band, if it is not guaranteed that another system does not exist which shares and uses a channel in the unlicensed for a long time by regulation and a method at the same level as the regulation band does not exist, $T_A$=5 ms, and otherwise, $T_A$=10 ms.

In an embodiment, a reference interval (reference duration) may mean an interval that occurred first in time among an interval from start of channel occupancy to end of the first slot among the channel occupancy including PDSCH transmission of the base station, in which at least one unicast PDSCH transmitted via all of time-frequency resource regions allocated to a PDSCH is included, or an interval from the start of the channel occupancy to end of a downlink transmission burst, in which the at least one unicast PDSCH transmitted via all of the time-frequency resource regions allocated to the PDSCH is included. If a unicast PDSCH is included in channel occupancy of the base station, but a unicast PDSCH transmitted via all of the time-frequency resource regions allocated to the PDSCH is not included in the channel occupancy of the base station, a first downlink transmission burst interval including the unicast PDSCH may be a reference interval. Here, the channel occupancy may mean transmission performed by the base station after the channel access procedure.

2A Type-Downlink Channel Access Procedure

According to a 2A type-downlink channel access procedure, a base station may perform sensing on a channel at least in an interval of $T_{short\_dl}=25\square$ immediately before downlink transmission, and may perform downlink transmission if the channel is in an idle state. At this time, $T_{short\_dl}$ has length of 25$\square$, and $T_f=16\square$ and one sensing slot ($T_{sl}=9\square$) are sequentially configured. Here, $T_f$ includes one sensing slot ($T_{sl}=9\square$), and start time of the sensing slot may be the same as start time of $T_f$. That is, $T_f$ may start with the sensing slot ($T_{sl}$). If the base station performs downlink transmission that does not include a downlink data channel transmitted to a specific UE, the 2A type-downlink channel access procedure may be performed.

2B Type-Downlink Channel Access Procedure

According to the 2B type-downlink channel access procedure, a base station may perform sensing on a channel at least in an interval of $T_f=16\square$ immediately before downlink transmission, and may perform downlink transmission if the channel is in an idle state. Here, $T_f$ may include one sensing slot ($T_{sl}=9\square$), and the sensing slot may be located at the last 9$\square$ of $T_f$. That is, $T_f$ ends with a sensing slot ($T_{sl}$). The 2B type-downlink channel access procedure is applicable if a gap between start of the downlink transmission that the base station intends to transmit and end of uplink transmission of a UE is 16$\square$ or 16$\square$ or less.

2C Type-Downlink Channel Access Procedure

A 2C type-downlink channel access procedure is applicable if a gap between start of downlink transmission by a base station and end of uplink transmission by a UE is 16$\square$ or 16$\square$ or less, and the base station may perform the downlink transmission without a separate procedure or channel sensing. In this case, a maximum interval of downlink transmission performed after the 2C type-downlink channel access procedure may be 584$\square$.

Here, the 2A, 2B, and 2C type-downlink channel access procedures are characterized in that, unlike the first downlink channel access procedure, a channel sensing interval or time point performed by the base station before the downlink transmission is deterministic. Based on this characteristic, it is also possible to further classify a downlink channel access procedure as follows.

Type 1: It is a type of performing downlink transmission after performing a channel access procedure during variable time, and corresponds to the first type-downlink channel access procedure.

Type 2: It is a type of performing downlink transmission after performing a channel access procedure during fixed time, and corresponds to the 2A type and 2B type-downlink channel access procedures.

Type 3: It is a type for performing downlink transmission without performing a channel access procedure and corresponds to the 2C type-downlink channel access procedure.

Procedure of Adjusting Energy Detection Threshold Value

A base station performing a channel access procedure or channel sensing may set an energy detection threshold value or a sensing threshold value $X_{Thresh}$ as follows. $X_{Thresh}$ needs to be set to a value equal to or less than a maximum energy detection threshold value or $X_{Thresh\_max}$ indicating a sensing threshold value, and a unit thereof is dBm.

In a 5G system that performs a communication in a unlicensed band, if it is possible to guarantee that another system does not exist which shares and uses a channel in the unlicensed band for a long time by regulation and a method at the same level as the regulation, $X_{Thresh\_max}=\min\{T_{max}+10\text{ dB}, X_r\}$. If the maximum energy detection threshold value required by the regulation is not set or defined, it may be $X_r=T_{max}+10$ dB.

If it is not the case above, that is, if it is not the case where it is possible to guarantee that the other system does not exist which shares and uses the channel in the unlicensed band for a long time by the regulation and the method at the same level as the regulation in the 5G system that performs the communication in the unlicensed band, the maximum energy detection threshold value may be determined as shown in Equation 1 below.

$$X_{Thresh\_max} = \max\left\{\begin{array}{l} -72 + 10\log 10(BW\text{ MHz}/20\text{ MHz})\text{ dBm}, \\ \min\left\{\begin{array}{l} T_{max}, \\ T_{max} - T_A + (P_H + 10\log 10(BW\text{ MHz}/20\text{ MHz}) - P_{TX}) \end{array}\right\} \end{array}\right\} \quad \text{Equation 1}$$

In Equation 1, $T_A$ is 10 dBm upon transmission including a PDSCH, and $T_A$ is 5 dB upon transmission including a discovery signal and channel $P_H$ is 23 dBm, and $P_{TX}$ is maximum output power of a base station and a unit thereof is dBm. The base station may calculate a threshold value using maximum transmit power transmitted via one channel regardless of whether downlink transmission is transmitted via the one channel or a plurality of channels. Here, $T_{max}=10\log_{10}(3.16228\cdot0\cdot10^{-8}\text{ (mw/Mhz)}\cdot BW\text{MHz (MHz)})$, and BW is a bandwidth for the one channel and a unit thereof is MHz.

In an embodiment, a method for a UE to determine an energy detection threshold value $X_{Thresh}$ is as follows.

A base station may set a maximum energy detection threshold value of a UE via higher layer signaling, for example, 'maxEnergyDetectionThreshold'. The UE provided or configured with 'maxEnergyDetectionThreshold' from the base station may set $X_{Thresh\_max}$ to a value configured by the parameter. A UE which is not provided or not configured with 'maxEnergyDetectionThreshold' from the base station may set $X_{Thresh\_max}$ as follows. If the UE is not provided or configured with an energy detection threshold offset from the base station, the UE may set $X_{Thresh\_max}$ to $X'_{Thresh\_max}$. If the UE is provided with or configured with the energy detection threshold offset from the base station, the UE may set $X'_{Thresh\_max}$ to a value adjusted by the energy detection threshold offset. Here, $X_{Thresh\_max}$ may be determined as follows.

In a 5G system that performs a communication in a unlicensed band, if it is possible to guarantee that another system does not exist which shares and uses a channel in the unlicensed band for a long time by regulation and a method at the same level as the regulation, the base station may the UE with higher layer signaling, for example, 'absenceOfAnyOtherTechnology'. The UE provided or configured with 'absenceOfAnyOtherTechnology' via the higher layer signaling from the base station may set $X'_{Thresh\_max}=\min\{T_{max}+10\text{ dB}, X_r\}$. Here, $X_r$ is a maximum energy detection threshold value required by regulation per region, and a unit thereof is dBm. If the maximum energy detection threshold value required by the regulation is not set or defined, $X_r=T_{max}+10$ dB. A UE which is not provided or configured with 'absenceOfAnyOtherTechnology' via the higher layer signaling from the base station may determine $X'_{Thresh\_max}$ using Equation 1 above. At this time, $T_A=10$ dBm, $P_H=23$ dBm, and $P_{TX}$ is $P_{CMAX\_H,c}$.

Directional Channel Access Procedure

In a case of a base station and a UE performing a communication in a unlicensed band, if the base station and/or the UE intends to perform the communication using a plurality of beams, the base station or the UE may perform a channel access procedure for a beam (or a direction) to transmit a signal. For example, in FIG. 1, a base station may perform a channel access procedure for at least one of beams 112 or 113 in a specific direction. Such a channel access procedure may be referred to as a directional channel access procedure or a directional LBT. More specifically, the directional channel access procedure may mean a procedure of performing sensing on a beam (or reception beam) including at least a beam to be transmitted (or transmission beam) or a direction corresponding to the beam, and assessing a possibility of performing transmission using a transmission beam in a channel based on the sensing.

For example, if a basic unit of sensing is a sensing slot ($T_{sl}$) of an interval of X☐, if power detected during at least Y☐(Y<X) of a sensing slot interval in which sensing is performed in a transmission beam or a direction of the transmission beam is less than)(Thresh, the sensing slot interval in the direction of the transmission beam may be regarded as being idle or not being used. If the power detected during the at least Y☐ (Y<X) of the sensing slot interval is greater than or equal to $X_{Thresh}$, the sensing slot interval in the direction of the transmission beam may be regarded as being busy or being used by another device. Therefore, depending on a result of the directional channel access procedure, the base station or the UE may transmit a signal in a specific beam or a specific direction which succeeds in channel occupancy, and may not transmit a signal in a specific beam or direction in which the channel occupancy fails.

Although it has been described above that the directional channel access procedure is performed based on the beam, the directional channel access procedure may be performed using parameters other than the beam.

For example, the directional channel access procedure may mean a procedure of performing channel sensing on a spatial domain transmission filter (or referred to as a spatial Tx filter) set by a base station or a UE to transmit a signal or a spatial domain reception filter (or referred to as a spatial Rx filter) set based on the transmission filter, and assessing a possibility of performing transmission using the transmission beam in a channel based on the channel sensing.

For another example, the directional channel access procedure may mean a procedure of performing channel sensing on a spatial domain transmission filter used by the base station to transmit a synchronization signal block (SSB) or a reception filter set based on the transmission filter, and assessing a possibility of performing transmission using the transmission beam in a channel based on the channel sensing.

For still another example, the directional channel access procedure may mean a procedure of performing channel sensing according to a TCI-state configured or indicated for a signal to be transmitted by the base station or the UE, and assessing a possibility of performing transmission using the transmission beam in a channel based on the channel sensing. For example, the base station and the UE may perform the channel sensing for a configured reception filter based on a spatial domain transmission filter configured to transmit a reference signal configured or indicated for the TCI state of the signal to be transmitted or the filter.

Hereinafter, for convenience of a description, the directional channel access procedure will be described as performing sensing based on a TCI-state configured or indicated for a signal to be transmitted by the base station or the UE, but various embodiments proposed in the disclosure may be applied not only to a case of performing the sensing based on the TCI-state, but also to a case of performing the directional channel access procedure according to the various examples described above.

Carrier Set or Cell Set

A channel size of a unlicensed band may vary according to a region and/or a band. For example, in a frequency band of 60 GHz, the channel size of the unlicensed band may be defined as 2.16 GHz. In general, a maximum bandwidth supported by a UE in an NR system is 400 MHz. So, if a size of a channel bandwidth in which a UE intends to perform a communication is wider than a size of a maximum carrier bandwidth that the UE may support, or if the size of the maximum carrier bandwidth that the UE may support is narrower than the size of the channel bandwidth in which the UE intends to perform the communication, the UE may perform the communication which uses the channel bandwidth using a plurality of carriers or cells.

If the size of the maximum carrier bandwidth that the UE may support is narrower than a size of a channel to be used for performing the communication, the UE may use at least one (hereinafter, for convenience of a description, a carrier set, a carrier group, or a cell group may be used interchangeably, but the content of the disclosure is not limited thereto) of a plurality of carriers (hereinafter, referred to as a carrier set or group, a cell set or group, or a bandwidth part set or group) to configure a bandwidth whose size is wider than or equal to the size of the channel, and may perform the communication through this. In this case, it is also possible for the UE to perform the communication using a carrier set with a bandwidth narrower than the size of the channel. In this case, the bandwidth narrower than the size of the channel may be a minimum bandwidth size that satisfies a requirement for performing the communication in the unlicensed band.

In this case, in order to minimize inter-carrier interference, a guard band may exist, and the guard band may be pre-defined or configured to the UE via higher layer signaling. In this case, the guard band may be pre-defined or configured via the higher layer signaling by being divided into a downlink or uplink guard band, and a size thereof may be the same or different. In addition, the guard band may be used as a guard band (not used for uplink/downlink transmission and reception) or used for uplink/downlink transmission and reception depending on whether uplink/downlink transmission between carriers is performed.

Figure 13:
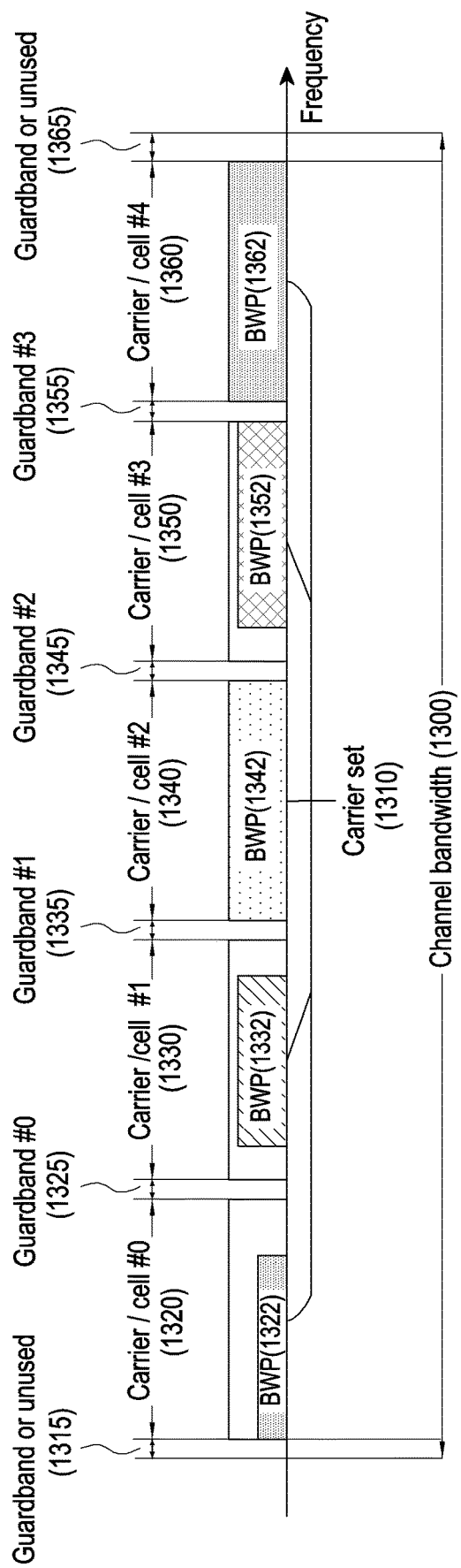
FIG. 13 is a diagram illustrating an example of a carrier set according to an embodiment of the disclosure.

FIG. 13 is a diagram illustrating an example of a carrier set according to an embodiment of the disclosure.

Referring to FIG. 13, performing a channel access procedure for a channel bandwidth 1300 of a unlicensed band channel in a base station or a UE may be the same as performing a channel access procedure for each carrier set 1310 configured for the channel bandwidth 1300. That is, performing the channel access procedure for the channel bandwidth 1300 of the unlicensed band channel in the base station or the UE may include performing the channel access procedure in each of carriers 1320, 1330, 1340, 1350, 1360 included in the carrier set 1310, and occupying the unlicensed band channel if the channel access procedure is successful in all of the carriers 1320, 1330, 1340, 1350, and 1360. In this case, if the channel access procedure fails in at least one carrier among the performed channel access procedures, the base station or the UE may not use the unlicensed band channel.

Like this, in a case of performing the channel access procedure for the carrier set or in a case of using a shared spectrum channel access (for operation with shared spectrum channel access), it is required to minimize a unnecessary PDCCH detection operation of the UE. For example, in a case of a UE configured with a carrier set, a PDCCH detection operation may be performed in each carrier included in the carrier set. In this case, the UE performs a large number of PDCCH detection operations compared to a case of performing a communication in the unlicensed band channel using a single carrier, so power consumption of the UE increases.

So, in order to solve this problem, there is a need for a method in which DCI transmitted via a PDCCH on one carrier may schedule a plurality of PDSCHs or PUSCHs. In particular, there is a need for a method in which the DCI schedules a PDSCH or a PUSCH for different carriers or bandwidth parts. So, the disclosure proposes embodiments in which DCI transmitted in one carrier schedules a PDSCH or a PUS CH in one or a plurality of carriers among carriers included in a carrier set 1310, and through this, may minimize unnecessary PDCCH detection in a UE. The embodiments proposed in the disclosure are applicable not only to a case of performing a channel access procedure, but also to a case where a communication may be performed without performing a separate channel access procedure (for operation without shared spectrum channel access). In addition, embodiments proposed in the disclosure are applicable not only to a unlicensed band but also to a licensed band.

Hereinafter, for convenience of a description, a case in which PDSCH reception is indicated or scheduled via DCI will be described as an example, but it is apparent that embodiments of the disclosure may be applied to a case in which PUSCH transmission is indicated or scheduled via the DCI. In addition, in the disclosure, for convenience of a description, the description will be made on assumption that a communication between a base station and a UE is performed, but it will be applicable to a case of performing a communication between the UE and another UE. In the case of performing the communication between the UE and the other UE, at least one UE may have the same function as the base station or a function similar to the base station.

Cell Grouping

In an embodiment, the base station and/or the UE may schedule at least one downlink data channel (PDSCH) for at least one of one or more cells, carriers, and bandwidth parts with one piece of downlink control information (DCI). The base station may configure and transmit the DCI, and the UE may interpret and determine the DCI received from the base station. Hereinafter, for convenience of a description, embodiments in which DCI schedules a PDSCH for one cell or a plurality of cells will be described, but the disclosure is not limited thereto, and embodiments of the disclosure will be able to apply at least to one or a combination of the followings.

Case in which DCI schedules a PDSCH for a cell, or

Case in which DCI schedules a PDSCH for each of one or a plurality of active bandwidth parts of a cell, or Case in which DCI schedules a PDSCH for an active bandwidth part whose change is indicated and an active bandwidth part whose change is not indicated for all or part of one or a plurality of active bandwidth parts of a cell, or Case in which DCI schedules a PDSCH for each of a plurality of cells, or Case in which DCI schedules a PDSCH for each of one or a plurality of active bandwidth parts of a plurality of cells, or Case in which DCI schedules a PDSCH for an active bandwidth part whose change is indicated and an active bandwidth part whose change is not indicated for all or part of one or a plurality of active bandwidth parts of a plurality of cells.

A UE may report UE capability information indicating that the UE may have or support a capability to receive PDSCHs in one or more cells to a base station via higher layer signaling. In response to the UE capability information, the base station may provide configuration information to configure the UE to receive PDSCHs in one or more cells by one DCI via higher layer signaling. The UE receiving the configuration information may receive the one or more PDSCHs in the one or more cells according to the configuration information. The configuration information my configure the UE to receive the PDSCHs in the one or more cells by the one DCI by including at least one of information about a scheduling cell (e.g., 'servingcellID' indicating the scheduling cell), cell group information and/or carrier set information, or information about a scheduled cell (e.g., 'cif-InSchedulingCell'). The configuration information may be the same as or similar to configuration information on cross-carrier scheduling for scheduling another cell or carrier in one cell or carrier. Configuration information according to embodiments of the disclosure may include parameters independent of cross-carrier scheduling configuration information.

The following shows parameters of configuration information of a base station to provide a UE with cross-carrier scheduling configuration according to an embodiment of the disclosure.

```
CrossCarrierSchedulingConfig ::=    SEQUENCE {
    schedulingCellInfo                  CHOICE {
        own                                 SEQUENCE {    -- Cross carrier
scheduling: scheduling cell
            cif-Presence                        BOOLEAN
        },
        other                               SEQUENCE {    -- Cross carrier
scheduling: scheduled cell
            schedulingCellId                    ServCellIndex,
            cif-InSchedulingCell                INTEGER (1..7)
```

```
            }
         },
         ...,
         [[
            carrierIndicatorSize             SEQUENCE {
               carrierIndicatorSizeForDCI-Format1-2-r16      INTEGER (0..3),
               carrierIndicatorSizeForDCI-Format0-2-r16      INTEGER (0..3)
            }                                                OPTIONAL    -- Cond CIF-
   PRESENCE
         ]]
      }
```

'carrierIndicatorSize' is a parameter for configuring a size or the number of bits of a carrier indicator field (CIF) in DCI for scheduling a PDSCH or PUSCH. The UE may determine the cell or carrier of the PDSCH or PUSCH scheduled by the DCI via the CIF of the DCI.

'own' is a parameter for self-scheduling (if DCI and a PDSCH scheduled by the DCI are transmitted and received in the same carrier or cell), and is used if the PDSCH of the cell is scheduled via a PDCCH transmitted from the cell. 'cif-Presence' in 'own' is a parameter indicating whether the CIF is present in the DCI. If 'cif-Presence' is set to true, a CIF value for a cell (i.e., a scheduling cell) in which the DCI is transmitted is 0.

'other' is a parameter for cross-carrier scheduling, and is a parameter for a cell (i.e., a serving cell) in which a PDSCH is scheduled via a PDCCH transmitted from a scheduling cell. The UE may be configured with a scheduling cell in which the DCI is transmitted via 'schedulingCellId' in 'other'. 'cif-InSchedulingCell' in 'other' is a CIF value used in the scheduling cell, and the UE may receive the DCI transmitted in the scheduling cell indicated by 'schedulingCellId', and may determine that a PDSCH is scheduled in the scheduling cell if the CIF value included in the DCI indicates a CIF value set for the cell.

In an embodiment of the disclosure, in order to schedule PDSCHs in one or more cells with one DCI, a CIF may be included in the DCI, and the CIF may be configured as a bitmap. In addition, the DCI according to an embodiment of the disclosure may include a cell group indicator field (cellGroup Indication Field, GIF) in addition to the CIF, or may include only the GIF without the CIF. PDSCHs for one or more cells may be scheduled to a UE via at least one field of the CIF and the GIF in the DCI. Here, a cell group may mean a set of cells (corresponding to carriers) in which PDSCHs may be scheduled via the DCI, and a cell ID included in the cell group and a group ID of the cell group may be configured to the UE via higher layer signaling.

As an embodiment, in order to schedule one or more PDSCHs in one or more cells via one DCI, higher layer signaling including at least one of the following parameters may be transmitted from a base station to a UE.

'carrierIndicatorSize' or 'cellgroupIndicatorSize': indicates the maximum number of cells which may be scheduled with one DCI, and is a parameter which configures a size or the number of bits of the CIF (or GIF).

'own': contains 'cif-Presence', and if 'cif-Presence' (or 'gif-Presence') is set to true, bits of a CIF bitmap (or a GIF bitmap) indicating a CIF value (or a GIF value) for a cell (i.e. a scheduling cell) in which a DCI is transmitted are all zeros or all ones.

'cif-InSchedulingCell' (or 'gif-InSchedulingCell'): may indicate a CIF value (or a GIF value) for a cell (i.e., a scheduled cell) in which a PDSCH is received, or may indicate a location of a bit which corresponds to the cell (i.e., the scheduled cell) in which the PDSCH is received in CIF (or GIF) information configured in a form of a bitmap.

'positionInCIF' (or 'positionInGIF'): If 'cif-InSchedulingCell' (or 'gif-InSchedulingCell') is not present in configuration information, or 'cif-InSchedulingCell' (or 'gif-InSchedulingCell') is used for indicating a CIF value (or a GIF value) for a cell (a scheduled cell) in which a PDSCH is received, 'positionInCIF' may be added to the configuration information to indicate a location of a bit corresponding to the cell (the scheduled cell) in which the PDSCH is received in CIF (or GIF) information configured in a form of a bitmap. At this time, if 'positionInCIF' (or 'positionInGIF') is not present in the configuration information, bits in the bitmap may be sequentially mapped from an MSB (or an LSB) to cells included in a cell group in an order from a lowest servingcellID to a highest servingcellID (or in an order from a highest servingcellID to a lowest servingcellID).

The configuration information in the higher layer signaling described above is only an example, and embodiments of the disclosure are not limited thereto.

As an embodiment, a UE provided with or configured to receive configuration information on receiving of PDSCHs in one or more cells with one DCI from a base station, may identify a cell (i.e., a scheduled cell) in which a PDSCH is scheduled via at least one field of a CIF and a GIF in the DCI, and receive the PDSCH in the identified cell.

For example, referring to FIG. 13, a cell group capable of scheduling a PDSCH with DCI consists of a cell #0 1320, a cell #1 1330, a cell #2 1340, a cell #3 1350, and a cell #4 1360, and the cell #2 1340 may be a scheduling cell. A CIF or a GIF in the DCI consists of a bitmap consisting of 5 bits, which is the number of cells included in a cell group, and bits in the bitmap may be sequentially mapped from a cell having a small cell ID to a cell having a large cell ID (the cell #0 to the cell #4) in an order of an MSB to an LSB. For example, if a CIF or GIF bitmap included in the DCI received by the UE is '01110', the UE may determine that a PDSCH is scheduled in each of the cell #1 1330, the cell #2 1340, and the cell #3 1350, and may receive PDSCHs in the cells 1330, 1340, and 1350 based on the DCI.

In an embodiment, the DCI may include one or more frequency domain resource allocation (frequency domain resource assignment) fields for each of PDSCHs in a plurality of scheduled cells.

DCI Size

In an embodiment, DCI scheduling PDSCHs for one or more cells may include one frequency domain resource allocation field. A UE may identify a frequency domain resource of a PDSCH in scheduled cells by commonly applying the frequency domain resource allocation field in the DCI to each of the scheduled cells.

Hereinafter, a method in which a base station configures a frequency domain resource allocation field for one DCI scheduling PDSCHs for one or more cells and a method in which a UE receiving the DCI applies the frequency domain resource allocation field to one or more scheduled cells will be described.

A frequency domain resource allocation field of a PDSCH may be allocated according to two resource allocation types as follows. In this case, the two resource allocation types are only an example, and it is also possible to use another type of resource allocation scheme.

The UE may be configured, via higher layer signaling, to use at least one of the two resource allocation types for receiving the PDSCH, and may receive the PDSCH using the configured resource allocation type. If the UE is configured to use both of the two resource allocation types via the higher layer signaling, a resource allocation type of a PDSCH scheduled by the DCI may be indicated to the UE via the frequency domain resource allocation field in the DCI.

Specifically, the base station may configure the UE with a resource allocation type for the UE as one of 'resourceAllocationType0', 'resourceAllocationType1', or 'dynamicSwitch' via a higher layer parameter 'resourceAllocation'. 'dynamicSwitch' may mean configuring both resource allocation types 0 and 1 to the UE. If the higher layer parameter 'resourceAllocation' is set to 'dynamicSwitch', 1 MSB of a resource allocation field in the DCI may be used to indicate the resource allocation type 0 or the resource allocation type 1, and based on the resource allocation type indicated by the MSB, the remaining bits except for the MSB may be used to indicate a frequency domain resource to the UE. The resource allocation types may be described as follows.

Resource allocation type 0: is a method of allocating a resource in units of a Resource Block Group (RBG) composed of consecutive PRBs, and a resource allocation field in DCI may be configured in a form of a bitmap. In this case, the RBG may be composed of a set of consecutive Virtual RBs (VRBs), and a size P of the RBG (nominal RBG size P) may be determined based on a value set by a higher layer parameter 'rbg-Size' and a size $N_{BWP,i}^{size}$ of a bandwidth part i defined in Table 5 above.

Resource Allocation Type 1: is a method of allocating a resource by a start location and length for consecutively allocated VRBs. In this case, interleaving or non-interleaving may be additionally applied to the consecutively allocated VRBs. A resource allocation field of the resource allocation type 1 may consist of a resource indicator value (Resource Indication Value; RIV), and the RIV may correspond to a start VRB ($RB_{start}$) among the allocated VRBs and length ($L_{RBs}$) of consecutively allocated RBs. $RB_{start}$ may be a first PRB index at which resource allocation starts, and $L_{RBs}$ may indicate length or the number of the allocated consecutive PRBs. More specifically, the RIV in a bandwidth part of a size $N_{BWP,i}^{size}$ may be defined as follows.

If $(L_{RBs} - 1) \leq \left\lfloor \frac{N_{BWP}^{size}}{2} \right\rfloor$ then $RIV = N_{BWP}^{size}(L_{RBs} - 1) + RB_{start}$ Else, $RIV = N_{BWP}^{size}(N_{BWP}^{size} - L_{RBs} - 1) + (N_{BWP}^{size} - 1 - RB_{start})$ where, $L_{RBs} \geq 1$ and shall not exeed $N_{BWP}^{size} - RB_{start}$ In this case, a DCI format 1_0, which is a fallback DCI format, is transmitted in a UE-specific search space (USS), and if a size of the fallback DCI format is derived or calculated from a DCI format size when transmitted in a common search space, however, the DCI is applied to an active bandwidth part of a size $N_{BWP}^{active}$, the RIV corresponds to $RB_{start}=0, K, 2K, \ldots (N_{BWP}^{initial}-1)K$ and $L_{RBs}=K, 2K, \ldots N_{BWP}^{initial}K$, and the RIV is defined as follows.

If $(L'_{RBs} - 1) \leq \lfloor N_{BWP}^{initial}/2 \rfloor$ then $RIV = N_{BWP}^{initial}(L'_{RBs} - 1) + RB'_{start}$ Else, $RIV = N_{BWP}^{initial}(N_{BWP}^{initial} - L'_{RBs} - 1) + (N_{BWP}^{initial} - 1 - RB'_{start})$ where, $L'_{RBs} = L_{RBs}/K$, $RB'_{start} = \frac{RB_{start}}{K}$, $L'_{RBs}$ shall not exceed $N_{BWP} - RB'_{start}$ if $N_{BWP}^{active} > N_{BWP}^{initial}$, K is the largest value satisfying $K \leq \lfloor N_{BWP}^{active}/N_{BWP}^{initial} \rfloor$ among a set $\{1, 2, 4, 8\}$. Otherwise (that is, if $N_{BWP}^{active} \leq N_{BWP}^{initial}$), K is 1. Here, determined as one of the following.

Size of a CORESET #0 if a CORESET (CORESET #0) having an index 0 is configured for a cell, or Size of an initial downlink bandwidth part if the CORESET (CORESET #0) having the index 0 is not configured for the cell In other words, a size (the number of bits) of a frequency domain resource allocation field in a DCI for scheduling a PDSCH may be determined according to at least one of a resource allocation type, a type of a DCI format (e.g., whether it is a fallback DCI format or a non-fallback DCI format), and a search space of the DCI.

For example, if DCI is a fallback DCI format (e.g., a DCI format 1_0), a resource allocation type 1 is used, and a size of a frequency domain resource allocation field in the DCI $\lceil \log_2(N_{RB}^{DL,BWP}(N_{RB}^{DL,BWP}+1)/2) \rceil$ bits. If the DCI is transmitted in a UE-specific search space, $N_{RB}^{DL,BWP}$ is a size of a downlink bandwidth part activated at a time point or slot at which the DCI is received. If the DCI is transmitted in a common search space, $N_{RB}^{DL,BWP}$ is determined through one of the following.

Size of a CORESET #0 if a CORESET (CORESET #0) having an index 0 is configured for a cell, or Size of an initial downlink bandwidth part if the CORESET having the index 0 is not configured for the cell For example, if a DCI is a non-fallback DCI format (e.g., a DCI format 1_1), a resource allocation type configured via higher layer signaling from a base station is used, and a size of a frequency domain resource allocation field in the DCI is determined as one of the following.

$N_{RBG} = \lceil (N_{BWP,i}^{size} + (N_{BWP,i}^{start} \mod P))/P \rceil$ bits if a resource allocation type 0 is configured, or $\lceil \log_2(N_{RB}^{DL,BWP}(N_{RB}^{DL,BWP}+1)/2) \rceil$ bits if a resource allocation type 1 is configured, or if all of resource allocation types 0 and 1 are configure, $$-\max\left(\left\lceil\log_2\left(\frac{N_{RB}^{DL,BWP}(N_{RB}^{DL,BWP}+1)}{2}\right)\right\rceil, N_{RBG}\right)+1 \text{ bits}$$

Here, $N_{BWP,i}^{size}$ and $N_{RB}^{DL,BWP}$ are a size of a downlink bandwidth part activated at a time point or a slot at which the DCI is received. If the UE is configured with all of resource allocation types 0 and 1 (or if a higher layer parameter 'resourceAllocation' is set to 'dynamicSwitch'), an MSB of a resource allocation field in the DCI indicating scheduling may indicate the resource allocation type 0 or the resource allocation type 1.

If the resource allocation type 0 is used, $N_{RBG}$ LSBs in the resource allocation field in the DCI according to at least one of a bandwidth part, RB numbering, and a type of a search space in which the DCI is received which are determined above may provide resource allocation information. If the resource allocation type 1 is used, $\lceil\log_2(N_{RB}^{DL,BWP}(N_{RB}^{DL,BWP}+1)/2)\rceil$ LSBs may provide resource allocation information according to at least one of the bandwidth part, the RB numbering, and the type of search space in which the DCI is received which are determined above among the resource allocation field of $\lceil\log_2(N_{RB}^{DL,BWP}(N_{RB}^{DL,BWP}+1)/2)\rceil$ bits in the DCI.

If the DCI does not include a bandwidth part indicator field or the UE does not support active bandwidth part change via the DCI, RB indexing in the resource allocation type 0 and the resource allocation type 1 is determined within an active bandwidth part of the UE. If the DCI includes the bandwidth part indicator field and the UE supports the active bandwidth part change via the DCI, the RB indexing in the resource allocation type 0 and the resource allocation type 1 is determined within a bandwidth part indicated via the bandwidth part indicator. That is, the UE may first determine the bandwidth part indicated by the DCI, and interpret frequency domain resource allocation information within the determined bandwidth part.

In this case, if a DCI of a fallback DCI format (e.g., a DCI format 1_0) is transmitted through a common search space, frequency domain resource allocation information on a PDSCH scheduled via the DCI may use RB numbering starting from a lowest RB index of a CORESET in which the DCI scheduling the PDSCH is received regardless of an active bandwidth part of a UE. If the DCI of the DCI format 1_0, which is one of fallback DCI formats, is not transmitted through the common search space, for example, transmitted through a UE-specific search space, the frequency domain resource allocation information on the PDSCH scheduled via the DCI may use RB numbering starting from a lowest RB index of the determined bandwidth part.

Upon scheduling one or more PDSCHs for one or more cells with one DCI, a size (the number of bits) of a frequency domain resource allocation field in the DCI may be determined in consideration of at least one of a size of a bandwidth part and/or a carrier bandwidth of each of the one or more cells included in a cell group. For example, if the DCI is transmitted through a UE-specific search space, a base station and a UE may determine the size (the number of bits) of the frequency domain resource allocation field with one of the following methods or a combination of the following methods.

Method 1-1: A size of a frequency domain resource allocation field may be determined based on a size of a bandwidth part whose size is the largest (or a bandwidth part whose size is the smallest) among all bandwidth parts configured in cells included in a cell group. The size of the largest bandwidth part (or the bandwidth part whose size is the smallest) may be or $N_{BWP,i}^{size}$ or $N_{RB}^{DL,BWP}$ according to a resource allocation type, and the size (the number of bits) of the frequency domain resource allocation field may be determined according to the size of the bandwidth part.

In this case, if there are a plurality of bandwidth parts whose size is the largest (or smallest) among the configured bandwidth parts, a size of a cell whose cell ID is the lowest (or largest) or a size of a bandwidth part whose bandwidth part ID is the lowest (or largest) may be $N_{BWP,i}^{size}$ or $N_{RB}^{DL,BWP}$. For example, in FIG. 13, if a bandwidth part whose size is the largest among bandwidth parts configured in each cell is a bandwidth part 1322 of the cell #0 1320, a bandwidth part 1332 of the cell #1 1330, a bandwidth part 1342 of the cell #2 1340, a bandwidth part 1352 of the cell #3 1350, and a bandwidth part 1362 of the cell #4 1360, a size of a frequency domain resource allocation field for PDSCHs allocated to the cells may be determined using a bandwidth part size (or the number of RBs) of the bandwidth part 1342 of the cell #2 1340 or the bandwidth part 1362 of the cell #4 1360 whose size is the largest among the bandwidth parts 1322, 1332, 1342, and 1352. In an embodiment, the size of the bandwidth part 1342 of the cell #2 1340 having a low cell ID may be $N_{BWP,i}^{size}$ or $N_{RB}^{DL,BWP}$ according to a resource allocation type.

Method 1-2: Based on a size of a bandwidth part whose size is the largest (or a bandwidth part whose size is the smallest) among the bandwidth parts activated in a slot or at a time point at which DCI is received among bandwidth parts configured in cells included in a cell group, a size of a frequency domain resource allocation field may be determined. The size of the largest bandwidth part (or the bandwidth part whose size is the smallest) may be $N_{BWP,i}^{size}$ or $N_{RB}^{DL,BWP}$, and a size (the number of bits) of the frequency domain resource allocation field may be determined according to the size of the bandwidth part.

In this case, if there are a plurality of bandwidth parts whose size is the largest (or smallest) among the active bandwidth parts, a size of a cell whose cell ID is the lowest (or largest) or a size of a bandwidth part whose bandwidth part ID is the lowest (or largest) may be $N_{BWP,i}^{size}$ or $N_{RB}^{DL,BWP}$. For example, in FIG. 13, if an active bandwidth part among bandwidth parts configured in each cell is a bandwidth part 1322 of the cell #0 1320, a bandwidth part 1332 of the cell #1 1330, a bandwidth part 1342 of the cell #2 1340, a bandwidth part 1352 of the cell #3 1350, and a bandwidth part 1362 of the cell #4 1360, a size of a frequency domain resource allocation field for PDSCHs allocated to the cells may be determined using a bandwidth part size (or the number of RBs) of the bandwidth part 1342 of the cell #2 1340 or the bandwidth part 1362 of the cell #4 1360 whose size is the largest among the active bandwidth parts 1322, 1332, 1342, and 1352. In an embodiment, the size of the bandwidth part 1342 of the cell #2 1340 having a low cell ID may be $N_{BWP,i}^{size}$ or $N_{RB}^{DL,BWP}$ according to a resource allocation type.

Method 1-3: A size (the number of bits) of a frequency domain resource allocation field may be determined based on a scheduling cell in which DCI is transmitted among cells included in a cell group. For example, the size of the frequency domain resource allocation field may be determined using a size (or the number of RBs) of a bandwidth part whose size is the largest (or the smallest) among all bandwidth parts configured in the scheduling cell. For another example, the size of the frequency domain resource allocation field may be determined using a size (or the number of RBs) of an active bandwidth part among the bandwidth parts configured in the scheduling cell. For still another example, if a CORESET having an CORESET index 0 is not configured for the scheduling cell, the size (the number of bits) of the frequency domain resource allocation field may be determined based on an initial downlink bandwidth part (an initial DL bandwidth part) of the scheduling cell. If the CORESET having the CORESET index 0 is configured for the scheduling cell, the size (the number of bits) of the frequency domain resource allocation field may be determined based on a size (e.g., the number of RBs) of the CORESET (the CORESET #0) having the CORESET index 0 of the scheduling cell.

If DCI is transmitted through a common search space, a base station and a UE may determine a size (the number of bits) of a frequency domain resource allocation field with one of the following methods or a combination of the following methods.

Method 2-1: If a CORESET with a CORESET index 0 is configured among all bandwidth parts configured in cells included in a cell group or among active bandwidth parts among the configured bandwidth parts, a size (the number of bits) of a frequency domain resource allocation field may be determined based on a size (e.g., the number of RBs) of the CORESET (CORESET #0) with the CORESET index 0. For example, the size (the number of bits) of the frequency domain resource allocation field may be determined based on a size of a CORESET #0 having the largest (or the smallest) size in a frequency domain among CORESET #0s. That is, the size of the CORESET #0 whose size is the largest (or the smallest) in the frequency domain among the CORESET #0s may be $N_{BWP,i}^{size}$ or $N_{RB}^{DL,BWP}$.

Method 2-2: If a CORESET with a CORESET index 0 is not configured among all bandwidth parts configured in cells included in a cell group or among active bandwidth parts among the configured bandwidth parts, a size (the number of bits) of a frequency domain resource allocation field may be determined based on an initial downlink bandwidth part (an initial DL bandwidth part). For example, the size (the number of bits) of a frequency domain resource allocation field in DCI may be determined based on a size of an initial downlink bandwidth part whose size is the largest (or the smallest) among initial downlink bandwidth parts. That is, the size of the initial downlink bandwidth part whose size is the largest (or the smallest) in a frequency domain among the initial downlink bandwidth parts may be $N_{BWP,i}^{size}$ or $N_{RB}^{DL,BWP}$.

Method 2-3: A size (the number of bits) of a frequency domain resource allocation field in DCI may be determined based on a scheduling cell among cells included in a cell group. For example, if a CORESET having an CORESET index 0 is not configured for the scheduling cell, the size (the number of bits) of the frequency domain resource allocation field may be determined based on an initial downlink bandwidth part (an initial DL bandwidth part) of the scheduling cell. If the CORESET having the CORESET index 0 is configured for the scheduling cell, the size (the number of bits) of the frequency domain resource allocation field may be determined based on a size (e.g., the number of RBs) of the CORESET (the CORESET #0) having the CORESET index 0 of the scheduling cell.

Upon scheduling PDSCHs for one or more cells with one DCI, a size of a frequency domain resource allocation field in DCI may be determined through one or a combination of one or more of the methods described above.

In an embodiment, a resource allocation type configured in at least one cell among cells included in the cell group may be different from that of at least one other cell. At this time, a base station may determine a size or the number of bits of a frequency domain resource allocation field required for scheduling a PDSCH in each cell based on a resource allocation type configured in each cell, and determine the size of the frequency domain resource allocation field in the DCI as a size of a field whose size is the largest (or whose size is the smallest) among sizes determined for a plurality of cells. A UE may also determine a size of a frequency domain resource allocation field in the same manner as in the base station and interpret received DCI. In this case, a size or the number of bits of the frequency domain resource allocation field required for scheduling a PDSCH in each cell may be determined based on at least one or a combination of one or more of a carrier bandwidth size of the cell, a size of the largest (or the smallest) bandwidth part among bandwidth parts configured in the cell, or a size of active bandwidth part which is activated immediately before or at a time point at which the DCI is received among the bandwidth parts configured in the cell. In an embodiment, it may be applicable even when resource allocation types configured in the cells included in the determined cell group are the same.

Frequency Resource Allocation

If PDSCHs are scheduled for one or more cells with one DCI, a PDSCH frequency resource which may be indicated via a frequency domain resource allocation field in the DCI may be than the number of PDSCHs to be scheduled. In other words, if the number of cells capable of indicating a PDSCH frequency allocation resource via the frequency domain resource allocation field in the DCI is one (e.g., K=1), but a PDSCH is to be scheduled for a maximum of N (K<N) cells, there is a need for a method for correctly determining frequency resource allocation information on a PDSCH scheduled for N cells or at least N−K cells. Here, N is the number of PDSCHs scheduled by the DCI.

For example, as in method 3, one DCI may allocate a frequency resource for one or more PDSCHs by making frequency resource allocation information indicated via a frequency domain resource allocation field in the DCI equally applied to the PDSCHs scheduled for the N cells.

Figure 14:
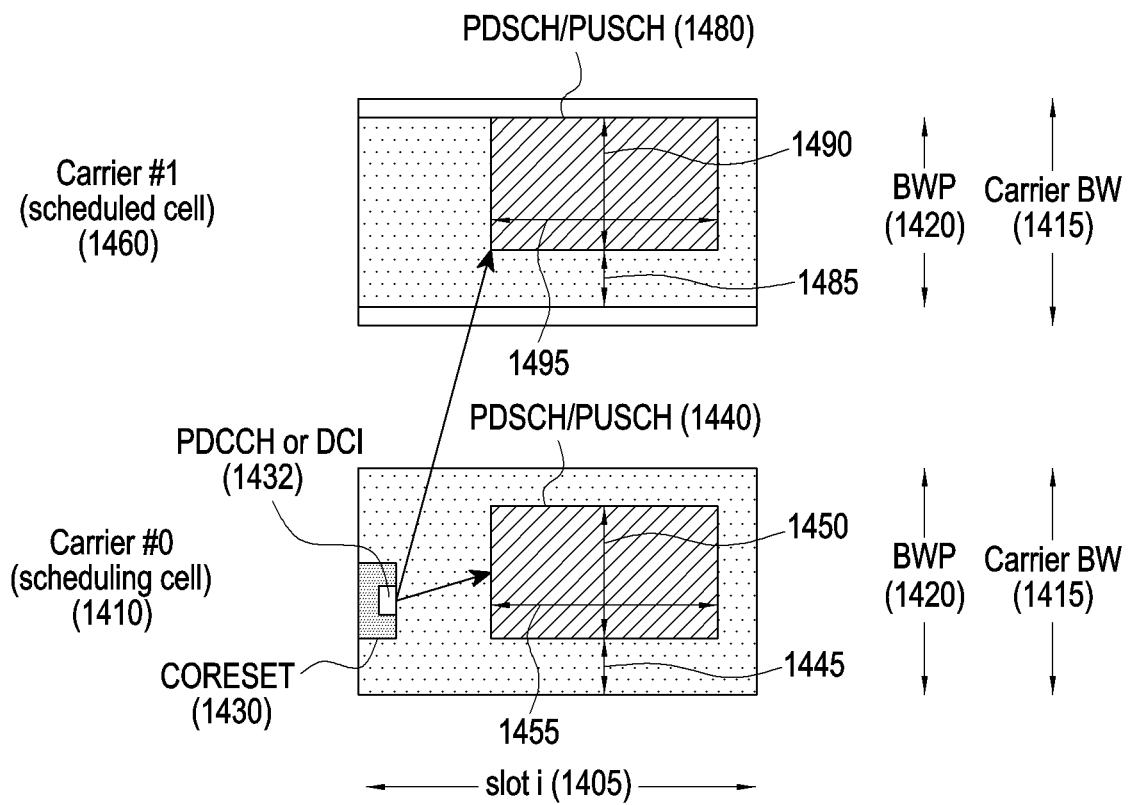
FIG. 14 is a diagram illustrating an example of frequency domain resource allocation in a case of scheduling data channels for a plurality of cells via DCI according to an embodiment of the disclosure.

FIG. 14 is a diagram illustrating an example of frequency domain resource allocation in a case of scheduling data channels for a plurality of cells via one DCI according to an embodiment of the disclosure.

Referring to FIG. 14, a base station may configure a cell #0 1410 as a scheduling cell of a cell #0 1410 and a cell #1 1460 via higher layer signaling, and may set a location of the cell #0 and/or the cell #1 in a CIF or a GIF. In addition, the base station may configure the cell #0 1410 and the cell #1 1460 to be included in the same cell group via higher layer signaling. The base station may configure that one DCI may schedule PDSCHs in a plurality of cells (i.e., the cell #0 1410 and the cell #1 1460) via higher layer signaling. The base station may configure a bandwidth and/or a bandwidth part of the cell #0 1410 and the cell #1 1460 via higher layer signaling. Also, the base station may configure a CORESET 1430 and search space information in the cell #0 1410 via higher layer signaling. Upon receiving configuration information of higher layer signaling from the base station, a UE may receive a PDCCH and PDSCHs according to the configuration information.

Hereinafter, a case in which a base station and a UE determine a size of a frequency domain resource allocation field in DCI based on a bandwidth part whose size is the largest among all configured bandwidth parts or all active bandwidth parts in cells included in a cell group according to at least one of embodiments of the disclosure will be described, but the disclosure is not limited thereto, and a detailed method of determining the size of the frequency domain resource allocation field refers to the above embodiments.

The UE may obtain DCI 1432 transmitted via a PDCCH in a CORESET 1430 of the cell #0 1410. The UE may identify at least one cell in which the DCI 1432 schedules a PDSCH via at least one of a CIF and/or a GIF, or a frequency domain resource allocation field in the DCI 1432. In an illustrated example, the DCI 1432 may schedule a PDSCH 1440 and a PDSCH 1480 in the cell #0 1410 and the cell #1 1460, respectively.

If K=1, the UE may determine all of frequency resource regions of the PDSCH 1440 and the PDSCH 1480 via the frequency domain resource allocation field in the DCI 1432. If a resource allocation type 1 is configured, a resource indicator value (RIV) indicated via the frequency domain resource allocation field may be equally applied to the PDSCH 1440 and the PDSCH 1480. In other words, the UE may apply a start RB ($RB_{start}$) of a PDSCH frequency resource and length or the number ($L_{RBs}$) of consecutively allocated RBs which are determined via the RIV, based on a bandwidth part activated in each cell, to determine a frequency resource region of the PDSCH 1440 and the PDSCH 1480. Here, an RB may be either a virtual RB (VRB) or a PRB.

For example, a start RB ($RB_{start}$) of a PDSCH frequency resource determined via the RIV may be determined (1445) based on the lowest RB in an active bandwidth part 1420 of the cell #0 1410, and an allocated frequency resource region of the PDSCH 1440 may be determined with length or the number ($L_{RBs}$)(1450) of allocated RBs. Similarly, the UE may determine (1485) (here, values in 1445 and 1485 are the same) a start RB ($RB_{start}$) of a PDSCH frequency resource determined via the RIV based on the lowest RB in an active bandwidth portion 1470 of the cell #1 1460, and determine an allocated frequency resource region of the PDSCH 1480 with length or the number ($L_{RBs}$)(1490) (here, values in 1450 and 1490 are the same) of allocated RBs.

In an embodiment, a time domain resource allocation field in the DCI 1432 (indicating a start symbol and the number of consecutive symbols) may also be equally applied to all of the PDSCH 1440 and the PDSCH 1480. At this time, if the determined PDSCH frequency resource region is larger than the active bandwidth part, that is, if the PDSCH frequency resource region determined by $RB_{start}$ and $L_{RBs}$ includes a region other than the active bandwidth part in which the PDSCH is scheduled, the UE may determine that a PDSCH is not scheduled for the active bandwidth part and may not receive a PDSCH, or and may determine, as a PDSCH frequency resource region, a region of a part in which the PDSCH frequency resource region determined by $RB_{start}$ and $L_{RBs}$ and the active bandwidth part overlap or are intersected, and may receive a PDSCH in the determined resource.

MCS

Hereinafter, in an embodiment of the disclosure, one DCI for scheduling PDSCHs for one or more cells may include one MCS field or may include fewer MCS fields than the number of cells included in a cell group. In this case, a method of identifying an MCS or an MCS index for each of a plurality of scheduled PDSCHs will be described. Here, identifying the MCS means identifying at least one of Modulation Order (Qm), Target code rate R×[1024], and Spectral efficiency corresponding to or mapped to an MCS index ($I_{MCS}$) indicated by an MCS field in the DCI as shown in Table 16, and for convenience of a description, it will be described by being briefly expressed as determining MCS information below in an embodiment of the disclosure.

Method 4-1: Method of Applying MCS Information Indicated Via One MCS Field in DCI to Scheduled PDSCHs A base station may assume that MCS information (or $I_{MCS}$) indicated via one MCS field in DCI is equally applied to PDSCHs scheduled via the DCI, configure an appropriate MCS or select an MCS index accordingly, and include MCS information indicating the selected MCS index into the DCI to transmit the DCI to a UE. Upon receiving the DCI, the UE may determine that the MCS information (or $I_{MCS}$) indicated via the MCS field in the DCI is equally applied to the PDSCHs scheduled by the DCI, and may receive a PDSCH accordingly.

Method 4-2: Method of applying MCS information on scheduled PDSCHs by additionally including an MCS offset field in DCI.

A base station may include an MCS offset field ($I_{MCS,offset}$) as well as an MCS index in one MCS field in DCI, or additionally include the MCS offset field ($I_{MCS,offset}$) as well as the MCS field in the DCI to indicate MCS information on scheduled PDSCHs.

For example, if one DCI schedules two PDSCHs for two cells included in a cell group, MCS information of the first PDSCH is indicated via an MCS index ($I_{MCS}$) indicated via an MCS field in the DCI, and MCS information of the second PDSCH is indicated via the MCS index ($I_{MCS}$) indicated via the MCS field in the DCI and an MCS offset ($I_{MCS,offset}$) indicated via an MCS offset field in the DCI. As described above, the base station may include the MCS information and the MCS offset information in the DCI to transmit the DCI to the UE. At this time, considering the MCS information indicated via the MCS field in the DCI and the MCS offset indicated via the MCS offset field in the DCI together may mean determining the MCS information of the second PDSCH by at least one of $I_{MCS,2}=I_{MCS}+I_{MCS,offset}$, $\max(I_{MCS}+I_{MCS,offset}, I_{MCS,max})$, $\max(I_{MCS}+I_{MCS,offset}, I_{MCS,non-reserved})$, $I_{MCS,2}=(I_{MCS}+I_{MCS,offset}) \bmod I_{MCS,max}$, or $I_{MCS,2}=(I_{MCS}+I_{MCS,offset}) \bmod (I_{MCS,non-reserved})$. Here, $I_{MCS,non-reserved}$ is the largest MCS index value among MCSs which are not reserved for one of target code rate R×[1024] and/or spectral efficiency among MCS information, such as, for example, an MCS index 27, 28, or 31.

Upon receiving the DCI, the UE may determine the MCS information of the first PDSCH among the two PDSCHs for the two cells scheduled in the DCI according to the MCS information ($I_{MCS}$) indicated by the MCS field in the DCI, and may determine the MCS information of the second PDSCH by considering the MCS information indicated via the MCS field in the DCI and the MCS offset indicated via the MCS offset field in the DCI together.

TABLE 16

| MCS index | Modulation Order (Qm) | Target code Rate R × [1024] | Spectral efficiency |
| --- | --- | --- | --- |
| 0 | 2 | 120 | 0.2344 |
| 1 | 2 | 157 | 0.3066 |
| 28 | 6 | 948 | 5.5547 |
| . . . | | | |
| 29 | 2 | | reserved |
| 30 | 4 | | reserved |
| 31 | 6 | | reserved |

For still another example, if one DCI schedules three PDSCHs for three cells included in a cell group, MCS information of the first PDSCH is indicated via an MCS index ($I_{MCS}$) indicated via an MCS field in the DCI, and MCS information of the second PDSCH and the third PDSCH is indicated via the MCS index ($I_{MCS}$) indicated via the MCS field in the DCI and an MCS offset ($I_{MCS,offset}$) indicated via an MCS offset field in the DCI. As described above, the base station may include the MCS information and the MCS offset information in the DCI to transmit the DCI to the UE.

Upon receiving the DCI, the UE may determine the MCS information of the first PDSCH among the three PDSCHs for the three cells scheduled by the DCI according to the MCS information (or $I_{MCS}$) indicated in the MCS field in the DCI, and determine the MCS information of the PDSCH and the third PDSCH by considering the MCS information indicated via the MCS field in the DCI and the MCS offset indicated via the MCS offset field in the DCI together. In the above example, it is possible that the MCS information of the first PDSCH and the second PDSCH among the PDSCHs for the three cells is determined according to the MCS information (or $I_{MCS}$) indicated in the MCS field in the DCI, and the MCS information of the third PDSCH is determined in consideration of both the MCS information indicated via the MCS field in the DCI and the MCS offset indicated via the MCS offset field. In an embodiment, the DCI may include one or more MCS offset fields to individually indicate MCS information on subsequent PDSCHs after the second PDSCH.

In an example, the first PDSCH may be related to a cell having the smallest cell index among cells for which a PDSCH is scheduled in a cell group, and the second PDSCH and the third PDSCH may be sequentially related to cells having a smallest cell index to a largest cell index. As another example, the first PDSCH may be related to the cell having the largest cell index among the cells for which the PDSCH is scheduled in the cell group, and the second PDSCH and the third PDSCH may be sequentially related to cells having a largest cell index to a smallest cell index.

In the above, embodiments in which one or more PDSCHs are scheduled in one or more cells by one DCI have been described, but it will be apparent that a similar description may also be applied to a case in which one or more PUSCHs are scheduled in one or more cells by one DCI.

Figure 15:
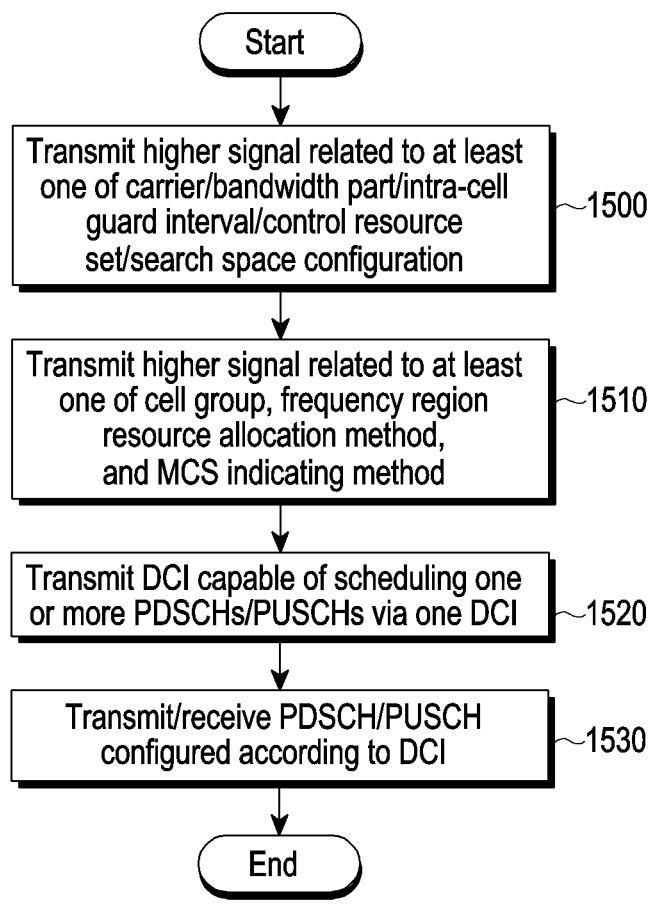
FIG. 15 is a flowchart illustrating an operation of a base station according to an embodiment of the disclosure.

FIG. 15 is a flowchart illustrating an operation of a base station according to an embodiment of the disclosure.

Referring to FIG. 15, in step 1500, a base station may transmit higher layer signaling including at least one or more of configurations related to a carrier bandwidth, a bandwidth part, an intra-cell guard interval, a control resource set, and a search space to a UE. That is, the base station may configure a carrier bandwidth, a location and a size of a bandwidth part, whether an intra-cell guard interval exists, a location and a size of a guard interval, configuration of a control resource set and a search space for each bandwidth part, and/or the like which are for each serving cell, and transmit configuration information generated according to the configuration to the UE via higher layer signaling.

In step 1510, in order to schedule one or more PDSCHs/PUSCHs via one DCI, the base station may transmit, to the UE via higher layer signaling, configuration information including at least one configuration information of a cell group which may be scheduled via the one DCI, CIF (or GIF) configuration information indicating a scheduling cell in the cell group, a frequency domain resource allocation method, and presence or absence of an MCS and/or an MCS offset.

In step 1520, the base station may determine at least one of CIF (or GIF) information indicating a scheduling cell in a cell group, a size of a frequency domain resource allocation field, an MCS and/or an MCS offset according to at least one or a combination of various embodiments of the disclosure in order to schedule one or more PDSCHs/PUSCHs in one or more cells, and transmit, to the UE, one DCI including the determined at least one of the CIF (or GIF), the frequency domain resource allocation field, the MCS field, and the MCS offset field. For example, the base station may determine the size of the frequency domain allocation field in the DCI based on a bandwidth part whose size is the largest (or a bandwidth part whose size is the smallest) among active bandwidth parts in cells in a cell group configured to the UE based on the UE to which the DCI is to be transmitted. In an embodiment, the base station may determine that frequency domain resource allocation information indicated via the frequency domain allocation field in the DCI is equally applied to one or more PDSCHs/PUSCHs scheduled by the DCI, and configure frequency domain resource allocation information on the PDSCH/PUSCH to transmit it to the UE via the DCI.

In step 1530, the base station may transmit one or more PDSCHs to the UE or receive one or more PUSCHs from the UE according to the transmitted DCI.

Figure 16:
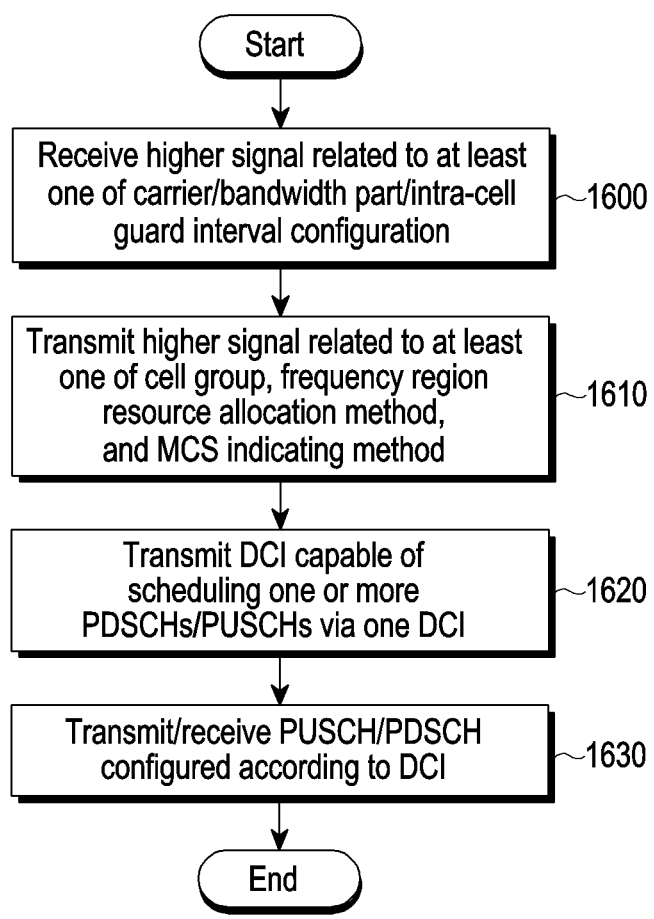
FIG. 16 is a flowchart illustrating an operation of a UE according to an embodiment of the disclosure.

FIG. 16 is a flowchart illustrating an operation of a UE according to an embodiment of the disclosure.

Referring to FIG. 16, in step 1600, a UE may receive higher layer signaling including at least one or more of configurations related to a carrier bandwidth, a bandwidth part, an intra-cell guard interval, a control resource set, and a search space from a base station. That is, the UE may receive, from the base station via higher layer signaling, configuration information on a carrier bandwidth, a location and a size of a bandwidth part, whether an intra-cell guard interval exists, a location and a size of a guard interval, a control resource set and a search space for each bandwidth part, and/or the like which are for each serving cell.

In step 1610, in order for the base station to schedule one or more PDSCHs/PUSCHs via one DCI, the UE may receive, from the base station via higher layer signaling, configuration information including at least one configuration information of a cell group which may be scheduled via the one DCI, CIF (or GIF) configuration information indicating a scheduling cell in the cell group, a frequency domain resource allocation method, and presence or absence of an MCS and/or an MCS offset.

In step 1620, the UE may determine at least one of CIF (or GIF) information indicating a scheduling cell in a cell group, a size of a frequency domain allocation field, an MCS and/or an MCS offset according to at least one or a combination of various embodiments of the disclosure, and receive, from the base station, DCI including at least one of the CIF (or GIF), the frequency domain resource allocation field, the MCS field, and the MCS offset field according to the determination. For example, the UE may determine the size of the frequency domain allocation field in the DCI based on a bandwidth part whose size is the largest (or a bandwidth part whose size is the smallest) among active bandwidth parts in cells in a cell group configured from the base station. In addition, the UE may determine presence or absence of the MCS offset field in the DCI.

In step 1630, the UE may receive one or more PDSCHs scheduled to one or more cells or transmit one or more PUSCHs scheduled to the one or more cells according to fields included in the received DCI. In this case, the UE may determine that frequency domain resource allocation information indicated via the frequency domain resource allocation field in the DCI is equally applied to one or more PDSCHs/PUSCHs scheduled by the DCI, and receive the one or more PDSCHs or transmit the one or more PUSCHs according to the frequency domain resource allocation information on the PDSCH/PUSCH.

The methods according to the embodiments descried in the specification or claims may be implemented in hardware, software, or a combination of hardware and software.

When implemented in software, there may be provided a computer readable storage medium or a computer program product storing one or more programs (software modules). One or more programs stored in the computer readable storage medium or the computer program product are configured to be executed by one or more processors in an electronic device. One or more programs include instructions that enable the electronic device to execute methods according to the embodiments described in the specification or claims.

The programs (software modules or software) may be stored in random access memories, non-volatile memories including flash memories, Read Only Memories (ROMs), Electrically Erasable Programmable Read Only Memories (EEPROMs), magnetic disc storage devices, Compact-Disc ROMs, Digital Versatile Discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, Local Area Network (LAN), Wide LAN (WAN), or Storage Area Network (SAN) or a communication network configured of a combination thereof. The storage device may connect to the device that performs embodiments via an external port. A separate storage device over the communication network may be connected to the device that performs embodiments.

In the disclosure, the term "computer program product" or "computer readable medium" is used to refer to a medium such as a memory, a hard disk installed in a hard disk drive, a signal, and/or the like as a whole. These "computer program products" or "computer-readable recording medium" are means for providing a method for monitoring a downlink control channel in a wireless communication system according to the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components and even if a component is expressed in a plural form, it may be composed of a singular form, or even if a component is expressed in a singular form, it may be composed of a plural form.

On the other hand, embodiments of the disclosure disclosed in the specification and the drawings are merely presented as specific examples to easily explain the technical content of the disclosure and help the understanding of the disclosure, and are not intended to limit the scope of the disclosure. That is, it will be apparent to those of ordinary skill in the art to which the disclosure pertains that other modified examples may be implemented based on the technical spirit of the disclosure. In addition, each of the above embodiments may be operated in combination with each other as needed. For example, a base station and a UE may be operated by combining parts of one embodiment and another embodiment of the disclosure with each other. In addition, embodiments of the disclosure are applicable to other communication systems, and other modifications based on the technical spirit of embodiments may also be implemented. For example, embodiments may also be applied to an LTE system, a 5G or NR system, and/or the like.

The invention claimed is:

1. A method of a base station for transmitting downlink control information in a wireless communication system, the method comprising:
    transmitting, to a user equipment (UE) via higher layer signaling, configuration information on scheduling of one or more data channels for one or more cells via one piece of downlink control information;
    according to the configuration information, determining: at least one of a carrier indication field (CIF) or a cell group indication field (GIF), and a size of a frequency domain resource allocation field applied to one or more data channels, which are included in the downlink control information; and
    according to the configuration information, including: the at least one of the CIF or the GIF, and the frequency domain resource allocation field having the determined size, in the downlink control information on scheduling of a plurality of data channels for a plurality of cells, and transmitting, to the UE, the downlink control information,
    wherein the CIF or the GIF includes a bitmap having a number of bits set as a maximum number of cells schedulable by the downlink control information.

2. The method of claim 1, wherein the configuration information includes at least one of:
    information indicating a cell group including the plurality of cells schedulable via the downlink control information;
    first configuration information on the carrier indication field (CIF) or the cell group indication field (GIF) indicating a scheduled cell within the cell group;
    second configuration information on the frequency domain resource allocation field; and
    third configuration information on at least one modulation and coding scheme (MCS) field or the MCS offset field.

3. The method of claim 1, wherein the size of the frequency domain resource allocation field is determined by considering a size of a carrier bandwidth or a bandwidth part of each of the plurality of cells scheduled via the downlink control information.

4. The method of claim 1, wherein the downlink control information includes:
    a first modulation and coding scheme (MCS) index indicating an MCS of a first data channel for a first cell among the plurality of cells; and
    an MCS offset indicating an MCS of a second data channel for a second cell among the plurality of cells.

5. A method of a user equipment (UE) for receiving downlink control information in a wireless communication system, the method comprising:
    receiving, from a base station via higher layer signaling, configuration information on scheduling of one or more data channels for one or more cells via one piece of downlink control information;
    receiving the downlink control information including: at least one of a carrier indication field (CIF) or a cell group indication field (GIF), and a frequency domain resource allocation field applied to a plurality of data channels to schedule the plurality of data channels for a plurality of cells, respectively; and according to the configuration information, obtaining: the at least one of the CIF and the GIF, and the frequency domain resource allocation field, which are included in the downlink control information, wherein the CIF or the GIF includes a bitmap having a number of bits set as a maximum number of cells schedulable by the downlink control information.

6. The method of claim 5, wherein the configuration information includes at least one of:

information indicating a cell group including the plurality of cells schedulable via the downlink control information;

first configuration information on the carrier indication field (CIF) or the cell group indication field (GIF) indicating a scheduling cell within the cell group;

second configuration information on the frequency domain resource allocation field; and third configuration information on at least one modulation and coding scheme (MCS) field and/or the MCS offset field.

7. The method of claim 5, wherein the CIF or GIF includes a bitmap having a number of bits set as a maximum number of cells schedulable by the downlink control information.

8. The method of claim 5, wherein the size of the frequency domain resource allocation field is determined by considering a size of a carrier bandwidth or a bandwidth part of each of the plurality of cells scheduled via the downlink control information.

9. The method of claim 5, wherein the downlink control information includes:

a first modulation and coding scheme (MCS) index indicating an MCS of a first data channel for a first cell among the plurality of cells; and an MCS offset indicating an MCS of a second data channel for a second cell among the plurality of cells.

10. An apparatus of a base station for transmitting downlink control information in a wireless communication system, the apparatus comprising:

a transceiver; and a controller, wherein the controller is configured to:

transmit, to a user equipment (UE) via higher layer signaling, configuration information on scheduling of one or more data channels for one or more cells via one piece of downlink control information, according to the configuration information, determine: at least one of a carrier indication field (CIF) or a cell group indication field (GIF), and a size of a frequency domain resource allocation field applied to one or more data channels, which are included in the downlink control information, and according to the configuration information, include: the at least one of the CIF or the GIF, and at least one frequency domain resource allocation field having the determined size in the downlink control information on scheduling of a plurality of data channels for a plurality of cells and transmit the downlink control information to the UE, wherein the CIF or the GIF includes a bitmap having a number of bits set as a maximum number of cells schedulable by the downlink control information.

11. The apparatus of claim 10, wherein the configuration information includes at least one of:

information indicating a cell group including the plurality of cells schedulable via the downlink control information;

first configuration information on the carrier indication field (CIF) or the cell group indication field (GIF) indicating a scheduled cell within the cell group;

second configuration information on the frequency domain resource allocation field; and third configuration information on at least one modulation and coding scheme (MCS) field and/or the MCS offset field.

12. The apparatus of claim 10, wherein the CIF or GIF includes a bitmap having a number of bits set as a maximum number of cells schedulable by the downlink control information.

13. The apparatus of claim 10, wherein the size of the frequency domain resource allocation field is determined by considering a size of a carrier bandwidth or a bandwidth part of each of the plurality of cells scheduled via the downlink control information.

14. The apparatus of claim 10, wherein the downlink control information includes:

a first modulation and coding scheme (MCS) index indicating an MCS of a first data channel for a first cell among the plurality of cells, and an MCS offset indicating an MCS of a second data channel for a second cell among the plurality of cells.

15. An apparatus of a user equipment (UE) for receiving downlink control information in a wireless communication system, the apparatus comprising:

a transceiver; and a controller, wherein the controller is configured to:

receive, from a base station via higher layer signaling, configuration information on scheduling of one or more data channels for one or more cells via one piece of downlink control information, receive the downlink control information including: at least one of a carrier indication field (CIF) or a cell group indication field (GIF), and a frequency domain resource allocation field applied to a plurality of data channels to schedule a plurality of data channels for a plurality of cells, respectively, and according to the configuration information, obtain: the at least one of the CIF and the GIF, and the frequency domain resource allocation field which are included in the downlink control information, wherein the CIF or the GIF includes a bitmap having a number of bits set as a maximum number of cells schedulable by the downlink control information.

16. The apparatus of claim 15, wherein the configuration information includes at least one of:

information indicating a cell group including the plurality of cells schedulable via the downlink control information;

first configuration information on the carrier indication field (CIF) or the cell group indication field (GIF) indicating a scheduling cell within the cell group;

second configuration information on the frequency domain resource allocation field; and third configuration information on at least one modulation and coding scheme (MCS) field and/or the MCS offset field.

17. The apparatus of claim 15, wherein the CIF or GIF includes a bitmap having a number of bits set as a maximum number of cells schedulable by the downlink control information.

18. The apparatus of claim 15, wherein the size of the frequency domain resource allocation field is determined by considering a size of a carrier bandwidth or a bandwidth part of each of the plurality of cells scheduled via the downlink control information.

19. The apparatus of claim 15, wherein the downlink control information includes:
- a first modulation and coding scheme (MCS) index indicating an MCS of a first data channel for a first cell among the plurality of cells, and
- an MCS offset indicating an MCS of a second data channel for a second cell among the plurality of cells.

\* \* \* \* \*